US006952384B1

(12) United States Patent
Shoji et al.

(10) Patent No.: US 6,952,384 B1
(45) Date of Patent: Oct. 4, 2005

(54) OPTICAL DISK APPARATUS AND METHOD FOR SETTING CONTROL PARAMETERS

(75) Inventors: Mamoru Shoji, Sakai (JP); Atsushi Nakamura, Kadoma (JP); Takashi Ishida, Yawata (JP); Shunji Ohara, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/089,901

(22) Filed: Jun. 3, 1998

(30) Foreign Application Priority Data

| | | |
|---|---|---|
| May 6, 1997 | (JP) | 9-147522 |
| May 6, 1997 | (JP) | 9-147524 |
| Nov. 6, 1997 | (JP) | 9-153363 |

(51) Int. Cl.[7] .......... G11B 7/095
(52) U.S. Cl. .......... 369/44.35; 369/47.52; 369/53.2; 369/275.3
(58) Field of Search .......... 369/54, 58, 275.8, 369/44.35, 47.52, 53.2, 275.3

(56) References Cited

U.S. PATENT DOCUMENTS

| | | | | | |
|---|---|---|---|---|---|
| 4,907,212 | A | * | 3/1990 | Pharris et al. | 369/54 X |
| 5,185,733 | A | * | 2/1993 | Pinkelstein et al. | 369/54 |
| 5,341,360 | A | * | 8/1994 | Johann et al. | 369/54 X |
| 5,359,589 | A | * | 10/1994 | Mashimo | 369/54 X |
| 5,475,666 | A | * | 12/1995 | Ito et al. | 369/54 |
| 5,508,995 | A | * | 4/1996 | Moriya et al. | 369/275.4 |
| 5,559,785 | A | * | 9/1996 | Honda et al. | 369/54 X |
| 5,566,141 | A | * | 10/1996 | Yamaguchi et al. | 369/30.17 |
| 5,568,461 | A | | 10/1996 | Nishiuchi et al. | |
| 5,586,100 | A | * | 12/1996 | Lee et al. | 369/54 |
| 5,612,939 | A | * | 3/1997 | Ueki et al. | 369/54 X |
| 5,812,506 | A | * | 9/1998 | Pietrzykoski et al. | 369/54 |
| 5,936,924 | A | * | 8/1999 | Tanaka | 369/47.52 |
| 5,936,932 | A | * | 8/1999 | Nakane et al. | 369/275.3 OR |
| 5,946,285 | A | * | 8/1999 | Nakane et al. | 369/275.3 OR |

(Continued)

FOREIGN PATENT DOCUMENTS

| | | |
|---|---|---|
| EP | 0 712 119 | 11/1995 |

(Continued)

OTHER PUBLICATIONS

European Search Report for App. No. 98110109 dated Aug. 6, 2001.

*Primary Examiner*—A M Psitos
(74) *Attorney, Agent, or Firm*—Renner, Otto, Boisselle & Sklar, LLP

(57) ABSTRACT

An optical disk apparatus performing either one of recording and reproduction of an optical disk in which groove-shaped groove tracks and land tracks present between the groove tracks are alternately connected to each other in a spiral shape, includes: a recording and reproduction unit for recording a signal in at least one continuous groove track and at least one continuous land track, and then reproducing the signal from the groove track and the land track; a detector for detecting a quality of the signal recorded and reproduced by the recording and reproduction unit; a control parameter setting unit for setting a control parameter related to at least one of the recording and the reproduction of the optical disk; and a controller for changing the control parameter set by the control parameter setting unit, repeating the recording and reproduction performed by the recording and reproduction unit and detection performed by the detector every time the control parameter is changed, and determining the control parameter based on the quality of the signal detected by the detector.

20 Claims, 66 Drawing Sheets

U.S. PATENT DOCUMENTS

| | | | | | |
|---|---|---|---|---|---|
| 5,949,747 | A * | 9/1999 | Miyashita et al. | 369/53.26 | |
| 5,995,458 | A * | 11/1999 | Itoi | 369/30.37 | |
| 6,058,099 | A * | 5/2000 | Senshu | 369/275.3 | |
| 6,091,699 | A * | 7/2000 | Nakane et al. | 369/275.3 | OR |
| 6,667,937 | B2 * | 12/2003 | Nishiuchi et al. | 369/44.29 | |

FOREIGN PATENT DOCUMENTS

| | | |
|---|---|---|
| EP | 0 740 291 | 4/1996 |
| JP | 4141827 | 5/1992 |

* cited by examiner

Equalizer characteristic

PRIOR ART

OPTICAL DISK APPARATUS AND METHOD FOR SETTING CONTROL PARAMETERS

BACKGROUND OF THE INVENTION

1. Field of the Invention

The present invention relates to an optical disk apparatus which records information by irradiating a laser beam onto an optical disk medium, and a method for setting its control parameters.

2. Description of the Related Art

In recent years, optical apparatuses have been extensively developed as means for recording/reproducing large-capacity data, and there has been an approach to achieving a higher recording density. One example of them is a phase-change type optical disk apparatus utilizing reversible state changes between a crystal state and an amorphous state.

In a phase-change type optical disk apparatus, a semiconductor laser beam having two powers (a peak power which makes a crystal portion amorphous and a bias power which crystallizes an amorphous portion) is irradiated onto an optical disk medium, whereby marks (amorphous portions) and spaces (crystal portions) interposed between the marks are formed on the optical disk medium.

The marks and spaces have different reflectivity, so that a recorded signal is read by utilizing the difference in reflectivity during reproduction.

Herein, a signal is recorded at one recording focus position (irradiation spot position of a laser beam), and the signal is reproduced at one reproduction focus position (irradiation spot position of a laser beam). A series of steps for determining the quality of a reproduction signal by a quality determination circuit will be described by using a path on a recorded track of irradiation spots of a semiconductor laser beam.

Actually, a track is moved into an irradiation spot by the rotation of a disk. However, for simplicity, it is assumed that an irradiation spot moves onto a recording track.

FIG. 65 is a view showing a track structure of a conventional optical disk 26. Reference numeral 27 denotes a groove track formed in the shape of a spiral. In this figure, recording from a point 21 to a point 22 is performed clockwise at one recording focus position. Then, in order to reproduce a signal, for example, an irradiation spot jumps from a point 23 to an inner track, passing through a point 24, and starts moving on a track from a point 25. Then, the irradiation spot moves clockwise on a track from the point 25 to the point 21, and reproduces a signal previously recorded from the point 21, whereby the quality determination circuit determines the quality of a reproduction signal.

In the case of obtaining an optimum recording focus position, a recording focus position is gradually changed, and every time the recording focus position is changed, the above-mentioned recording and reproduction are repeated. Thus, a recording focus position at which a reproduction signal of the highest quality is obtained is determined.

Similarly, in the case of obtaining an optimum reproduction focus position, a reproduction focus position is gradually changed, and every time the reproduction focus position is changed, the above-mentioned recording and reproduction are repeated. Thus, a reproduction focus position at which a reproduction signal of the highest quality is obtained is determined.

In the case of setting a tilt angle (i.e., an incident angle of a laser beam with respect to an optical disk), the tilt angle is gradually changed, and every time the tilt angle is changed, the above-mentioned recording and reproduction are repeated. Thus, a tilt angle at which a reproduction signal of the highest quality is obtained is determined.

An example of a method for obtaining an optimum irradiation power of a semiconductor laser beam is described in, for example, Japanese Laid-open Publication No. 4-141827. According to this method, a signal is recorded while a peak power is gradually decreased from the high power side, for example, under the condition that a bias power is fixed. In this case, every time a signal is recorded with one peak power, the signal is reproduced with a reproduction power, and a quality determination circuit determines the quality of a reproduction signal. Then, a lower limit value of a power which the quality determination circuit determines is "good" is obtained, and a margin value is added to the lower limit value, whereby an optimum power is set.

In the above-mentioned case, recording and reproduction of a signal are required to be repeated with respect to a track in accordance with the process shown in FIG. 65 in the same way as in obtaining recording and reproduction focus positions, and a tilt angle.

On the other hand, as recording pits are recorded with a higher density, there arise problems such as a decrease in S/N and a waveform interference between the recording pits in reproducing a recorded signal, or changes in characteristics of a reproduction channel caused by the variation of optical disk media and optical disk apparatuses. Thus, there has been a demand for an apparatus in which an increase in error rate due to this problem is small.

In order to overcome the problem of the changes in characteristics of a reproduction channel, a method for optimizing an equalizer characteristic in each disk has been considered.

For example, parameters of an equalizer characteristic are set to be the largest boost amount and a frequency at which a boost amount becomes maximum. Under the condition that the frequency at which the boost amount becomes maximum is fixed, a recorded signal is reproduced while the boost amount is gradually increased from the lower side. Thus, the quality of a reproduction signal is detected, and the boost amount at which the best quality reproduction signal is obtained, is set as the optimum boost amount. Then, while the boost amount is fixed, a frequency at which the boost amount becomes maximum is similarly obtained.

Herein, in the same way as in obtaining recording and reproduction focus positions, and a tilt angle, recording and reproduction of a signal are required to be repeated with respect to a track in accordance with the process shown in FIG. 65, whereby an equalizer characteristic is optimized.

The above-mentioned conventional optical disk apparatus is predicated on optical disks in which a groove-shaped track (groove track) is formed in the shape of a spiral, and a recording area is provided in either the groove track or the land track (i.e., track between the grooves), and an optimum focus position, an optimum tilt angle, etc. are obtained with respect to this type of optical disk. However, optical disks in which a signal is recorded in both the land track and the groove track are not considered.

The land track and the groove track have different physical properties such as the shape of a groove and reflectivity due to the difference in arrangement, and an optimum focus position, an optimum tilt angle, etc. are different with respect to each track. Therefore, in the case of performing recording and reproduction with respect to both the land track and the groove track, an optimum focus position, an optimum tilt angle, etc. are required to be set for the land track and the groove track, respectively. Alternatively, an average of an optimum focus position, an average of an optimum tilt angle, etc. are required to be set for the land track and the groove track, respectively. However, in both the cases, recording and reproduction of a track are required to be repeated by the process shown in FIG. 65 for the land track and the groove track, separately. Therefore, in the case of performing recording and reproduction using both the land track and the groove track, a longer time and more effort is required compared with the case of using only one of either the groove track or the land track.

Specifically, a waiting time for rotation (point 23→point 24→point 25→point 21) in FIG. 65 is used for the land track and the groove track, respectively, which decreases an efficiency.

The similar problem is caused in obtaining and setting an optimum power, an optimum equalizer characteristic, as well as an optimum focus position and an optimum tilt angle. Thus, a longer time and more effort are required.

SUMMARY OF THE INVENTION

An optical disk apparatus performing either one of recording and reproduction of an optical disk in which groove-shaped groove tracks and land tracks present between the groove tracks are alternately connected to each other in a spiral shape, includes: a recording and reproduction unit for recording a signal in at least one continuous groove track and at least one continuous land track, and then reproducing the signal from the groove track and the land track; a detector for detecting a quality of the signal recorded and reproduced by the recording and reproduction unit; a control parameter setting unit for setting a control parameter related to at least one of the recording and the reproduction of the optical disk; and a controller for changing the control parameter set by the control parameter setting unit, repeating the recording and reproduction performed by the recording and reproduction unit and detection performed by the detector every time the control parameter is changed, and determining the control parameter based on the quality of the signal detected by the detector.

In one embodiment of the present invention, the controller obtains a control parameter common to the groove track and the land track.

In another embodiment of the present invention, the controller obtains control parameters for the groove track and the land track, separately.

In another embodiment of the present invention, the control parameter setting unit sets an average value of the control parameter of the groove track and the land track obtained by the controller.

In another embodiment of the present invention, the control parameter setting unit sets the control parameter of the groove track and the land track obtained by the controller, separately.

In another embodiment of the present invention, the recording and reproduction by the recording and reproduction unit, the detection by the detector, and the determination by the controller are performed at two positions apart from each other on the optical disk, and a control parameter corresponding to each of the positions is obtained in order to be set; and when at least one of the recording and the reproduction is performed between the respective positions on the optical disk, a control parameter in accordance with the position at which at least one of the recording and the reproduction is performed is obtained in order to be set based on the control parameter corresponding to each of the positions.

In another embodiment of the present invention, the control parameter is at least one of a focus position of a light beam radiated for at least one of the recording and the reproduction of the optical disk, a tilt angle of the light beam with respect to the optical disk, an intensity of the laser beam, and an equalizer characteristic of the laser beam.

In another embodiment of the present invention, the controller sets a plurality of kinds of control parameters, separately, and repeats setting of each of the control parameters in accordance with a detection result of the detector.

In another embodiment of the present invention, a number of sectors of the groove track to be recorded and reproduced by the recording and reproduction unit is equal to a number of sectors of the land track to be recorded and reproduced by the recording and reproduction unit.

In another embodiment of the present invention, the detector detects at least one of a byte error rate of the signal recorded and reproduced by the recording and reproduction unit, a jitter of the signal, a bit error rate of the signals a resolution of the signal, a symmetry of the signal, and a modulation of the signal.

A method for setting a control parameter of an optical disk apparatus performing at least one of recording and reproduction of an optical disk in which groove-shaped groove tracks and land tracks present between the groove tracks are alternately connected to each other in a spiral shape, includes: a recording and reproduction step of recording a signal in at least one continuous groove track and at least one continuous land track, and then reproducing the signal from the groove track and the land track; a detection step of detecting a quality of the signal recorded and reproduced during the recording and reproduction step; a control parameter setting step of setting a control parameter related to at least one of the recording and the reproduction of the optical disk; and a control step of changing the control parameter set during the control parameter setting step, repeating the recording and reproduction performed during the recording and reproduction step and the detection performed during the detection step every time the control parameter is changed, and determining the control parameter based on the quality of the signal detected during the detection step.

In one embodiment of the present invention, a control parameter common to the groove track and the land track is obtained during the control step.

In another embodiment of the present invention, control parameters are obtained for the groove track and the land track, separately, during the control step.

In another embodiment of the present invention, an average value of the control parameter of the groove track and the land track obtained during the control step is set during the control parameter setting step.

In another embodiment of the present invention, the control parameter of the groove track and the land track obtained during the control step are separately set during the control parameter setting step.

In another embodiment of the present invention, the recording and reproduction during the recording and reproduction step, the detection during the detection step, and the determination during the control step are performed at two positions apart from each other on the optical disk, and a control parameter corresponding to each of the positions is obtained in order to be set; and when at least one of the recording and the reproduction is performed between the respective positions on the optical disk, a control parameter in accordance with the position at which at least one of the recording and the reproduction is performed is obtained in order to be set based on the control parameter corresponding to each of the positions.

In another embodiment of the present invention, the control parameter is at least one of a focus position of a light beam radiated for at least one of the recording and the reproduction of the optical disk, a tilt angle of the light beam with respect to the optical disk, an intensity of the laser beam, and an equalizer characteristic of the laser beam.

In another embodiment of the present invention, during the control step, a plurality of kinds of control parameters are separately set, and setting of each of the control parameters is repeated in accordance with a detection result obtained during the detection step.

In another embodiment of the present invention, a number of sectors of the groove track to be recorded and reproduced during the recording and reproduction step is equal to a number of sectors of the land track to be recorded and reproduced during the recording and reproduction step.

In another embodiment of the present invention, at least one of a byte error rate of the signal recorded and reproduced during the recording and reproduction step, a jitter of the signal, a bit error rate of the signal, a resolution of the signal, a symmetry of the signal, and a modulation of the signal is detected during the detection step.

Thus, the invention described herein makes possible the advantages of (1) providing an optical disk apparatus capable of efficiently obtaining an optimum focus position, an optimum tilt angle, an optimum power, and an optimum equalizer characteristic with respect to an optical disk in which a signal is recorded in both a land track and a groove track, and (2) providing a method for setting control parameters.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

In the first embodiment, a recording focus position and a reproduction focus position common to a land track and a groove track of an optical disk are obtained in order to be set.

Figure 1:
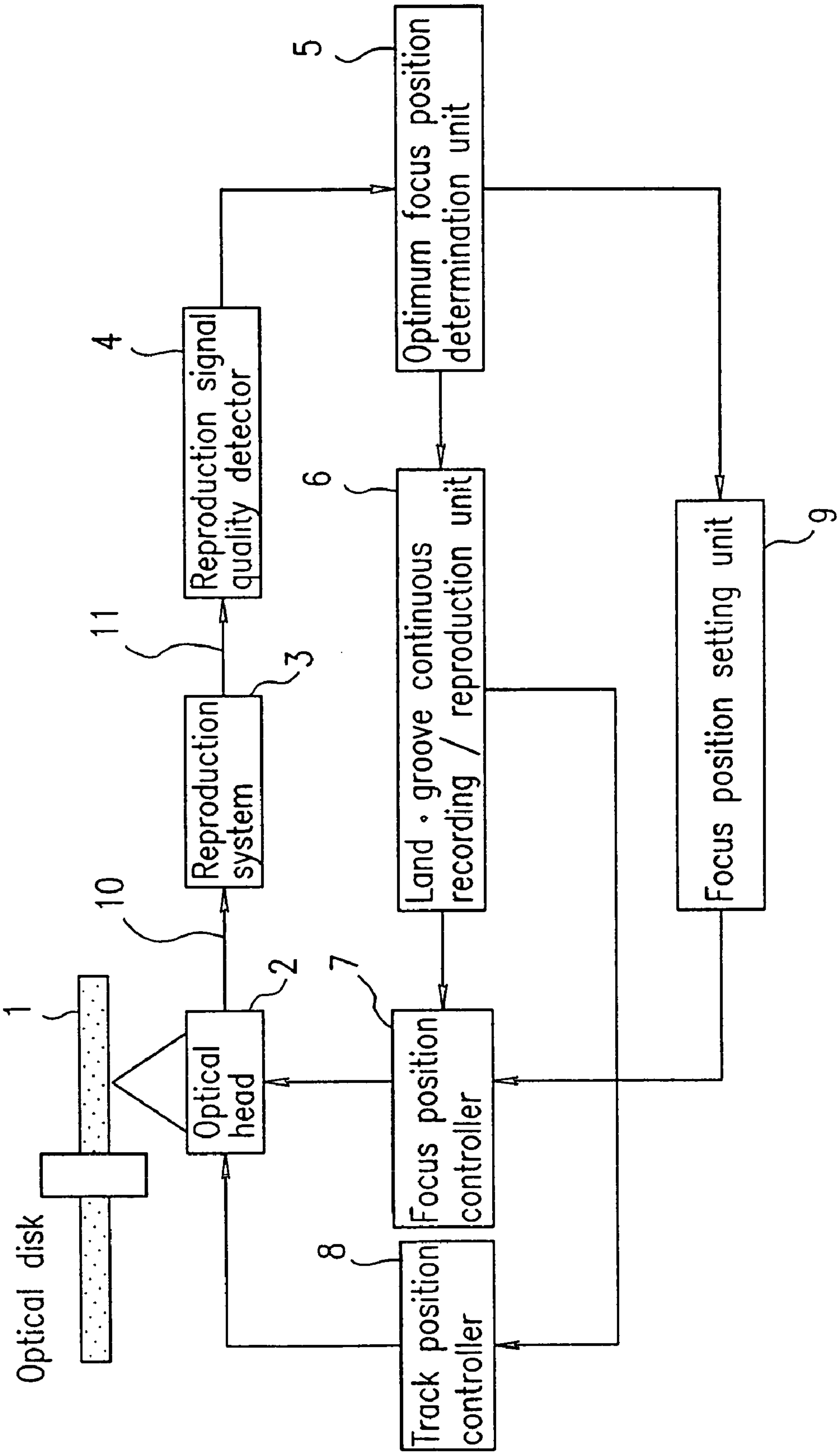
FIG. 1 is a block diagram showing the first embodiment of an optical disk apparatus according to the present invention.

FIG. 1 shows a structure of a phase-change type optical disk apparatus in the first embodiment of the present invention. In FIG. 1, reference numeral 1 denotes an optical disk, 2 denotes an optical head, 3 denotes a reproduction system, 4 denotes a reproduction signal quality detector, 5 denotes an optimum focus position determination unit, 6 denotes a land•groove continuous recording/reproduction unit, 7 denotes a focus position controller, 8 denotes a track position controller, and 9 denotes a focus position setting unit.

Figure 2:
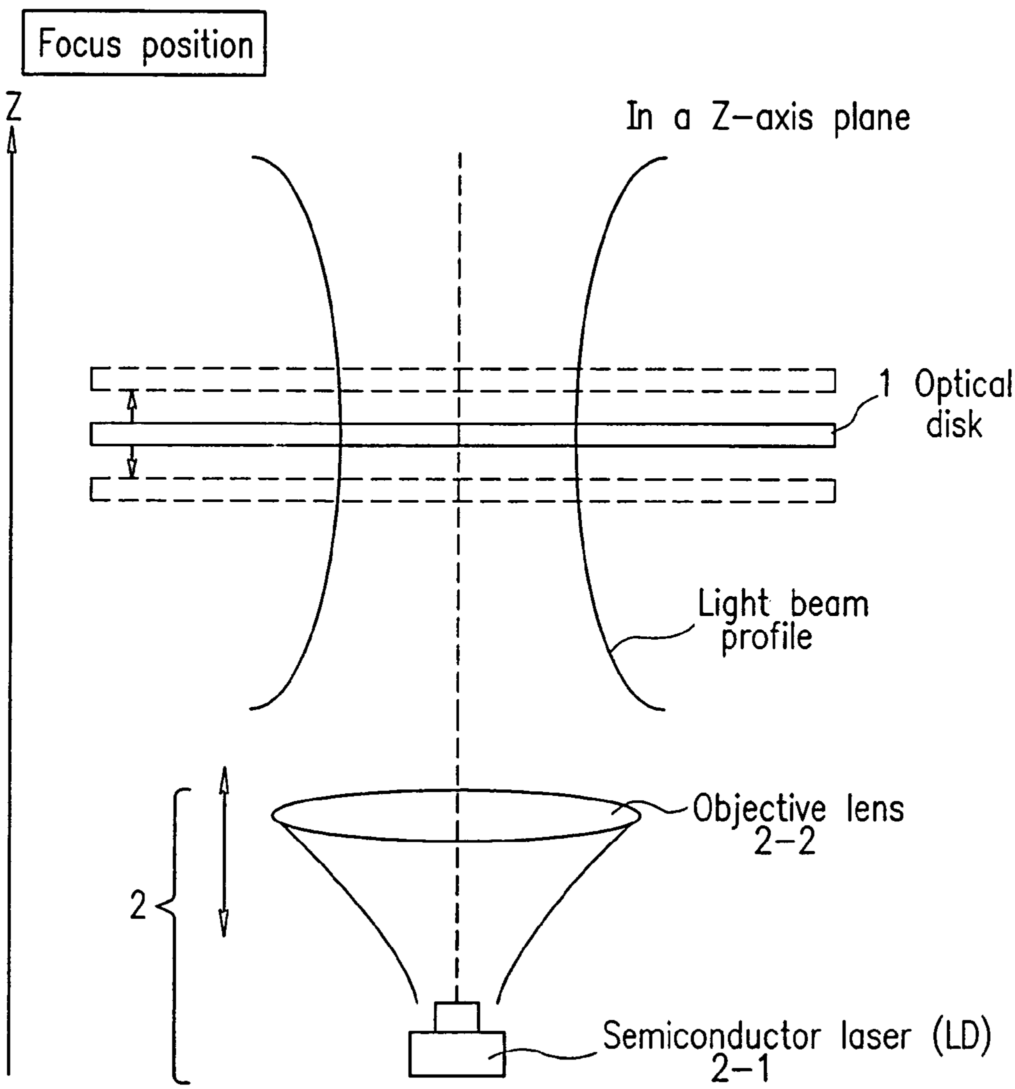
FIG. 2 is a diagram showing a focus position in the first embodiment of the present invention.

FIG. 2 is a diagram showing a focus position of a laser beam emitted by the optical head 2 (i.e., a laser condensed position on a recording/reproduction surface of the optical disk 1). In FIG. 2, the optical head 2 includes a semiconductor laser 2-1 and an objective lens 2-2, and a laser beam emitted by the semiconductor laser 2-1 is condensed on the recording/reproduction surface of the optical disk 1 through the objective lens 2-2 to become a light spot. The position of the light spot (z-direction) with respect to the recording/reproduction surface of the optical disk 1 is the focus position. The focus position is changed by moving the optical head 2.

The optical head 2 is moved by an actuator (not shown). The focus position controller 7 controls the actuator of the optical head 2, thereby changing the focus position.

Figure 3:
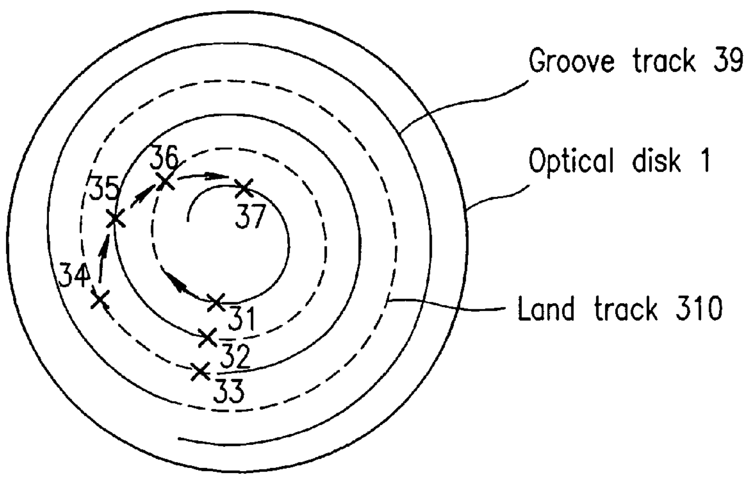
FIG. 3 is a diagram showing a track structure of an optical disk in the first embodiment of the present invention.

FIG. 3 is a diagram showing a track structure of the optical disk 1 in the present embodiment. The optical disk 1 records a signal in both groove-shaped tracks (groove tracks) 39 and tracks 310 between the grooves (land tracks). The groove tracks 39 and the land tracks 310 are continued alternatively every one track. The groove tracks 39 and the land tracks 310 are connected to each other in the shape of a spiral.

Figure 5:
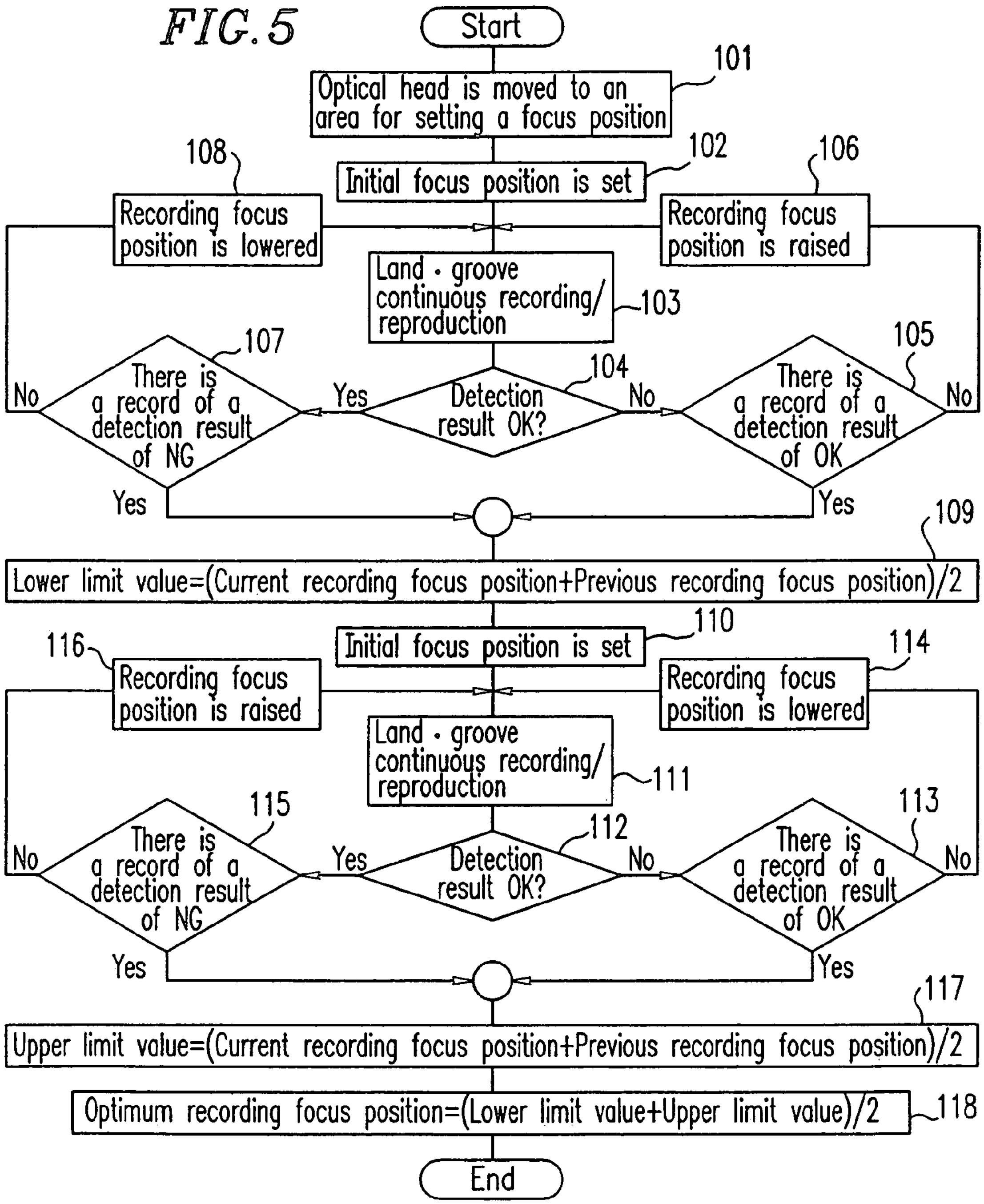
FIG. 5 is a flow chart showing process steps for determining an optimum recording focus position in the first embodiment of the present invention.

FIG. 5 is a flow chart showing process steps of an optical disk apparatus in the present embodiment. Hereinafter, a procedure for obtaining a recording focus position will be described with reference to this flow chart.

In a phase-change type optical disk apparatus, focus positions to be determined include at least a recording focus position and a reproduction focus position. First, a method for determining the recording focus position will be described, and a method for determining a reproduction focus position will be described later.

The optical disk 1 is loaded in an optical disk apparatus. Predetermined operations such as identifying a disk type and a rotation control are performed. Thereafter, the optical head 2 is moved to an area for setting an optimum recording focus position and an optimum reproduction focus position by the track position controller 8 (Step 101).

Initial values of the recording focus position and the reproduction focus position are set by the focus position setting unit 9 (Step 102). At this time, a recording focus position for recording the land track is identical with a recording focus position for recording the groove track.

Subsequently, a control signal for continuously recording one land track and one groove track from a predetermined position is transmitted from the land•groove continuous recording/reproduction unit 6 to the focus position controller 7 and the track position controller 8, whereby recording is performed by the optical head 2. At this time, output light from the semiconductor laser 2-1 of the optical head 2 is condensed at a recording focus position as a light spot on the optical disk 1, whereby a recording mark is formed in accordance with a waveform of emitted light (Step 103).

After the continuous recording of the land track and the groove track is completed, output light from the semiconductor laser 2-1 of the optical head 2 is condensed at a reproduction focus position (identical with the recording focus position). A signal for continuously reproducing one land track and one groove track previously recorded is transmitted from the land•groove continuous recording/reproduction unit 6 to the track position controller 8, and a signal 10 which is varied depending upon the presence of the recording mark on the optical disk 1 is input from the optical head 2 to the reproduction system 3 as a reproduction signal. The reproduction signal 10 is subjected to reproduction signal processing such as amplification, waveform equalization, and digitization at the reproduction system 3, and a signal 11 is input to the reproduction signal quality detector 4 (Step 103).

The reproduction signal quality detector 4 detects a signal quality of the signal 11, and a detection result of the reproduction signal quality is input to the optimum focus position determination unit 5. When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when recording is performed at the recording focus position (Step 104).

Figure 4A:
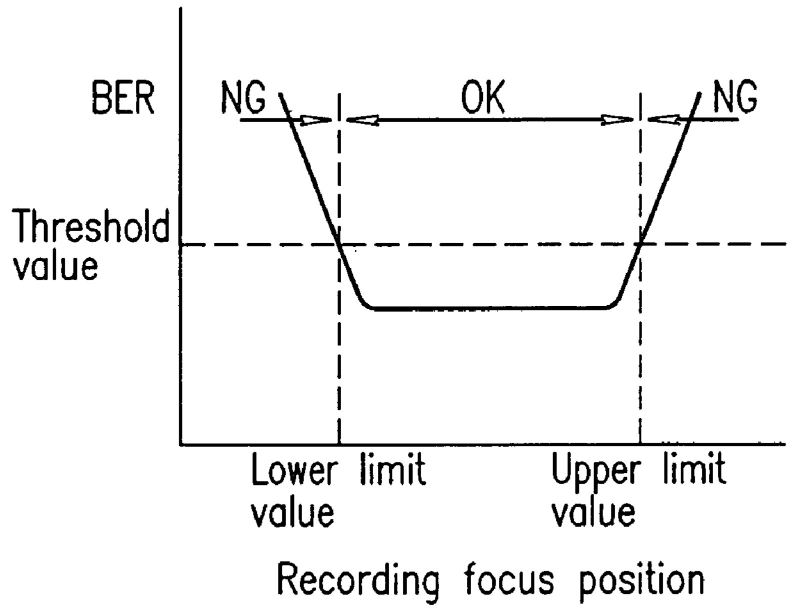
FIG. 4A is a graph showing a relationship between the recording focus position and the BER.

The reproduction signal quality detector 4 detects, for example, a BER (byte error rate) at which the recorded signal has been reproduced. FIG. 4A shows a relationship between the recording focus position and the BER.

In FIG. 4A, the abscissa represents the recording focus position, and the ordinate represents the BER. In general, under the same reproduction conditions, more accurate recording and reproduction are performed with a smaller BER. It is assumed that a detection result in which the BER becomes a threshold value or less is OK, and a detection result in which the BER exceeds the threshold value is NG.

When the first result of the reproduction signal quality detector 4 is NG, for example, (Step 104 no, Step 105 no), the optimum focus position determination unit 5 sets a recording focus position higher than the initial recording focus position (Step 106). When the first result of the reproduction signal quality detector 4 is OK, for example, (Step 104 yes, Step 107 no), the optimum focus position determination unit 5 sets a recording focus position lower than the initial recording focus position (Step 108). Continuous recording and continuous reproduction of the land track and the groove track at the set recording focus position are performed in the same manner as described above (Step 103).

When the first result of the reproduction signal quality detector 4 is NG, and the second result thereof is OK (Step 104 yes, Step 107 yes), the optimum focus position determination unit 5 stores an average position of the current recording focus position and the previous recording focus position as a lower limit value of the recording focus position (Step 109).

When the first result of the reproduction signal quality detector 4 is OK, and the second result thereof is NG (Step 104 no, step 105 yes), the optimum focus position determination unit 5 stores an average position of the current recording focus position and the previous recording focus position as a lower limit value of the recording focus position (step 109).

When the first result of the reproduction signal quality detector 4 is OK, and the second result thereof is OK, the optimum focus position determination unit 5 sets a recording focus position lower than the recording focus position recorded and reproduced at the second time, and continuous recording and continuous reproduction of the land track and the groove track are performed at the set recording focus position, whereby a reproduction signal quality is detected. When the third result of the reproduction signal quality detector 4 is NG, the optimum focus position determination unit 5 stores an average position of the current recording focus position and the previous recording focus position as a lower limit value of the recording focus position.

An upper limit value is obtained in a similar procedure to that of the lower limit value in accordance with each of Steps 110 to 117. More specifically, every time the result of the reproduction signal quality detector 4 in OK, the recording focus position is gradually raised. When the result of the reproduction signal quality detector 4 becomes NG, the optimum focus position determination unit 5 stores an average position of the current recording focus position and the previous recording focus position as an upper limit value of the recording focus position.

The optimum focus position determination unit 5 determines an average value of the lower limit value and the upper limit value, for example, as the optimum recording focus position (Step 118). The optimum recording focus position is set by the focus position setting unit 9, when data is recorded onto the optical disk.

Now, referring to FIG. 3, a series of steps for performing continuous recording of the land track and the groove track, performing continuous reproduction of the land track and the groove track at a reproduction focus position, and outputting a result by the reproduction signal quality detector 4 will be described by using a path on a recording track of an irradiation spot of the semiconductor laser.

Actually, a track is moved on an irradiation spot by the rotation of a disk. However, for simplicity, it is assumed that an irradiation spot moves on a recording track.

As shown in FIG. 3, recording of a land track is performed clockwise from a point 31 to a point 32 at a set recording focus position. Continuously, recording of a groove track is performed clockwise from a point 32 to a point 33 at the same recording focus position.

Next, in order to reproduce a signal, the irradiation spot jumps, for example, from a point 34 to an inner track, passing through points 35 and 36, and starts moving on a track from a point 37. The irradiation spot moves on the groove track clockwise from the point 37 to the point 31, and reproduces the land track from the point 31 to the point 32 and reproduces the groove track from the point 32 to the point 33, thereby detecting an average reproduction signal quality of the land track and the groove track.

In order to obtain an optimum recording focus position, the recording focus position is gradually changed, and every time the recording focus position is changed, the above-mentioned recording and reproduction are repeated, whereby a recording focus position at which a reproduction signal of the highest quality is obtained.

As described above, in order to obtain an optimum recording focus position, the land track and the groove track are recorded and reproduced by an equal or almost equal length, whereby an average characteristic of the land track and the groove track is obtained with respect to a recording focus position, and a recording focus position suitable for the land track and the groove track is determined.

Furthermore, in the present embodiment, recording and reproduction of the land track and the groove track are continuously performed. Therefore, it takes less time, compared with the case where optimum recording focus positions are obtained for the land track and the groove track, separately, and the obtained optimum recording focus positions are averaged.

For example, when a land track is recorded once and a groove track is recorded once in order to obtain an optimum recording focus position, in the case where the land track and the groove track are continuously recorded and reproduced as in the present embodiment, a time corresponding to 5 rotations in total is required (i.e., 2 rotations for recording (point 31 to point 33), one rotation for waiting for reproduction (point 34→point 35→point 36→point 37), and 2 rotations for reproduction (point 31 to point 33)).

On the other hand, in a conventional apparatus, optimum recording focus positions are obtained for a land track and a groove track, separately, so that a time corresponding to 3 rotations in total is required for the land track (i.e., one rotation for recording (point 21 to point 22), one rotation for waiting for reproduction (point 23→point 24→point 25) and one rotation for reproduction (point 21 to point 22)). Furthermore, the same amount of time is required for the groove track. Thus, a time corresponding to 6 rotations in total is required.

Assuming that the land track and the groove track are recorded at 4 kinds of recording focus positions so as to obtain an optimum recording focus position, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum recording focus position, whereby an optimum recording focus position can be determined in a short period of time, shortening a waiting time for rotation.

Next, a procedure for obtaining a reproduction focus position will be described with reference to a flow chart of FIG. 6.

In the present embodiment, in order to obtain an optimum value of a reproduction focus position, a lower limit value and an upper limit value of the reproduction focus position are obtained, and thereafter, an optimum value between the lower limit value and the upper limit value is obtained by computation.

First, the optical head 2 is moved to an area for setting an optimum recording focus position and an optimum reproduction focus position (Step 201). Then, the focus position determination unit 9 sets initial values of a recording focus position and a reproduction focus position for obtaining, for example, a lower limit value of the reproduction focus position (Step 202). At this time, a reproduction focus position for reproducing a land track is identical with a reproduction focus position for reproducing a groove track.

Here, it is assumed that the recording focus position is fixed so as to examine effects of the reproduction focus position under the same recording conditions.

Subsequently, a control signal for continuously recording one land track and one groove track from a predetermined position is transmitted from the land groove continuous recording/reproduction unit 6 to the focus position controller 7 and the track position controller 8, whereby recording is performed by the optical head 2. At this time, output light from the semiconductor laser 2-1 of the optical head 2 is condensed at a recording focus position as a light spot on the optical disk 1, whereby a recording mark is formed in accordance with a waveform of emitted light (Step 203).

After the continuous recording of the land track and the groove track is completed, output light from the semiconductor laser 2-1 of the optical head 2 is condensed at a reproduction focus position. A signal for continuously reproducing one land track and one groove track previously recorded is transmitted from the land groove continuous recording/reproduction unit 6 to the track position controller 8, and a signal 10 which is varied depending upon the presence of the recording mark on the optical disk 1 is input from the optical head 2 to the reproduction system 3 as a reproduction signal. The reproduction signal 10 is subjected to reproduction signal processing such as amplification, waveform equalization, and digitization at the reproduction system 3, and a signal 11 is input to the reproduction signal quality detector 4 (Step 203).

Figure 4B:
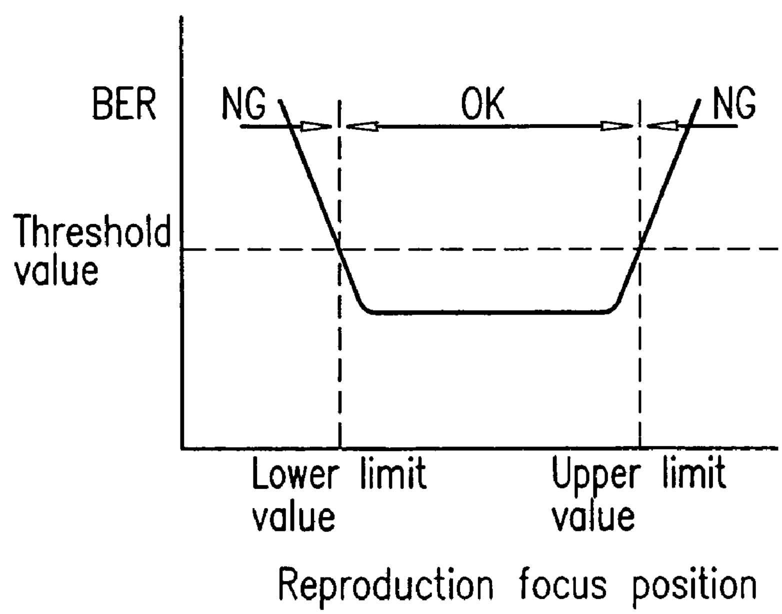
FIG. 4B is a graph showing a relationship between the reproduction focus position and the BER.

The land•groove reproduction signal quality detector 4 detects, for example, a BER at which the recorded signal has been reproduced. FIG. 4B shows a relationship between the reproduction focus position and the BER.

In FIG. 4B, the abscissa represents the reproduction focus position, and the ordinate represents the BER. In general, under the same reproduction conditions, more accurate recording and reproduction are performed with a smaller BER. It is assumed that a detection result in which the BER becomes a threshold value or less in OK, and a detection result in which the BER exceeds the threshold value is NG.

The reproduction signal quality detector 4 detects a signal quality of the signal 11, and a detection result of the reproduction signal quality is input to the optimum focus position determination unit 5. When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when reproduction is performed at the reproducing focus position (Step 204).

When the first result of the reproduction signal quality detector 4 is NG, for example, (Step 204 no, Step 205 no), the optimum focus position determination unit 5 sets a reproduction focus position higher than the initial reproduction focus position (Step 206). When the first result of the reproduction signal quality detector 4 is OK, for example, (Step 204 yes, Step 207 no), the optimum focus position determination unit 5 sets a reproduction focus position lower than the initial reproduction focus position (Step 208). Continuous recording and continuous reproduction of the land track and the groove track at the set reproduction focus position are performed in the same manner as described above (Step 203).

When the first result of the reproduction signal quality detector 4 is NG, and the second result thereof is OK (Step 204 yes, Step 207 yes), the optimum focus position determination unit 5 stores an average position of the current reproduction focus position and the previous reproduction focus position as a lower limit value of the reproduction focus position (Step 209).

When the first result of the reproduction signal quality detector 4 is OK, and the second result thereof is NG (Step 204 no, Step 205 yes), the optimum focus position determination unit 5 stores an average position of the current reproduction focus position and the previous reproduction focus position as a lower limit value of the reproduction focus position (Step 209).

When the first result of the reproduction signal quality detector 4 is OK, and the second result thereof is OK, the optimum focus position determination unit 5 sets a reproduction focus position lower than the reproduction focus position recorded and reproduced at the second time, and continuous recording and continuous reproduction of the land track and the groove track are performed at the set reproduction focus position, whereby a reproduction signal quality is detected. When the third result of the reproduction signal quality detector 4 is NG, the optimum focus position determination unit 5 stores an average position of the current reproduction focus position and the previous reproduction focus position as a lower limit value of the reproduction focus position.

An upper limit value is obtained in a similar procedure to that of the lower limit value in accordance with each of Steps 210 to 217. More specifically, every time the result of the reproduction signal quality detector 4 is OK, the reproduction focus position is gradually raised. When the result of the reproduction signal quality detector 4 becomes NG, the optimum focus position determination unit 5 stores an average position of the current reproduction focus position and the previous reproduction focus position as an upper limit value of the reproduction focus position.

The optimum focus position determination unit 5 determines an average value of the lower limit value and the upper limit value, for example, as the optimum reproduction focus position (Step 218). The optimum reproduction focus position is set by the focus position setting unit 9, when data is reproduced from the optical disk 1.

When the lower limit value and the upper limit value are obtained, the initial value of the reproduction focus position for obtaining the upper limit value is prescribed to be higher than that of the reproduction focus position for obtaining the lower limit value. More specifically, by starting from the values close to the respective limit values, with the initial value of the reproduction focus position for obtaining the lower limit value being different from the initial value of the reproduction focus position for obtaining the upper limit value, a reproduction focus position is optimized in a short period of time.

In the present embodiment, an average value of the lower limit value and the upper limit value is determined as an optimum reproduction focus position. However, in the case where an effective reproduction focus position is likely to become much lower than the set reproduction focus position, for example, due to the warpage and/or reflectivity of a disk, a value which divides the lower limit value and the upper limit value, for example, in a ratio of 2:1 may be determined as the optimum reproduction focus position. By determining the value which divides the lower limit value and the upper limit value in a ratio of 2:1 as the optimum reproduction focus position, a tolerance for the lower reproduction focus position side becomes large.

The reproduction signal quality detector 4 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum reproduction focus position can be determined more accurately.

Furthermore, the reproduction signal quality detector 4 is designed to detect a BER at which a recorded signal has been reproduced. However, the reproduction signal quality detector 4 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, it may be possible that one block of a land track from a point 141 to a point 142 and one block of a groove track from a point 142 to a point 143 are continuously recorded, and the land track from the point 141 to the point 142 and the groove track from the point 142 to the point 143 are continuously reproduced, as shown in FIG. 7.

Figure 7:
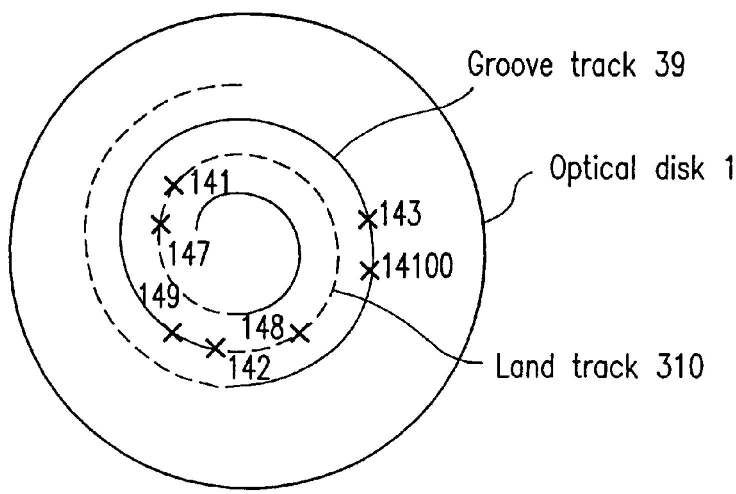
FIG. 7 is a diagram illustrating a procedure for scanning tracks of the optical disk in the first embodiment of the present invention.

Similarly, in an optical disk apparatus which performs recording on a block basis, it may be possible that one block of a land track from a point 147 to a point 148 and one block of a groove track from a point 149 to a point 14100 are continuously recorded, and the land track from the point 147 to the point 148 and the groove track from the point 149 to the point 14100 are continuously reproduced, as shown in FIG. 7. Thus, as long as a land track and a groove track are recorded continuously before reproduction for detecting a reproduction signal quality, recording may be started at any point.

Figure 8:
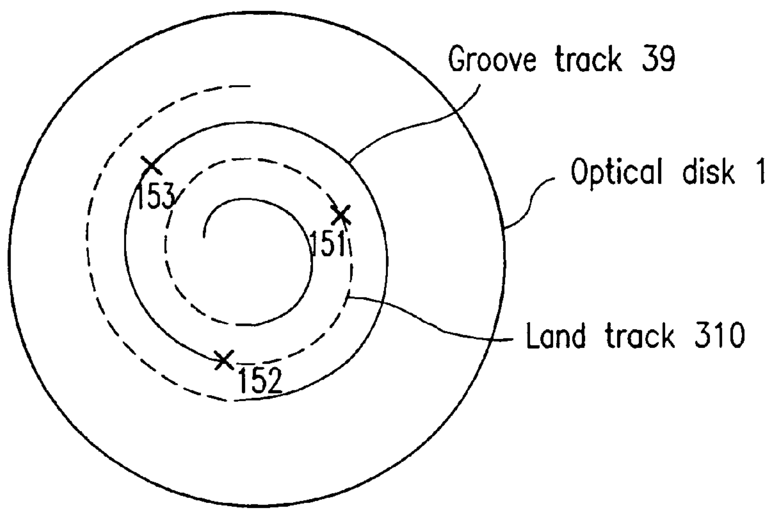
FIG. 8 is a diagram illustrating another procedure for scanning tracks of the optical disk in the first embodiment of the present invention.

In particular, assuming that one half of one block is a land track, and the other half of one block is a groove track (in FIG. 8, when one block contains 16 sectors, a zone from a point 151 to a point 152 corresponds to 8 sectors of the land track, and a zone from the point 152 to the point 153 corresponds to 8 sectors of the groove track), as shown in FIG. 8, in the case of performing recording on a block basis, one block corresponds to one track or less, and two blocks correspond to one track or more. In this case, a waiting time for rotation can be shortened, compared with the case where one land track and one groove track are continuously recorded and reproduced. Furthermore, deterioration due to repeated recording can be delayed by a decrease in the area which is continuously recorded at any one time.

Figure 9:
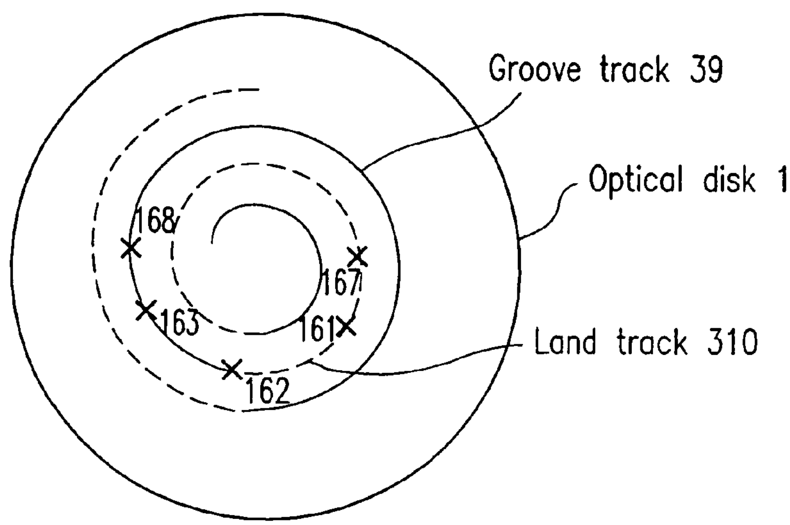
FIG. 9 is a diagram illustrating another procedure for scanning tracks of the optical disk in the first embodiment of the present invention.

Similarly, in the present embodiment, one land track and one groove track are continuously recorded and reproduced. However, in the case where an optical disk apparatus performs recording on a sector basis, it may be possible that a sector of a land track from a point 161 to a point 162 and a sector of a groove track from a point 162 to a point 163 are continuously recorded, and a sector of a land track from the point 161 to the point 162 and a sector of the groove track from the point 162 to the point 163 are continuously reproduced, as shown in FIG. 9.

Similarly, in the case where recording is performed on a sector basis, it may be possible that a sector of a land track from a point 167 to the point 161 and a sector of a groove track from the point 163 to a point 168 are continuously recorded, and a sector of a land track from the point 167 to the point 161 and a sector of a groove track from the point 163 to the point 168 are continuously reproduced. Thus, as long as a land track and a groove track are recorded continuously before reproduction for detecting a reproduction signal quality, recording may be started at any point.

If recording and reproduction are performed on a sector basis, an area to be continuously recorded and reproduced may be one track or less. Therefore, a waiting time for rotation can be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks of both the tracks, the variation of the tracks is absorbed, and optimum recording and reproduction focus positions can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and optimum recording and reproduction focus positions can be determined more accurately.

Furthermore, if the worst value of a block detected by the reproduction signal quality detector 4 is not adopted when two or more blocks are continuously recorded and reproduced, even when a block with a recording defect such as a scratch is present, the block can be eliminated. Thus, optimum recording and reproduction focus positions can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and optimum recording and reproduction focus positions can be determined more accurately.

Furthermore, if the worst value of a sector detected by the reproduction signal quality detector 4 is not adopted when two or more sectors are continuously recorded and reproduced, even when a sector with a recording defect such as a scratch is present, the sector can be eliminated. Thus, optimum recording and reproduction focus positions can be determined more accurately.

Embodiment 2

In the second embodiment, the steps of obtaining a recording focus position and a reproduction focus position are different from those in the first embodiment.

Figure 10:
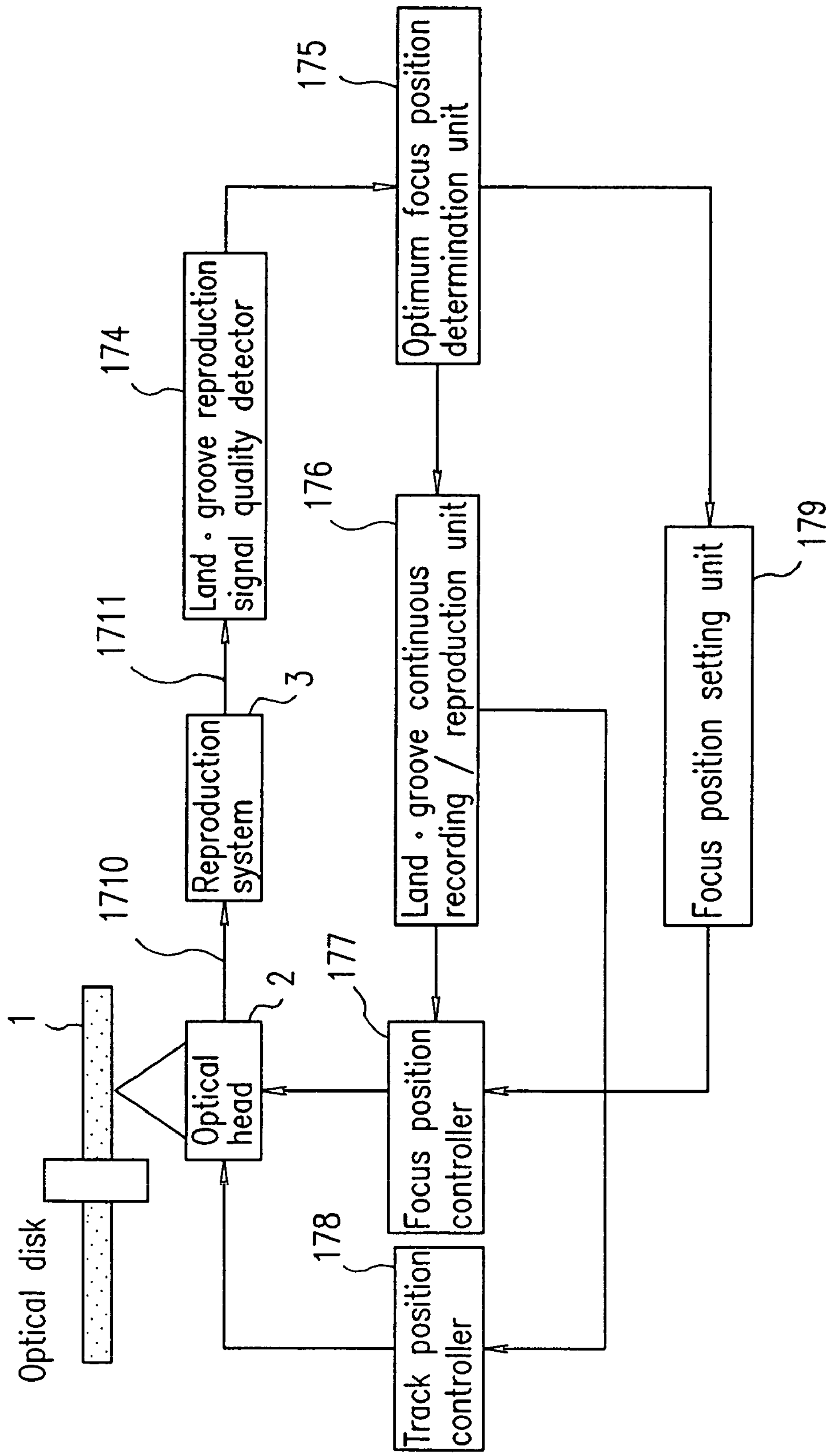
FIG. 10 is a block diagram showing the second embodiment of an optical disk apparatus according to the present invention.

FIG. 10 shows a structure of a phase-change type optical disk apparatus in the second embodiment of the present invention. In FIG. 10, reference numeral 1 denotes an optical disk, 2 denotes an optical head, 3 denotes a reproduction system, 174 denotes a land•groove reproduction signal quality detector, 175 denotes a land•groove optimum focus position determination unit, 176 denotes a land•groove continuous recording/reproduction unit, 177 denotes a focus position controller, 178 denotes a track position controller, and 179 denotes a focus position setting unit.

The optical disk 1 is as described with reference to FIG. 3.

Figure 11:
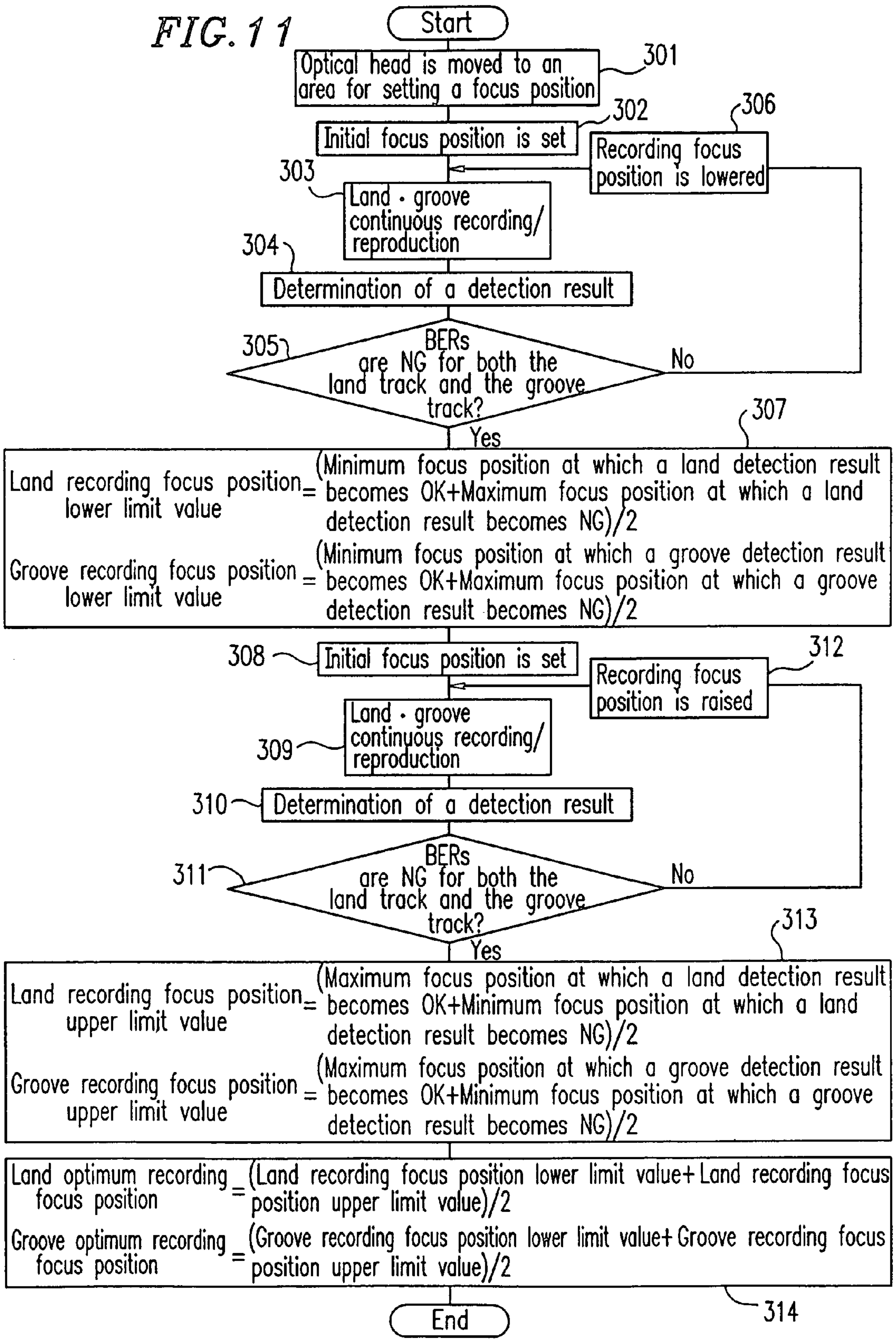
FIG. 11 is a flow chart showing process steps for determining an optimum recording focus position in the second embodiment of the present invention.

FIG. 11 is a flow chart showing process steps of an optical disk apparatus in the present embodiment. Hereinafter, a procedure for obtaining a recording focus position will be described with reference to this flow chart.

In a phase-change type optical disk apparatus, focus positions to be determined include at least a recording focus position and a reproduction focus position. First, a method for determining the recording focus position will be described, and a method for determining a reproduction focus position will be described later.

The optical disk 1 is loaded in an optical disk apparatus. Predetermined operations such as identifying a disk type and a rotation control are performed. Thereafter, the optical head 2 is moved to an area for setting an optimum recording focus position and an optimum reproduction focus position by the track position controller 178 (Step 301).

Initial values of the recording focus position and the reproduction focus position for obtaining a lower limit value of a reproduction focus position are set by the focus position setting unit 179 (Step 302). At this time, a recording focus position for recording the land track is identical with a recording focus position for recording the groove track.

Subsequently, a control signal for continuously recording one land track and one groove track from a predetermined position is transmitted from the land•groove continuous recording/reproduction unit 176 to the focus position controller 177 and the track position controller 178, whereby recording is performed by the optical head 2. At this time, output light of the optical head 2 is condensed as a light spot on the optical disk 1, whereby a recording mark is formed in accordance with a waveform of emitted light (Step 303).

After the continuous recording of the land track and the groove track is completed, output light from the semiconductor laser of the optical head 2 is condensed at a reproduction focus position. A signal for continuously reproducing one land track and one groove track previously recorded is transmitted from the land•groove continuous recording/reproduction unit 176 to the track position controller 178, and a signal 1710 which is varied depending upon the presence of the recording mark on the optical disk 1 is input from the optical head 2 to the reproduction system 3 as a reproduction signal. The reproduction signal 1710 is subjected to a reproduction signal processing such as amplification, waveform equalization, and digitization at the reproduction system 3, and a signal 1711 is input to the land•groove reproduction signal quality detector 174 (Step 303).

The land•groove reproduction signal quality detector 174 detects a signal quality of the signal 1711 for a land track and a groove track, separately, and a detection result of the reproduction signal quality is input to the land•groove optimum focus position determination unit 175 (Step 304).

The reproduction signal quality detector 174 detects, for example, a BER at which the recorded signal has been reproduced.

For example, when BERs are not NG for both the land track and the groove track, as a detection result of the reproduction signal quality detector 174 (Step 305 no), the land•groove optimum focus position determination unit 175 sets a recording focus position at which BERs become OK for both the land track and the groove track as an initial recording focus position (Step 306). While the recording focus position is gradually lowered, continuous recording and continuous reproduction of the land track and the groove track are performed at each time, and results of the land groove reproduction signal quality detector 174 at the respective recording focus positions are stored. When BERs become NG for both the land track and the groove track (Step 305 yes), an average recording focus position of a minimum recording focus position at which the BER is OK and a maximum recording focus position at which the BER is NG is obtained for the land track and the groove track, respectively, and each average recording focus position is stored as a lower limit value of the recording focus position (Step 307).

An upper limit value is obtained in a similar procedure to that of the lower limit value in accordance with each of Steps 308 to 313. More specifically, the land•groove optimum focus position determination unit 175 sets a recording focus position at which BERs become OK for both the land track and the groove track as an initial recording focus position (Step 308). While the recording focus position is gradually raised, continuous recording and continuous reproduction of the land track and the groove track are performed at each time. When BERs become NG for both the land track and the groove track as a result of the land•groove reproduction signal quality detector 174 (Step 311 yes), an average recording focus position of a maximum recording focus position at which the BER is OK and a minimum recording focus position at which the BER is NG is obtained for the land track and the groove track, respectively, and each average recording focus position is stored as an upper limit value of the recording focus position (Step 313).

The land•groove optimum focus position determination unit 175 determines, for example, an average value of the lower limit value and the upper limit value as an optimum recording focus position (Step 314).

When the lower limit value and the upper limit value are obtained, the initial value of the recording focus position for obtaining the upper limit value is prescribed to be higher than that of the recording focus position for obtaining the lower limit value. More specifically, by starting from the values close to the respective limit values, with the initial value of the recording focus position for obtaining the lower limit value being different from the initial value of the recording focus position for obtaining the upper limit value, a recording focus position is optimized in a short period of time.

In the present embodiment, an average value of the lower limit value and the upper limit value is determined as an optimum reproduction focus position. However, in the case where an effective reproduction focus position is likely to become much lower than the set optimum reproduction focus position, for example, due to the groove shape and/or reflectivity of a disk, a value which divides the lower limit value and the upper limit value, for example, in a ratio of 2:1 may be determined as the optimum reproduction focus position. By determining the value which divides the lower limit value and the upper limit value in a ratio of 2:1 as the optimum reproduction focus position, a tolerance for the lower reproduction focus position side becomes large.

In the present embodiment, a movement path of a light spot on the optical disk 1 is similar to that of the first embodiment, which has been described with reference to FIG. 3.

In the present embodiment, recording and reproduction of the land track and the groove track are continuously performed. Therefore, it takes less time, compared with the case where optimum recording focus positions are obtained for the land track and the groove track separately.

For example, when a land track is recorded once and a groove track is recorded once in order to obtain an optimum recording focus position, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in a conventional apparatus, optimum recording focus positions are obtained for a land track and a groove track, separately, so that a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 kinds of recording focus positions so as to obtain an optimum recording focus position, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum recording focus position, whereby an optimum recording focus position can be determined in a short period of time, shortening a waiting time for rotation.

Figure 12:
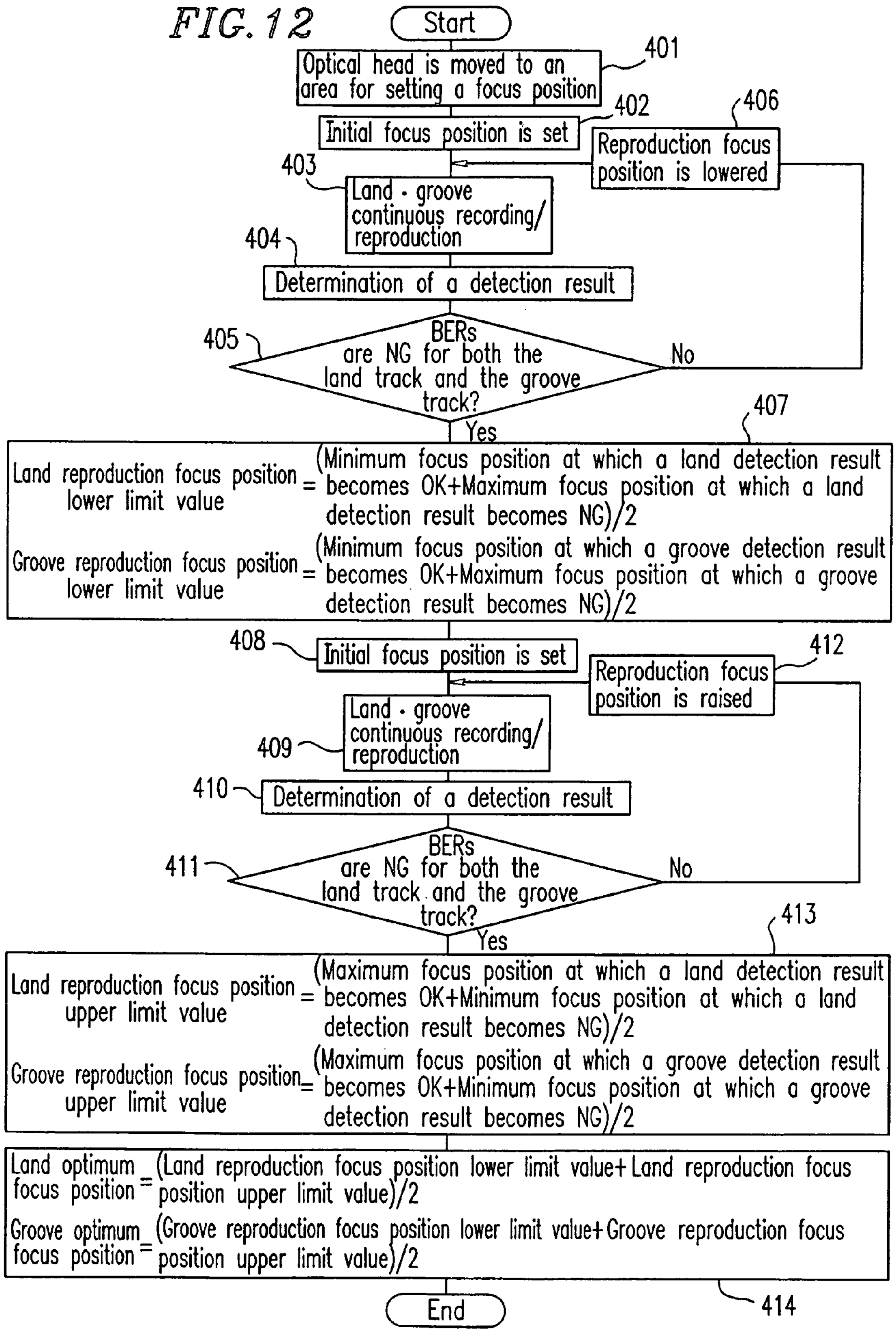
FIG. 12 is a flow chart showing process steps for determining an optimum reproduction focus position in the second embodiment of the present invention.

Next, a procedure for obtaining a reproduction focus position will be described with reference to a flow chart of FIG. 12.

In the present embodiment, in order to obtain an optimum value of a reproduction focus position, a lower limit value and an upper limit value of the reproduction focus position are obtained, and thereafter, an optimum value between the lower limit value and the upper limit value is obtained by computation.

First, the optical head 2 is moved to an area for setting an optimum recording focus position and an optimum reproduction focus position (Step 401). Then, the focus-position setting unit 179 sets initial values of a recording focus position and a reproduction focus position for obtaining, for example, a lower limit value of the reproduction focus position (Step 402). At this time, a recording focus position for recording a land track is identical with a recording focus position for recording a groove track.

Subsequently, a control signal for continuously recording one land track and one groove track from a predetermined position is transmitted from the land•groove continuous recording/reproduction unit 175 to the focus position controller 177 and the track position controller 178, whereby recording is performed by the optical head 2. At this time, output light from the semiconductor laser of the optical head 2 is condensed as a light spot on the optical disk 1, whereby a recording mark is formed in accordance with a waveform of emitted light (Step 403).

After the continuous recording of the land track and the groove track is completed, output light from the semiconductor laser of the optical head 2 is condensed at a reproduction focus position. A signal for continuously reproducing one land track and one groove track previously recorded is transmitted from the land•groove continuous recording/reproduction unit 176 to the track position controller 178, and a signal 1710 which is varied depending upon the presence of the recording mark on the optical disk 1 is input from the optical head 2 to the reproduction system 3 as a reproduction signal. The reproduction signal 1710 is subjected to a reproduction signal processing such as amplification, waveform equalization, and digitization at the reproduction system 3, and a signal 1711 is input to the land•groove reproduction signal quality detector 174 (Step 403).

The land•groove reproduction signal quality detector 174 detects a signal quality of the signal 1711, and a detection result of the reproduction signal quality is input to the land•groove optimum focus position determination unit 175 (Step 404).

The land•groove reproduction signal quality detector 174 detects, for example, a BER at which the recorded signal has been reproduced.

For example, when BERs are not NG for both the land track and the groove track, as a detection result of the reproduction signal quality detector 174 (Step 405 no), the land•groove optimum focus position determination unit 175 sets a reproduction focus position at which BERs become OK for both the land track and the groove track as an initial reproduction focus position (Step 406). While the reproduction focus position is gradually lowered, continuous recording and continuous reproduction of the land track and the groove track are performed at each time, and results of the land•groove reproduction signal quality detector 174 at the respective reproduction focus positions are stored. When BERs become NG for both the land track and the groove track (Step 405 yes), an average reproduction focus position of a minimum reproduction focus position at which the BER is OK and a maximum reproduction focus position at which the BER is NG is obtained for the land track and the groove track, respectively, and each average reproduction focus position is stored as a lower limit value of the reproduction focus position (Step 407).

An upper limit value is obtained in a similar procedure to that of the lower limit value in accordance with each of Steps 408 to 413. More specifically, the land•groove optimum focus position determination unit 175 sets a reproduction focus position at which BERs become OK for both the land track and the groove track as an initial reproduction focus position (Step 408). While the reproduction focus position is gradually raised, continuous recording and continuous reproduction of the land track and the groove track are performed at each time. When BERs become NG for both the land track and the groove track as a result of the land•groove reproduction signal quality detector 174 (Step 411 yes), an average reproduction focus position of a maximum reproduction focus position at which the BER is OK and a minimum reproduction focus position at which the BER is NG is obtained for the land track and the groove track, respectively, and each average reproduction focus position is stored as an upper limit value of the reproduction focus position (Step 413).

The land•groove optimum focus position determination unit 175 determines, for example, an average value of the lower limit value and the upper limit value as an optimum reproduction focus position (Step 414).

When the lower limit value and the upper limit value are obtained, the initial value of the reproduction focus position for obtaining the upper limit value is prescribed to be higher than that of the reproduction focus position for obtaining the lower limit value. More specifically, by starting from the values close to the respective limit values, with the initial value of the reproduction focus position for obtaining the lower limit value being different from the initial value of the reproduction focus position for obtaining the upper limit value, a reproduction focus position is optimized in a short period of time.

In the present embodiment, an average value of the lower limit value and the upper limit value is determined as an optimum recording focus position. However, in the case where an effective recording focus position is likely to become much lower than the set optimum recording focus position, for example, due to the warpage and/or reflectivity of a disk, a value which divides the lower limit value and the upper limit value, for example, in a ratio of 2:1 may be determined as the optimum recording focus position. By determining the value which divides the lower limit value and the upper limit value in a ratio of 2:1 as the optimum recording focus position, a tolerance for the lower recording focus position side becomes large.

The land•groove reproduction signal quality detector 174 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum reproduction focus position can be determined more accurately.

Furthermore, the land•groove reproduction signal quality detector 174 is designed to detect a BER at which a recorded signal has been reproduced. However, the reproduction signal quality detector 174 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be continuously recorded and reproduced may be one track or less. Therefore, a waiting time for rotation can be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks of both tracks, the variation of the tracks is absorbed, and an optimum reproduction focus position can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and optimum recording and reproduction focus positions can be determined more accurately.

Furthermore, if the worst value of a block detected by the land•groove reproduction signal quality detector 174 is not adopted when two or more blocks are continuously recorded and reproduced, even when a block with a recording defect such as a scratch is present, the block can be eliminated. Thus, optimum recording and reproduction focus positions can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and optimum recording and reproduction focus positions can be determined more accurately.

Furthermore, if the worst value of a sector detected by the land•groove reproduction signal quality detector 174 is not adopted when two or more sectors are continuously recorded and reproduced, even when a sector with a recording defect such as a scratch is present, the sector can be eliminated. Thus, optimum recording and reproduction focus positions can be determined more accurately.

Embodiment 3

In a phase-change type optical disk apparatus of the third embodiment, a recording focus position and a reproduction focus position are determined for a groove track and a land track, separately.

Figure 13:
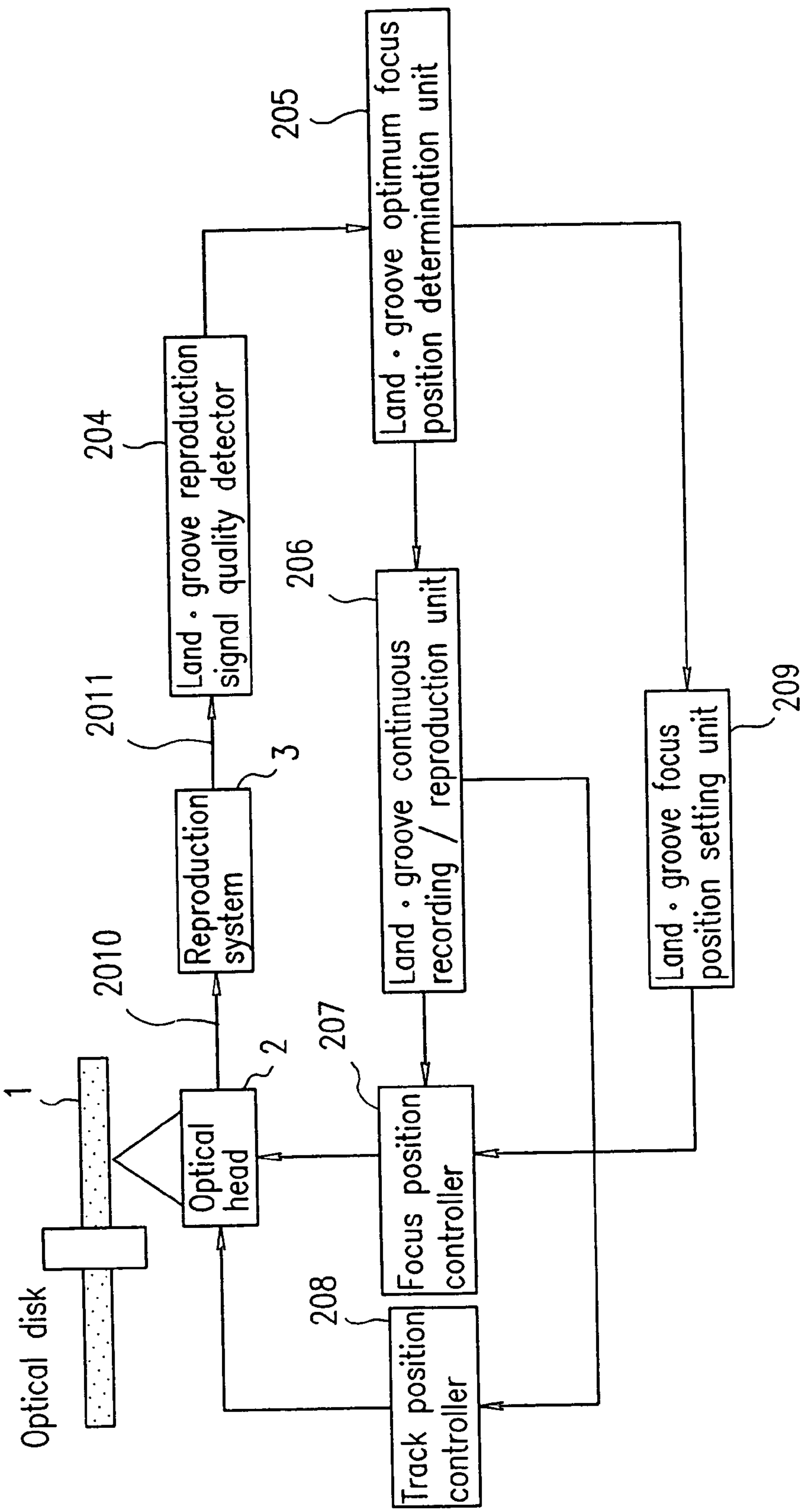
FIG. 13 is a block diagram showing the third embodiment of an optical disk apparatus according to the present invention.

FIG. 13 shows a structure of a phase-change type optical disk apparatus in the third embodiment of the present invention. In FIG. 13, reference numeral 1 denotes an optical disk, 2 denotes an optical head, 3 denotes a reproduction system, 204 denotes a land•groove reproduction signal quality detector, 205 denotes a land groove optimum focus position determination unit, 206 denotes a land•groove continuous recording/reproduction unit, 207 denotes a focus position controller, 208 denotes a track position controller, and 209 denotes a land•groove focus position setting unit.

The optical disk 1 is as described with reference to FIG. 3.

In the present embodiment, a method for determining a recording focus position for a groove track and a land track, separately, will be described, and thereafter, a method for determining a reproduction focus position for a groove track and a land track, separately, will be described.

The optical disk 1 is loaded in an optical disk apparatus. Predetermined operations such as identifying a disk type and a rotation control are performed. Thereafter, the optical head 2 is moved to an area for setting an optimum recording focus position and an optimum reproduction focus position by the track position controller 208.

Initial values of the recording focus position and the reproduction focus position are set in the focus position controller 207 by the land•groove focus position setting unit 209. At this time, a recording focus position for recording the land track is identical with a recording focus position for recording the groove track.

Subsequently, a control signal for continuously recording one land track and one groove track from a predetermined position is transmitted from the land•groove continuous recording/reproduction unit 206 to the focus position controller 207 and the track position controller 208, whereby recording is performed by the optical head 2. At this time, output light from a semiconductor laser of the optical head 2 is condensed as a light spot on the optical disk 1, whereby a recording mark is formed in accordance with a waveform of emitted light.

After the continuous recording of the land track and the groove track is completed, output light from the semiconductor laser of the optical head 2 is condensed at a reproduction focus position (equal to the initial recording focus position). A signal for continuously reproducing one land track and one groove track previously recorded is transmitted from the land•groove continuous recording/reproduction unit 206 to the track position controller 208, and a signal 2010 which is varied depending upon the presence of the recording mark on the optical disk 1 is input from the optical head 2 to the reproduction system 3 as a reproduction signal. The reproduction signal 2010 is subjected to a reproduction signal processing such as amplification, waveform equalization, and digitization at the reproduction system 3, and a signal 2011 is input to the land•groove reproduction signal quality detector 204.

The land•groove reproduction signal quality detector 204 detects a signal quality of the signal 2011, and a detection result of the reproduction signal quality is input to the land•groove optimum focus position determination unit 205.

The land•groove reproduction signal quality detector 204 detects a BER, for example, at which a recorded signal has been recorded.

Based on the detection result of the land•groove reproduction signal quality detector 204, each of Steps 103 to 108 in the flow chart of FIG. 5 is performed for the land track and the groove track, separately. Thus, the respective recording focus positions are set again. More specifically, every time a reproduction quality of the recorded signal is OK for the land track, the recording focus position is gradually lowered. When the reproduction quality becomes NG, an average recording focus position of the current recording focus position and the previous recording focus position is stored as a lower limit value of the recording focus position. A similar process is performed for the groove track, whereby a lower limit value of the recording focus position is stored.

For example, when the first result of the land•groove reproduction signal quality detector 204 is NG for the land track and OK for the groove track, the recording focus position of the land track is raised, and the recording focus position of the groove track is lowered. Therefore, during the second continuous recording and reproduction, the recording focus position for recording the land track becomes higher than the recording focus position for recording the groove track.

When the second result of the land•groove reproduction signal quality detector 204 is OK for the land track and NG for the groove track, the land•groove optimum focus position determination unit 205 determines an average recording focus position of the current recording focus position and the previous recording focus position for the land track and the groove track, separately, and stores these average recording focus positions as lower limit values of the recording focus positions for the land track and the groove track.

When the second result of the land groove reproduction signal quality detector 204 is OK for the land track and OK for the groove track, the land•groove optimum focus position determination unit 205 stores an average recording focus position of the current recording focus position and the previous recording focus position at which the land track has been recorded as a lower limit value of the recording focus position for the land track. Regarding the groove track, a recording focus position lower than the recording focus position at which the second recording has been performed is set, and the groove track is recorded at the set recording focus position, whereby a reproduction signal quality is detected.

When the third result of the land groove reproduction signal quality detector 204 is NG for the groove track, the land•groove optimum focus position determination unit 205 stores an average recording focus position of the current recording focus position and the previous recording focus position as a lower limit value of the recording focus position for the groove track.

Regarding the upper limit value, after Step 110 in the flow chart of FIG. 5, each of Steps 111 to 116 in the flow chart of FIG. 5 is performed for the land track and the groove track, separately. Thus, an upper limit value of the recording focus position for the land track is obtained and stored, and an upper limit value of the recording focus position for the groove track is obtained and stored.

The land•groove optimum focus position determination unit 205 obtains an average value of the upper limit value and the lower limit value for the land track and the groove track, separately, and determines these focus positions as the optimum recording focus positions for the land track and the groove track. The land•groove focus position setting unit 209 sets the optimum recording focus position for the land track when data is recorded in the land track, and sets the optimum recording focus position for the groove track when data is recorded in the groove track.

When the lower limit value and the upper limit value are obtained, the initial value of the recording focus position for obtaining the upper limit value is prescribed to be higher than that of the recording focus position for obtaining the lower limit value. More specifically, by starting from the values close to the respective limit values, with the initial value of the recording focus position for obtaining the lower limit value being different from the initial value of the recording focus position for obtaining the upper limit value, a recording focus position is optimized in a short period of time.

In the present embodiment, an average value of the lower limit value and the upper limit value is determined as an optimum recording focus position. However, in the case where an effective recording focus position is likely to become much lower than the set optimum recording focus position, for example, due to the groove shape and/or reflectivity of a disk, a value which divides the lower limit value and the upper limit value, for example, in a ratio of 2:1 may be determined as the optimum recording focus position. By determining the value which divides the lower limit value and the upper limit value in a ratio of 2:1 as the optimum recording focus position, a tolerance for the lower recording focus position side becomes large.

In the present embodiment, a movement path of a light spot on the optical disk 1 is similar to that of the first embodiment, which has been described with reference to FIG. 3.

In the present embodiment, recording and reproduction of the land track and the groove track are continuously performed. Therefore, it takes less time, compared with the case where optimum recording focus positions are obtained for the land track and the groove track, separately.

For example, when a land track is recorded once and a groove track is recorded once in order to obtain an optimum recording focus position, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in a conventional apparatus, optimum recording focus positions are obtained for a land track and a groove track, separately, so that a time corresponding to 3 rotations in total is required for the land track (i.e., one, rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 kinds of recording focus positions so as to obtain an optimum recording focus position, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum recording focus position, whereby an optimum recording focus position can be determined in a short period of time, shortening a waiting time for rotation.

Next, a procedure for obtaining a reproduction focus position for a groove track and a land track, separately, will be described.

In the present embodiment, in order to obtain an optimum value of a reproduction focus position, a lower limit value and an upper limit value of the reproduction focus position are obtained, and thereafter, an optimum value between the lower limit value and the upper limit value is obtained by computation.

First, initial values of a recording focus position and a reproduction focus position for obtaining, for example, a lower limit value of the reproduction focus position are set in the focus position controller 207 by the land•groove focus position setting unit 209. At this time, a recording focus position for recording a land track is identical with a recording focus position for recording a groove track.

Subsequently, a control signal for continuously recording one land track and one groove track from a predetermined position is transmitted from the land•groove continuous recording/reproduction unit 206 to the focus position controller 207 and the track position controller 208, whereby recording is performed by the optical head 2. At this time, output light from the semiconductor laser of the optical head 2 is condensed as a light spot on the optical disk 1, whereby a recording mark is formed in accordance with a waveform of emitted light.

After the continuous recording of the land track and the groove track is completed, output light from the semiconductor laser of the optical head 2 is condensed at a reproduction focus position. A signal for continuously reproducing one land track and one groove track previously recorded is transmitted from the land•groove continuous recording/reproduction unit 206 to the track position controller 208, and a signal 2010 which is varied depending upon the presence of the recording mark on the optical disk 1 is input from the optical head 2 to the reproduction system 3 as a reproduction signal. The reproduction signal 2010 is subjected to reproduction signal processing such as amplification, waveform equalization, and digitization at the reproduction system 3, and a signal 2011 is input to the land•groove reproduction signal quality detector 204.

The land•groove reproduction signal quality detector 204 detects a signal quality of the signal 2011, and a detection result of the reproduction signal quality is input to the land•groove optimum focus position determination unit 205.

The land•groove reproduction signal quality detector 204 detects a BER, for example, at which a recorded signal has been reproduced.

Figure 6:
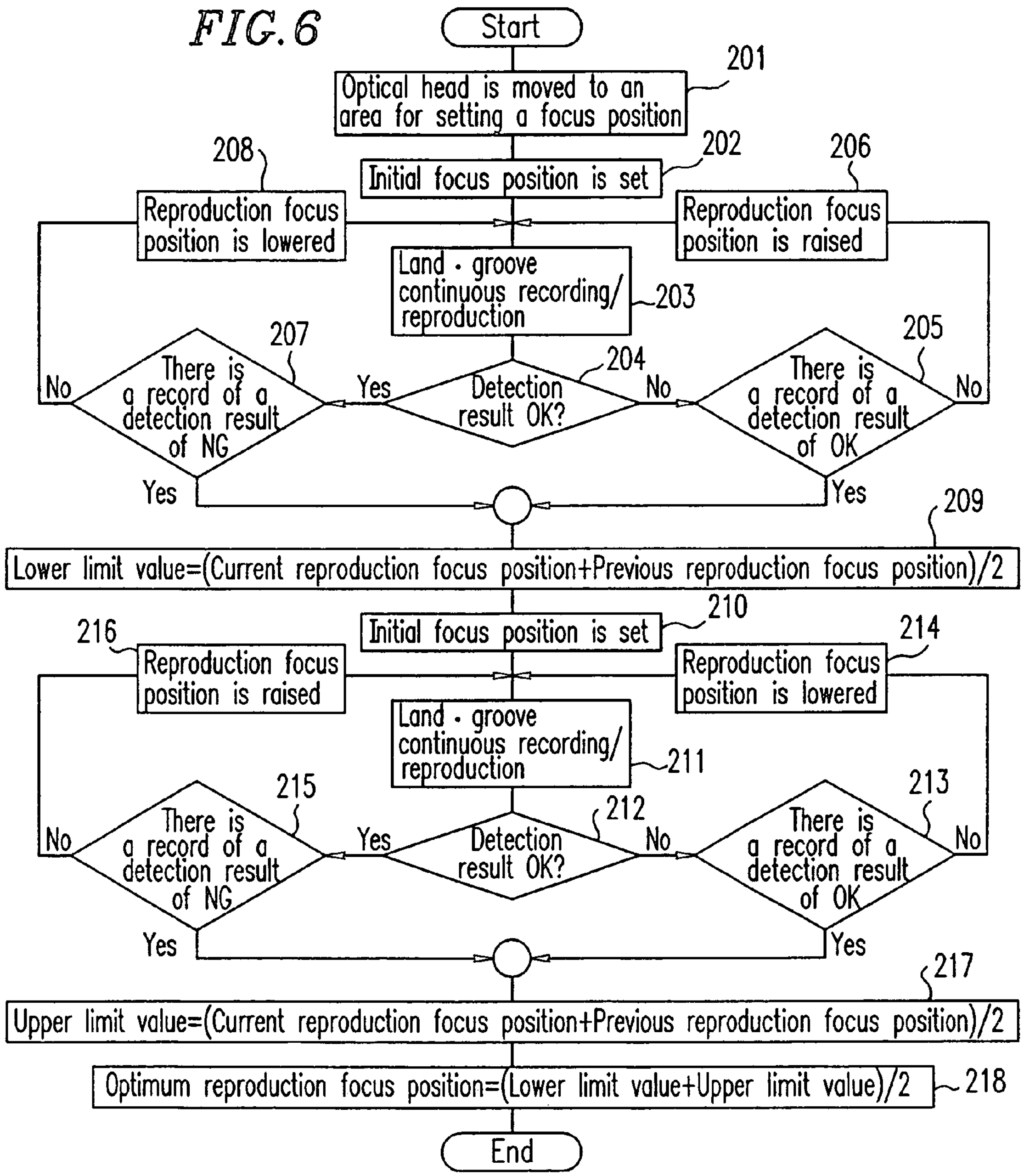
FIG. 6 is a flow chart showing process steps for determining an optimum reproduction focus position in the first embodiment of the present invention.

Based on the detection result of the land•groove reproduction signal quality detector 204, each of Steps 203 to 208 in the flow chart of FIG. 6 is performed for the land track and the groove track, separately. Thus, the respective reproduction focus positions are set again. More specifically, every time a reproduction quality of the recorded signal is OK for the land track, the reproduction focus position is gradually lowered. When the reproduction quality becomes NG, an average reproduction focus position of the current reproduction focus position and the previous reproduction focus position is stored as a lower limit value of the reproduction focus position. A similar process is performed for the groove track, whereby a lower limit value of the reproduction focus position is stored.

For example, when the first result of the land•groove reproduction signal quality detector 204 is NG for the land track and OK for the groove track, the reproduction focus position of the land track is raised, and the reproduction focus position of the groove track is lowered. Therefore, during the second continuous recording and reproduction, the reproduction focus position for reproducing the land track becomes higher than the reproduction focus position for reproducing the groove track.

When the second result of the land•groove reproduction signal quality detector 204 is OK for the land track and NG for the groove track, the land•groove optimum focus position determination unit 205 stores an average reproduction focus position of the current reproduction focus position and the previous reproduction focus position as a lower limit value of the reproduction focus position for the land track and the groove track.

When the second result of the land•groove reproduction signal quality detector 204 is OK for the land track and OK for the groove track, the land•groove optimum focus position determination unit 205 stores an average reproduction focus position of the current reproduction focus position and the previous reproduction focus position at which the land track has been reproduced as a lower limit value of the reproduction focus position for the land track. Regarding the groove track, a reproduction focus position lower than the reproduction focus position at which the second reproduction has been performed is set, and the groove track is recorded at the set reproduction focus position, whereby a reproduction signal quality is detected.

When the third result of the land•groove reproduction signal quality detector 204 is NG for the groove track, the land•groove optimum focus position determination unit 205 stores an average reproduction focus position of the current reproduction focus position and the previous reproduction focus position as a lower limit value of the reproduction focus position for the groove track.

Regarding the upper limit value, after Step 210 in the flow chart of FIG. 6, each of Steps 211 to 216 in the flow chart of FIG. 6 is performed for the land track and the groove track, separately. Thus, an upper limit value of the reproduction focus position for the land track is obtained and stored, and an upper limit value of the reproduction focus position for the groove track is obtained and stored.

The land•groove optimum focus position determination unit 205 obtains an average value of the upper limit value and the lower limit value for the land track and the groove track, separately, and determines these focus positions as the optimum reproduction focus positions for the land track and the groove track. The land•groove focus position setting unit 209 sets the optimum reproduction focus position for the land track when data is reproduced from the land track, and sets the optimum reproduction focus position for the groove track when data is reproduced from the groove track.

When the lower limit value and the upper limit value are obtained, the initial value of the reproduction focus position for obtaining the upper limit value is prescribed to be higher than that of the reproduction focus position for obtaining the lower limit value. More specifically, by starting from the values close to the respective limit values, with the initial value of the reproduction focus position for obtaining the lower limit value being different from the initial value of the reproduction focus position for obtaining the upper limit value, a reproduction focus position is optimized in a short period of time.

In the present embodiment, an average value of the lower limit value and the upper limit value is determined as an optimum reproduction focus position. However, in the case where an effective reproduction focus position is likely to become much lower than the set optimum reproduction focus position, for example, due to the warpage and/or reflectivity of a disk, a value which divides the lower limit value and the upper limit value, for example, in a ratio of 2:1 may be determined as the optimum reproduction focus position. By determining the value which divides the lower limit value and the upper limit value in a ratio of 2:1 as the optimum reproduction focus position, a tolerance for the lower reproduction focus position side becomes large.

The land•groove reproduction signal quality detector 204 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum reproduction focus position can be determined more accurately.

Furthermore, the land•groove reproduction signal quality detector 204 is designed to detect a BER at which a recorded signal has been reproduced. However, the reproduction signal quality detector 204 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be recorded and reproduced may be one track or less. Therefore, a waiting time for rotation can be shortened, compared with the case where one groove track and one land track are continuously recorded and reproduced. Furthermore, deterioration due to: repeated recording can be delayed by a decrease in area which is continuously recorded at any one time.

The following may be possible: when recording is performed on a sector basis, continuous recording of the land track and the groove track is performed while a recording focus position is gradually decreased, for example, on a sector basis; during the subsequent continuous reproduction, a reproduction signal quality of each sector of the land track and the groove track is detected; and a recording focus position obtained by adding a certain margin to an average recording focus position of the recording focus positions immediately before and after the detection result is changed from OK to NG is determined as an optimum recording focus position for the land track and the groove track, respectively.

Similarly, regarding determination of a reproduction focus position, the following may be possible: a land track and a groove track are continuously recorded while a reproduction focus position is gradually increased from a low reproduction focus position on a sector basis; during the subsequent continuous reproduction, a reproduction signal quality of each sector of the land track and the groove track is detected; and with an average reproduction focus position of the reproduction focus positions immediately before and after the detection result is changed from NG to OK being a lower limit value of the reproduction focus position and an average reproduction focus position of the reproduction focus positions immediately before and after the detection result is changed from OK to NG being an upper limit value of the reproduction focus position, an average reproduction focus position of the lower limit value and the upper limit value is determined as an optimum reproduction focus position.

As described above, by continuously performing recording and reproduction while recording and reproduction positions are changed on a sector basis, a reproduction signal quality result in a plurality of recording and reproduction focus positions is obtained for the land track and the groove track in one continuous recording and reproduction of the land track and the groove track, which is more effective. Furthermore, deterioration due to repeated recording can be delayed by a decrease in area which is continuously recorded for determining optimum recording and reproduction focus positions.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and optimum recording and reproduction focus positions can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and optimum recording and reproduction focus positions can be determined more accurately.

Furthermore, if the worst value of a block detected by the land•groove reproduction signal quality detector 204 is not adopted when two or more blocks are continuously recorded and reproduced, even when a block with a recording defect such as a scratch is present, the block can be eliminated. Thus, optimum recording and reproduction focus positions can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and optimum recording and reproduction focus positions can be determined more accurately.

Furthermore, if the worst value of a sector detected by the land•groove reproduction signal quality detector 204 is not adopted when two or more sectors are continuously recorded and reproduced, even when a sector with a recording defect such as a scratch is present, the sector can be eliminated. Thus, optimum recording and reproduction focus positions can be determined more accurately.

In the first, second, and third embodiments of the present invention, in order to detect a reproduction signal quality by the reproduction signal detectors 4, 174, and 204, a detection method based on a BER has been illustrated. Alternatively, the following other detection methods may be used.

Figure 14A:
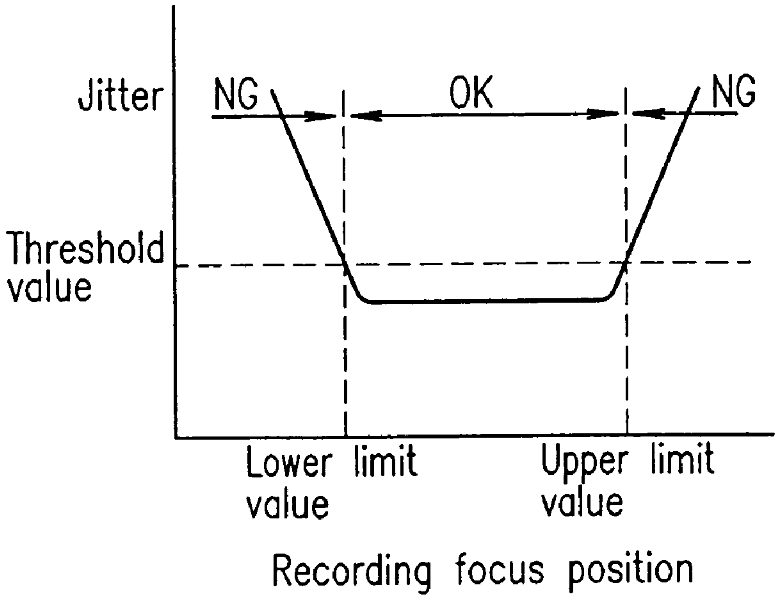
FIG. 14A is a graph showing a relationship between the recording focus position and the jitter.
Figure 14B:
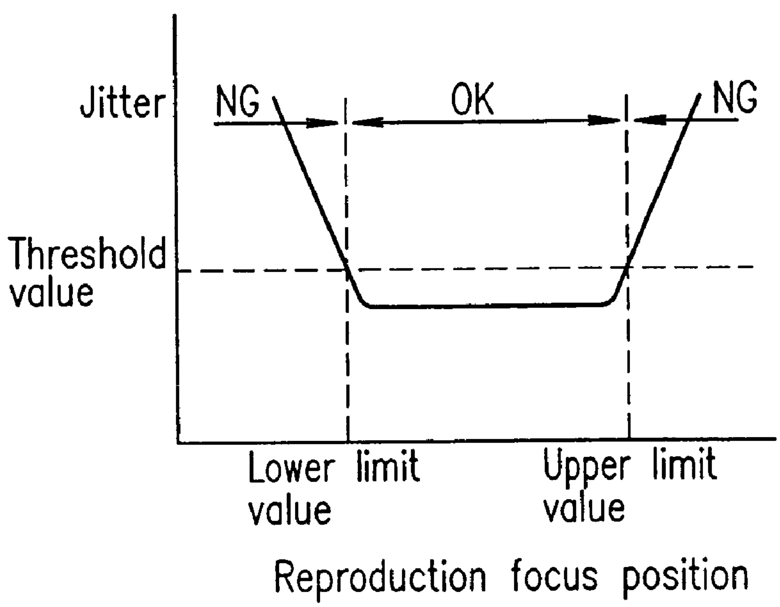
FIG. 14B is a graph showing a relationship between the reproduction focus position and the jitter.

As an example of the detection method, a method for detecting a jitter will be exemplified. FIG. 14A shows a relationship between the recording focus position and the jitter. In this figure, the abscissa represents the recording focus position, and the ordinate represents the jitter. FIG. 14B shows a relationship between the reproduction focus position and the jitter. In this figure, the abscissa represents the reproduction focus position, and the ordinate represents the jitter.

The jitter refers to a time shift between a reproduction signal and an original signal. The jitter occurs due to a decrease in a reproduction signal amplitude caused by a positional shift of a focus point of a laser beam and decreases with an increase in a reproduction signal amplitude. The jitter amount becomes almost constant when the reproduction signal amplitude is saturated. Generally, more accurate recording is performed as the jitter becomes smaller, under the same reproduction conditions. It is assumed that a detection result in which the jitter becomes equal to or lower than a threshold value is OK, and a detection result in which the jitter exceeds a threshold value is NG.

The jitter can be detected as an average value in a measurement interval, and does not change enormously even when an area with a recording defect such as a scratch is locally present. Thus, the jitter can suitably be used for determining an optimum focus position.

Figure 15A:
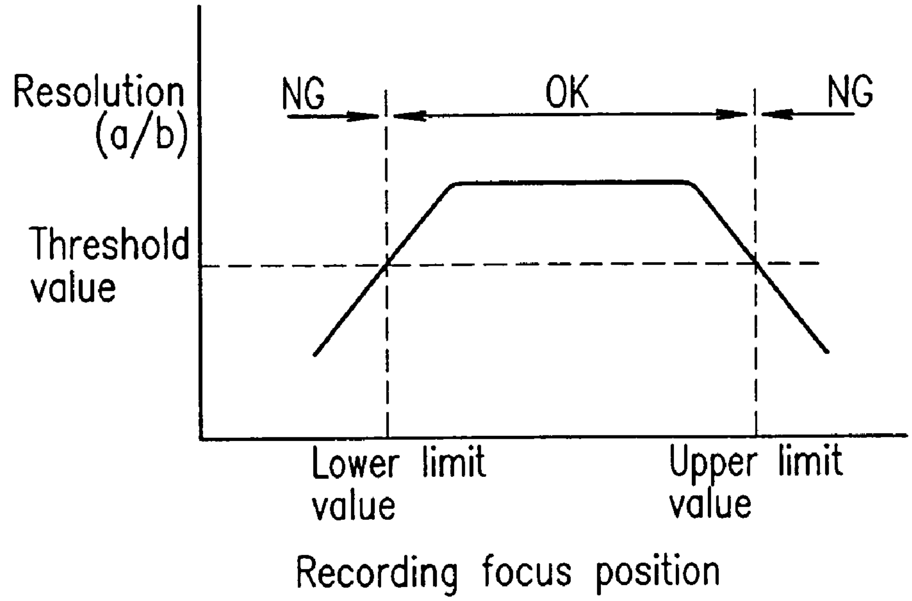
FIG. 15A is a graph showing a relationship between the recording focus position and the resolution.
Figure 15B:
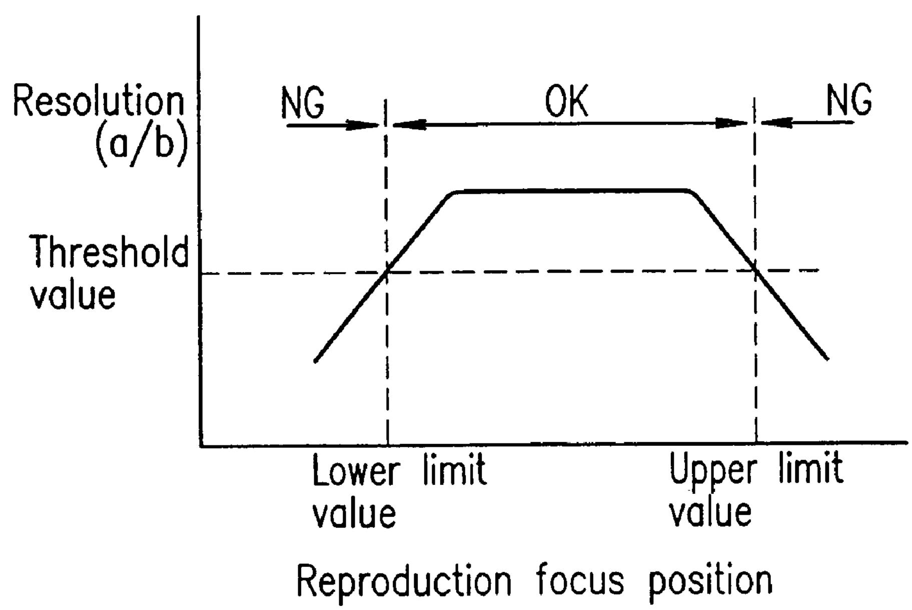
FIG. 15B is a graph showing a relationship between the reproduction focus position and the resolution.

As another example of the detection method, a method for detecting resolution will be described. FIG. 15A shows a relationship between the recording focus position and the resolution. In this figure, the abscissa represents the recording focus position, and the ordinate represents the resolution. FIG. 15B shows a relationship between the reproduction focus position and the resolution. The abscissa represents the reproduction focus position, and the ordinate represents the resolution.

Figure 16:
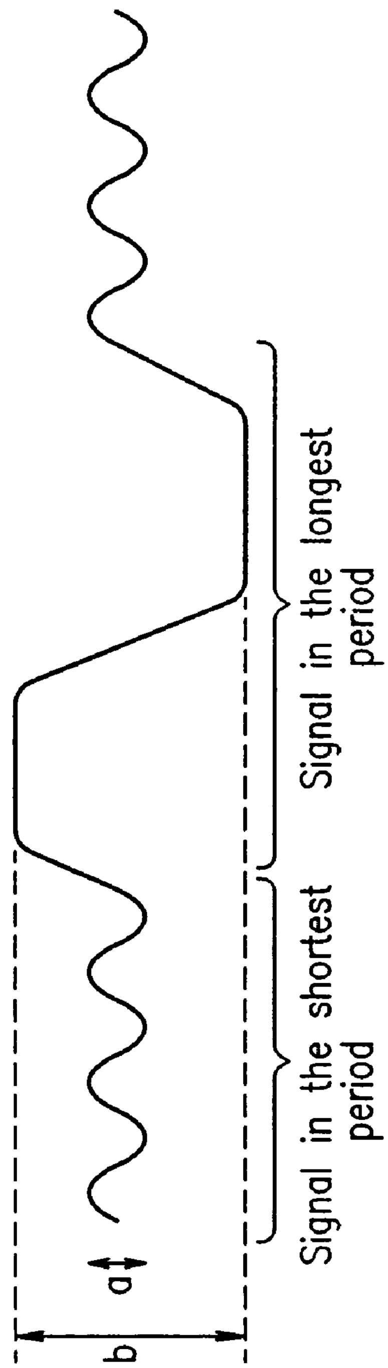
FIG. 16 is a diagram illustrating a resolution.

The resolution refers to a ratio between an amplitude of a reproduction signal in the shortest period and an amplitude of a reproduction signal in the longest period. As shown in FIG. 16, generally, more accurate recording is performed as the resolution becomes larger, under the same reproduction conditions. It is assumed that a detection result in which the resolution becomes equal to or higher than a threshold value is OK, and a detection result in which the resolution becomes lower than a threshold value is NG.

The resolution can be detected as an average value in a measurement interval, and does not change enormously even when an area with a recording defect such as a scratch is locally present. Thus, the resolution can suitably be used for determining an optimum focus position.

Figure 17A:
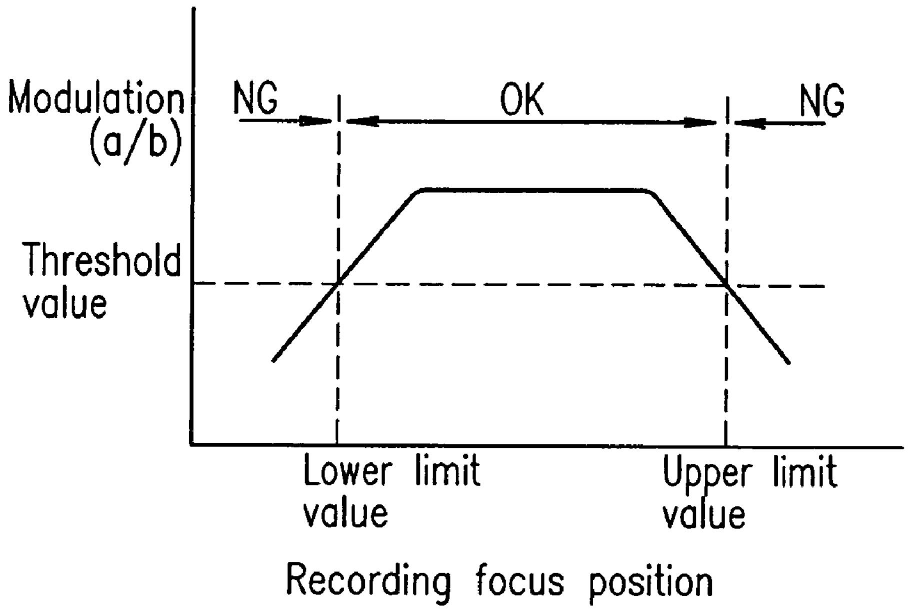
FIG. 17A is a graph showing a relationship between the recording focus position and the modulation.
Figure 17B:
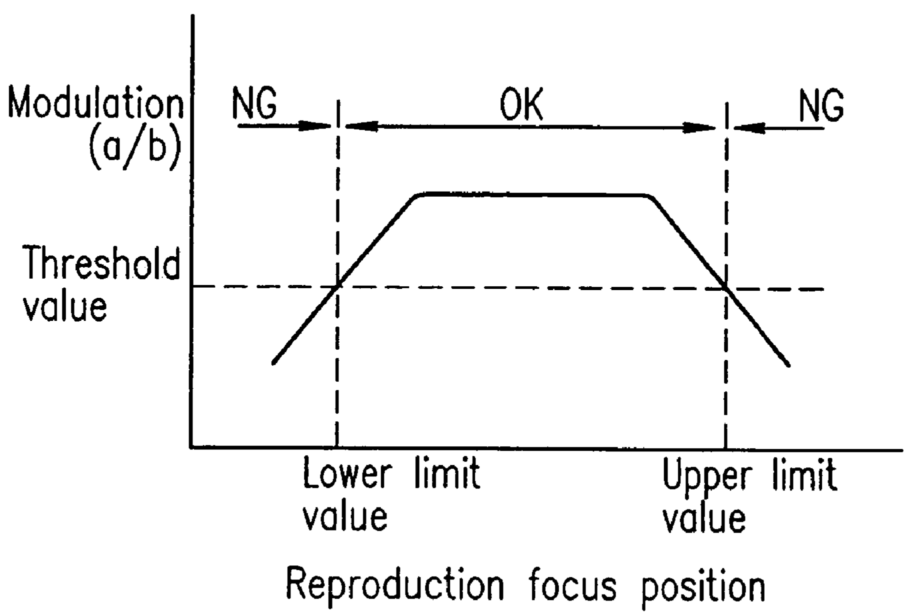
FIG. 17B is a graph showing a relationship between the reproduction focus position and the modulation.

As another example of the detection method, a method for detecting modulation will be described. FIG. 17A shows a relationship between the recording focus position and the modulation. In this figure, the abscissa represents the recording focus position, and the ordinate represents the modulation. FIG. 17B shows a relationship between the reproduction focus position and the modulation. The abscissa represents the reproduction focus position, and the ordinate represents the modulation.

Figure 18:
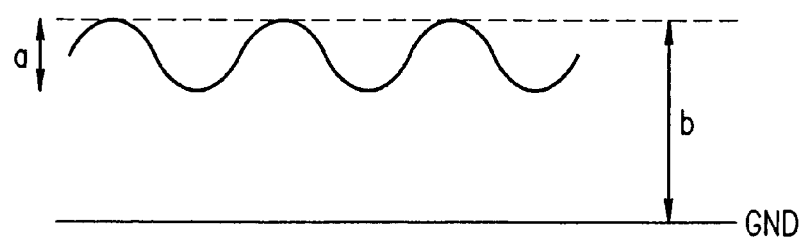
FIG. 18 is a diagram illustrating a modulation.

The modulation refers to a ratio between an AC component and a DC component in a reproduction signal in a time interval, as shown in FIG. 18. Generally, more accurate recording is performed as the modulation becomes larger, under the same reproduction conditions. It is assumed that a detection result in which the modulation becomes equal to or higher than a threshold value is OK, and a detection result in which the modulation becomes lower than a threshold value is NG.

The modulation can be detected as an average value in a measurement interval, and does not change enormously even when an area with a recording defect such as a scratch is locally present. Thus, the modulation can suitably be used for determining an optimum focus position.

Figure 19A:
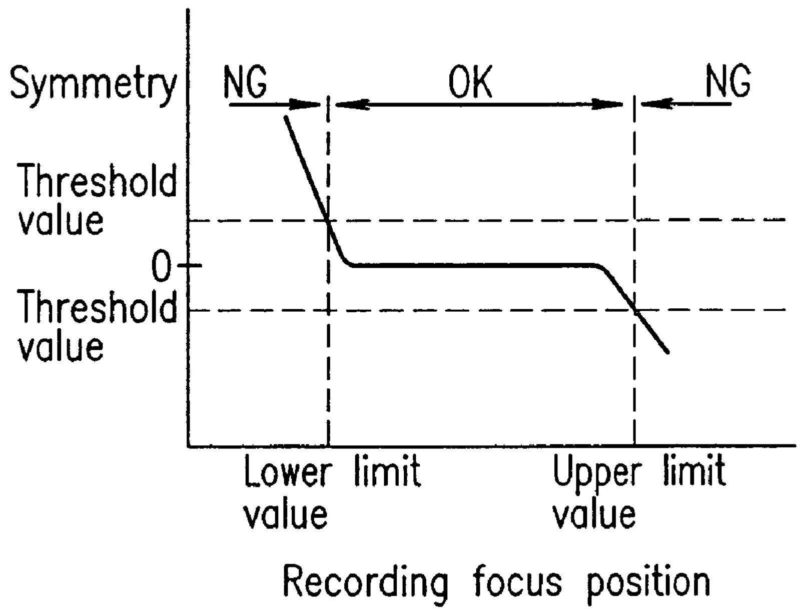
FIG. 19A is a graph showing a relationship between the recording focus position and the symmetry.
Figure 19B:
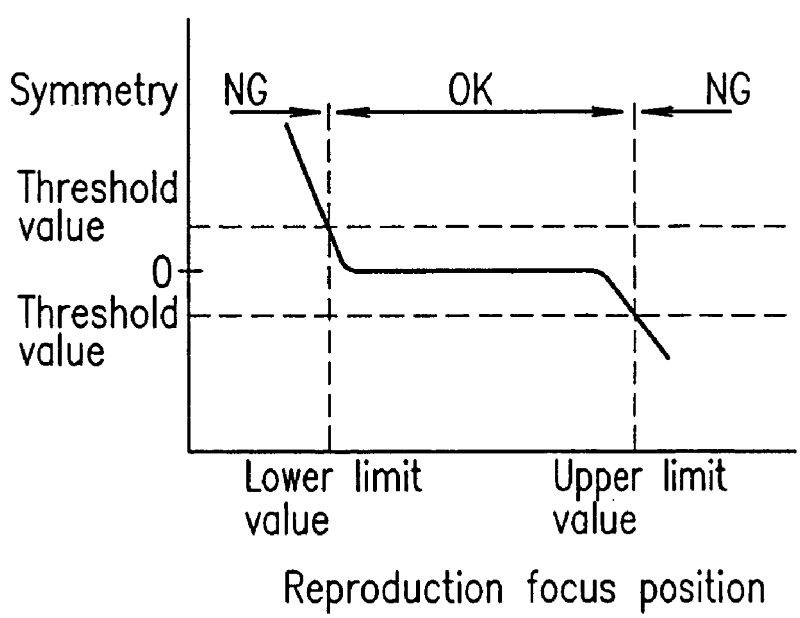
FIG. 19B is a graph showing a relationship between the reproduction focus position and the symmetry.

As another example of the detection method, a method for detecting symmetry will be described. FIG. 19A shows a relationship between the recording focus position and the symmetry. In this figure, the abscissa represents the recording focus position, and the ordinate represents the symmetry. FIG. 19B shows a relationship between the reproduction focus position and the symmetry. The abscissa represents the reproduction focus position, and the ordinate represents the symmetry.

Figure 20:
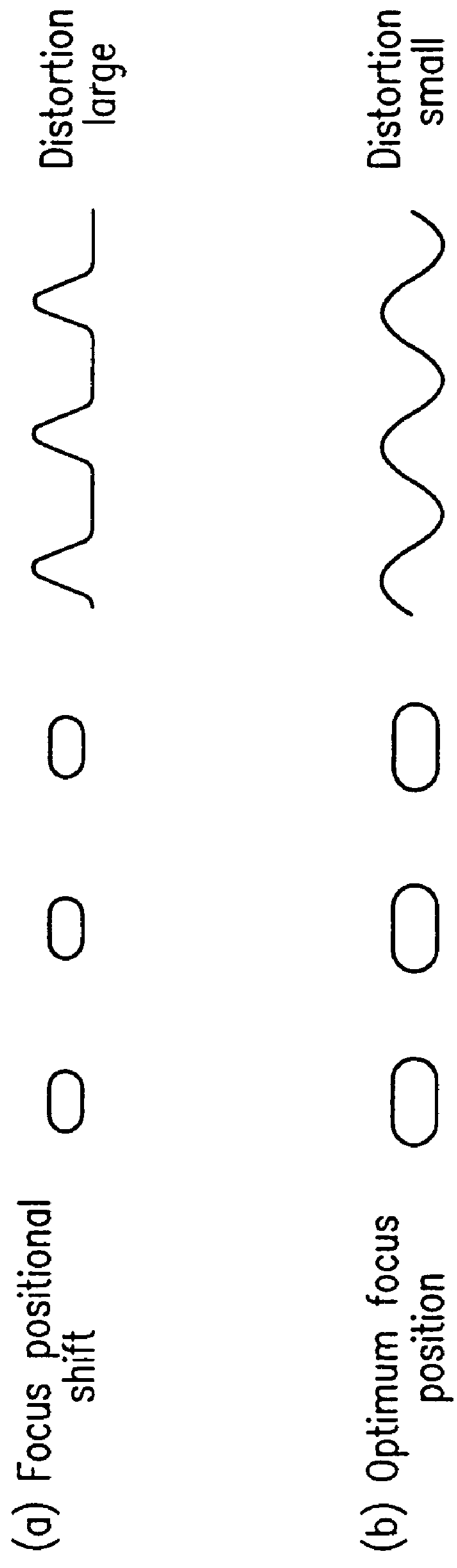
FIG. 20 is a diagram illustrating a symmetry.

The symmetry refers to a value which shows a secondary harmonic component of a reproduction signal, as shown in FIG. 20. The symmetry occurs due to a shift of a shape of a recording mark from a desired shape, caused by a shift of a focus point of a laser beam. Generally, more accurate recording is performed as the symmetry becomes smaller, under the same reproduction conditions. It is assumed that a detection result in which an absolute value of the symmetry becomes equal to or higher than a threshold value is NG, and a detection result in which an absolute value of the symmetry becomes lower than a threshold value is OK.

The symmetry can be detected as an average value in a measurement interval, and does not change enormously even when an area with a recording defect such as a scratch is locally present. Thus, the symmetry can suitably be used for determining an optimum focus position.

Figure 21A:
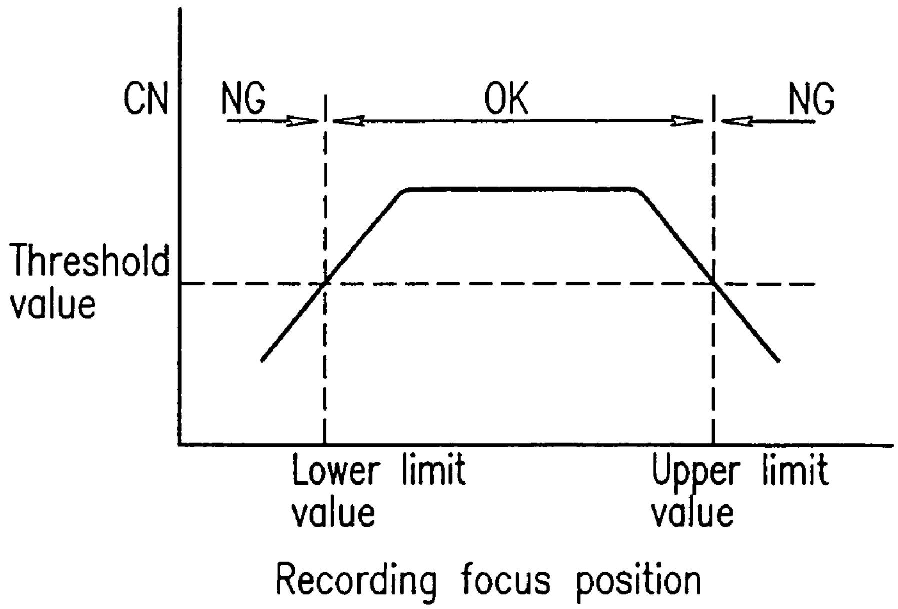
FIG. 21A is a graph showing a relationship between the recording focus position and the CN.
Figure 21B:
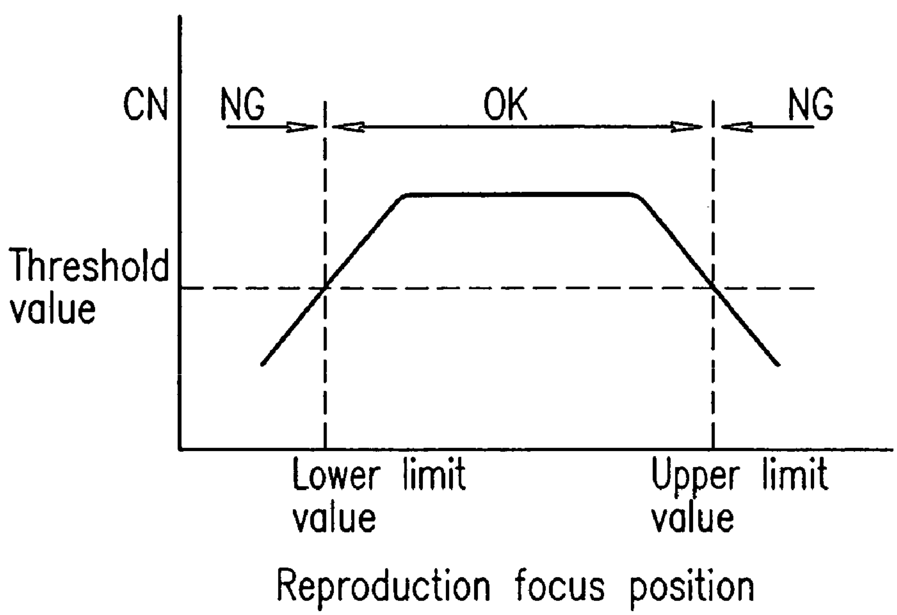
FIG. 21B is a graph showing a relationship between the reproduction focus position and the CN.

As another example of the detection method, a method for detecting CN will be described. FIG. 21A shows a relationship between the recording focus position and the CN. In this figure, the abscissa represents the recording focus position, and the ordinate represents the CN. FIG. 21B shows a relationship between the reproduction focus position and the CN. The abscissa represents the reproduction focus position, and the ordinate represents the CN.

The CN refers to a ratio between a signal component and a noise of a reproduction signal at a particular frequency. Generally, more accurate recording is performed as the CN becomes larger, under the same reproduction conditions. It is assumed that a detection result in which the CN becomes equal to or higher than a threshold value is OK, and a detection result in which the CN becomes lower than a threshold value is NG.

The CN can be detected as an average value in a measurement interval, and does not change enormously even when an area with a recording defect such as a scratch is locally present. Thus, the CN can suitably be used for determining an optimum focus position.

In the first, second, and third embodiments of the present invention, when an optimum recording focus position is determined, recording and reproduction are performed by changing only a recording focus position under the condition that a reproduction focus position is fixed. However, the recording focus position and the reproduction focus position may be changed simultaneously without fixing the reproduction focus position (e.g., a ratio between the recording focus position and the reproduction focus position is prescribed to be constant).

Similarly, in the first, second, and third embodiments of the present invention, when an optimum reproduction focus position is determined, recording and reproduction are performed by changing only a reproduction focus position under the condition that a recording focus position is fixed. However, the recording focus position and the reproduction focus position may be changed simultaneously without fixing the recording focus position (e.g., a ratio between the recording focus position and the reproduction focus position is prescribed to be constant).

For example, in the case where a shift occurs in a light-emission wavelength due to the difference in laser power between recording and reproduction, which causes a difference in chromatic aberration, both a recording focus position and a reproduction focus position are lower and higher than a presumed focus position. Therefore, when optimum recording and reproduction focus positions are determined, a recording focus position and a reproduction focus position are simultaneously changed, whereby more practical optimum recording and reproduction focus positions can be determined.

Figure 22A:
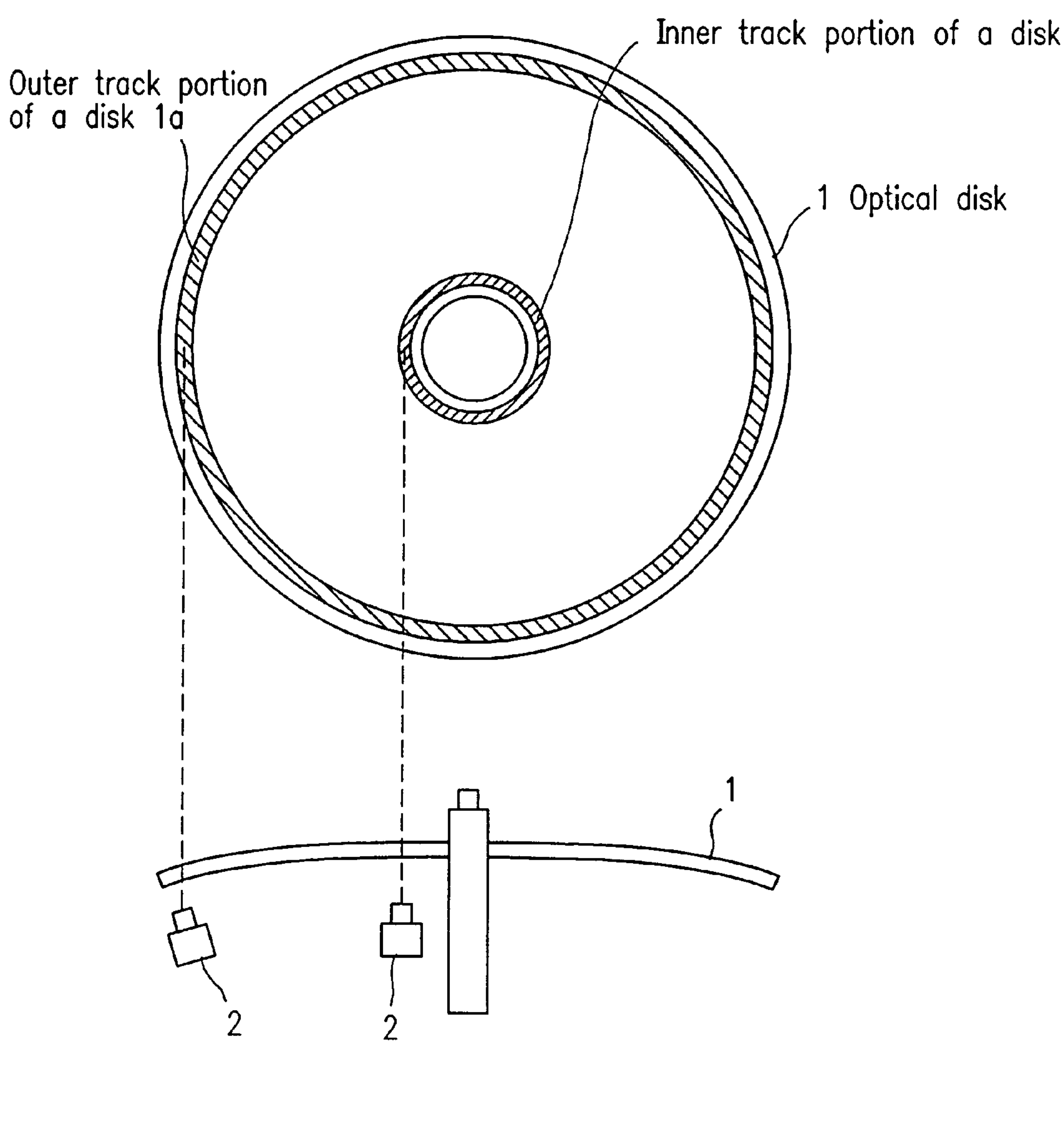
FIG. 22A shows a plan view and a cross-sectional view of an optical disk.
Figure 22B:
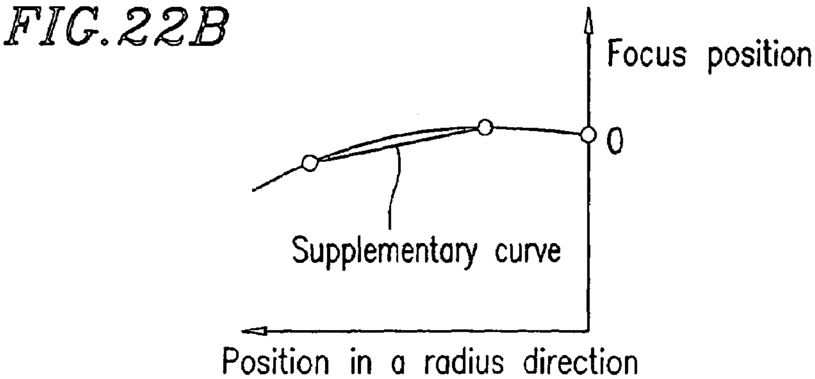
FIG. 22B is a graph showing a relationship between the position in a radius direction of the optical disk and the focus position.

In the first to third embodiments, prior to setting the optimum recording and reproduction focus positions, the optical head 2 is moved to a predetermined area. This area is an outermost area 1*a* of the optical disk 1, for example, as shown in FIG. 22A. However, when the optical disk 1 is warped or when the optical disk 1 is not properly placed in an apparatus, the optimum recording and reproduction focus positions obtained in the outermost area 1*a* of the optical disk 1 are not necessarily optimum for an inner track portion of the optical disk 1. More specifically, the optimum recording and reproduction focus positions may be different between the outer track portion and the inner track portion of the optical disk 1. Therefore, in a plurality of places on the optical disk 1 (e.g., in an outermost track and an innermost track of the optical disk 1), optimum recording and reproduction focus positions are obtained, and a supplementary curve connecting the optimum focus position points in the outermost track and in the innermost track as shown in FIG. 22*n* is formed for the optimum recording and reproduction focus positions, separately. When the optical disk 1 is recorded and reproduced, optimum recording and reproduction focus positions may be set, respectively, in accordance with a recording position and a reproduction position of the optical disk 1 based on the supplementary curve connecting the optimum focus position points in the outermost track and the innermost track.

Embodiment 4

In the fourth embodiment, a tilt angle common to a land track and a groove track of an optical disk is obtained in order to be set.

Figure 23:
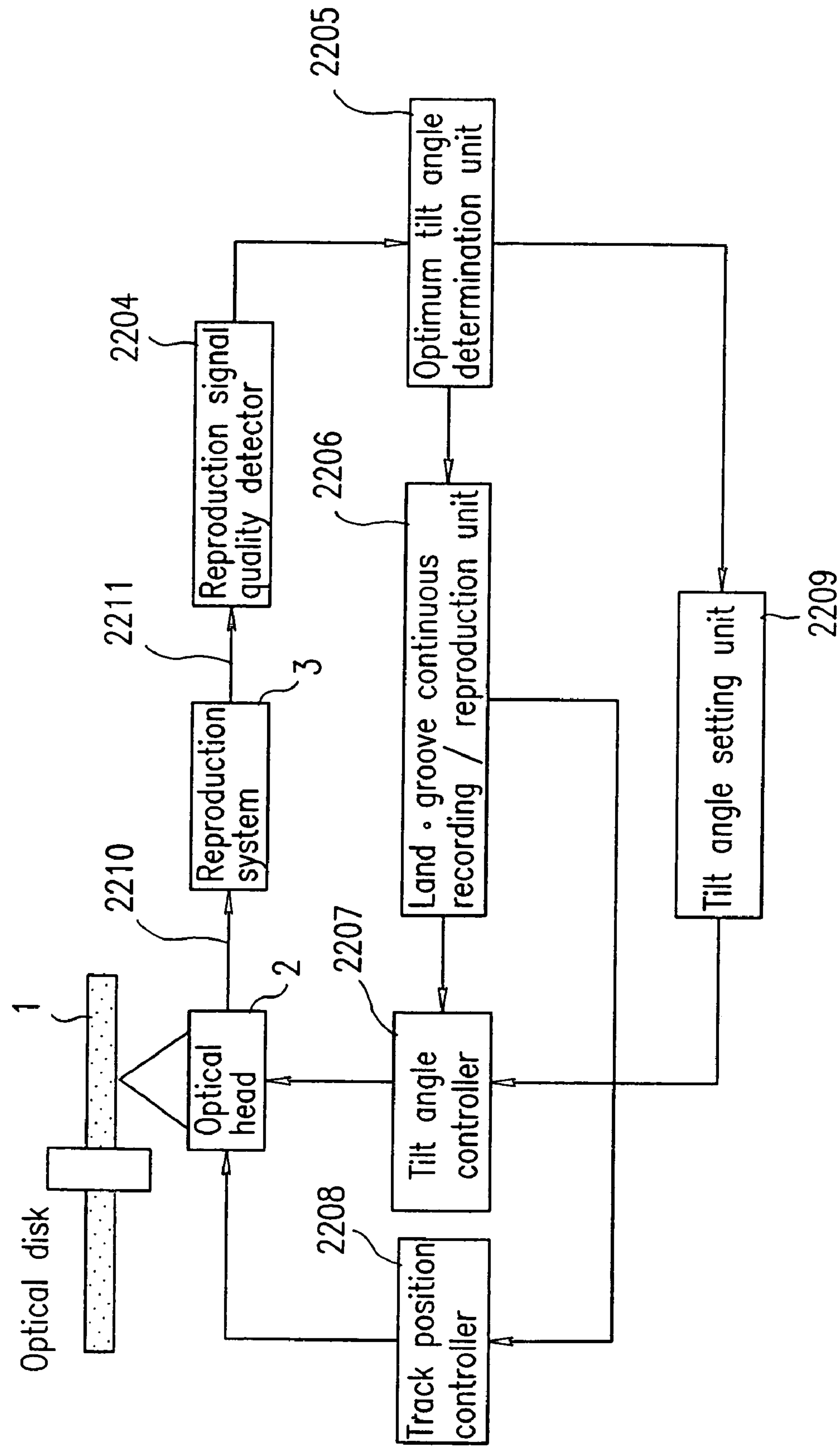
FIG. 23 is a block diagram showing the fourth embodiment of an optical disk apparatus according to the present invention.

FIG. 23 shows a structure of a phase-change type optical disk apparatus in the fourth embodiment of the present invention. In FIG. 23, reference numeral 1 denotes an optical disk, 2 denotes an optical head, 3 denotes a reproduction system, 2204 denotes a reproduction signal quality detector, 2205 denotes an optimum tilt angle determination unit, 2206 denotes a land•groove continuous recording/reproduction unit, 2207 denotes a tilt angle controller, 2208 denotes a track position controller, and 2209 denotes a tilt angle setting unit.

The optical disk 1 is as described with reference to FIG. 3.

Figure 24A:
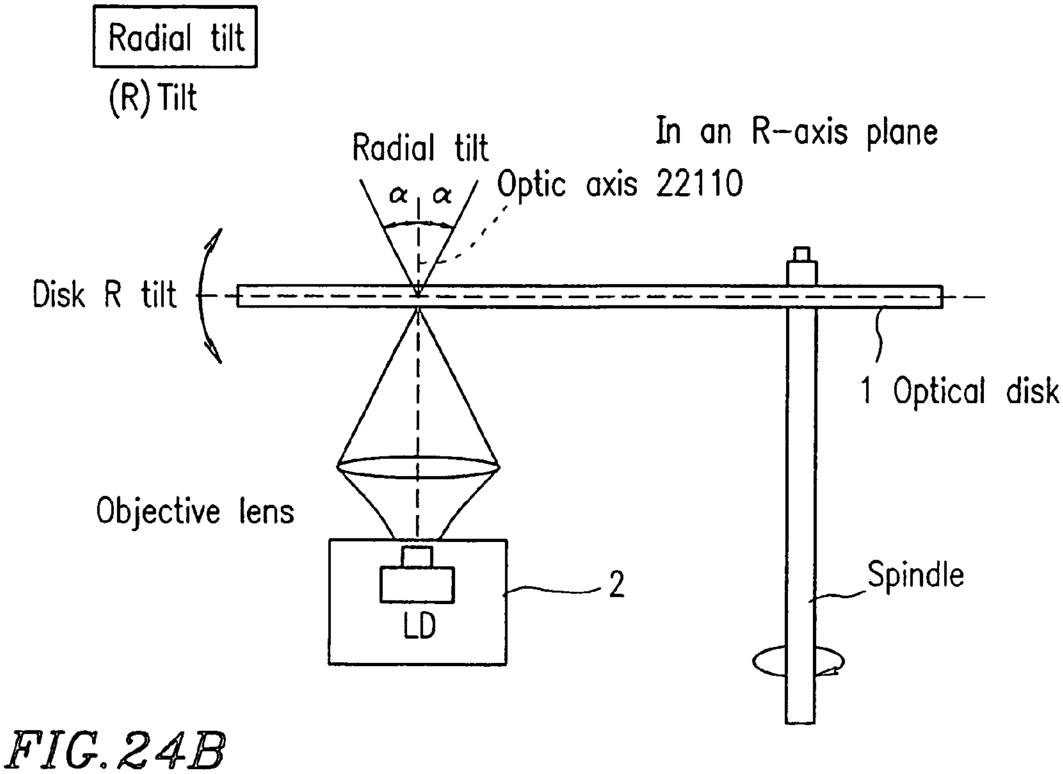
FIG. 24A is a diagram showing a radial tilt angle in the fourth embodiment of the present invention.

FIG. 24A is a diagram showing a radial tilt angle α of a laser beam output from the optical head 2. As shown in this figure, a radial tilt angle α is a tilt angle with respect to an optic axis 22110 vertical to a recording/reproduction surface of the optical disk 1 (i.e., a tilt angle in 8 radius direction of the optical disk 1).

Figure 24B:
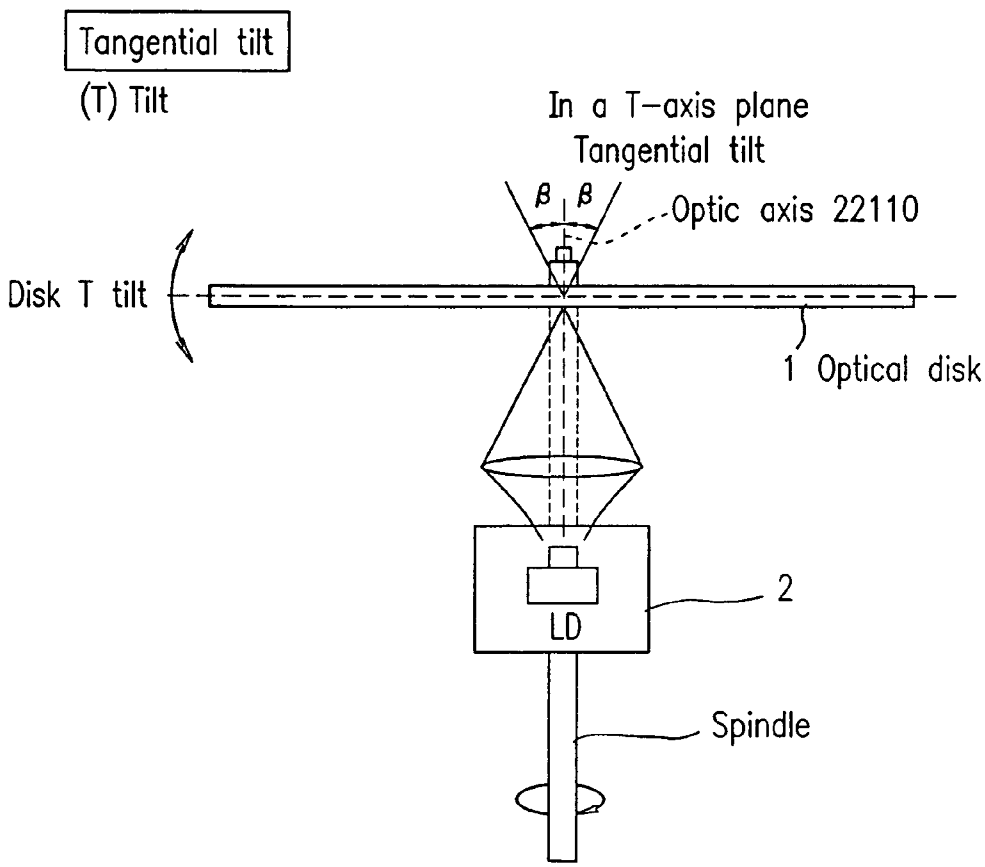
FIG. 24B is a diagram showing a tangential tilt angle in the fourth embodiment of the present invention.

FIG. 24B is a diagram showing a tangential tilt angle β of a laser beam output from the optical head 2. As shown in this figure, a tangential tilt angle β is a tilt angle with respect to the optic axis 22110 vertical to the recording/reproduction surface of the optical disk 1 (i.e., a tilt angle in a direction of a tangent of a circumference of the optical disk 1).

An output direction of a laser beam from the optical head 2 can be adjusted by the tilt angle controller 2207. This enables the radial tilt angle α and the tangential tilt angle β of a laser beam from the optical head 2 to be adjusted.

Figure 25:
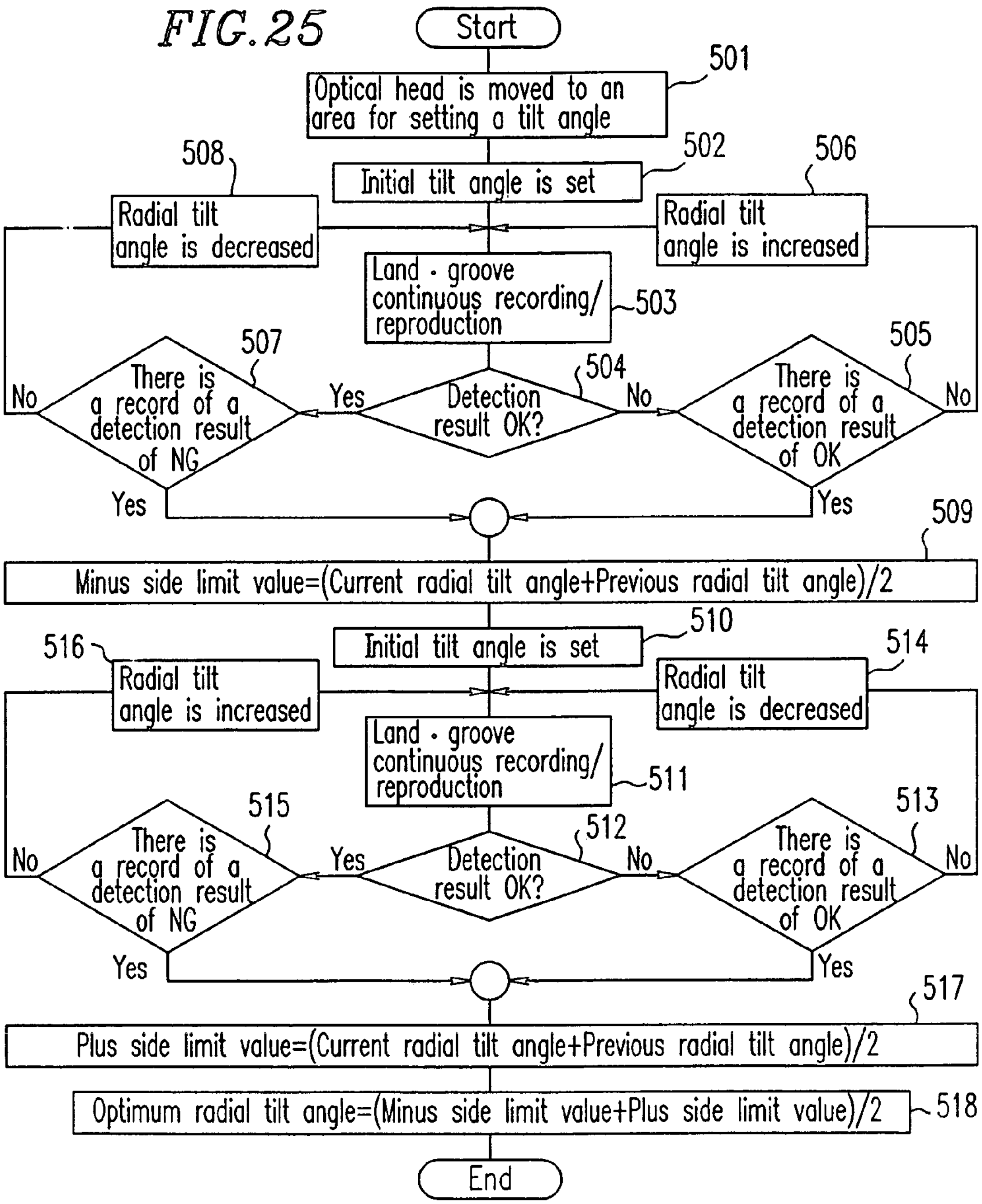
FIG. 25 is a flow chart showing process steps for determining an optimum radial tilt angle in the fourth embodiment of the present invention.

FIG. 25 is a flow chart showing process steps of an optical disk apparatus of the present embodiment. A procedure for obtaining a tilt angle will be described with reference to the flow chart.

In an optical disk apparatus, tilt angles to be determined include at least a radial tilt angle and a tangential tilt angle. In the present embodiment, first, a method for determining the radial tilt angle will be described, and a method for determining a tangential tilt angle will be described later.

The optical disk 1 is loaded in an optical disk apparatus. Predetermined operations such as identifying a disk type and a rotation control are performed. Thereafter, the optical head 2 is moved to an area for setting an optimum tilt angle by the track position controller 2208 (Step 501).

Initial values of the radial tilt angle and the tangential tilt angle are set in the tilt angle controller 2207 by the tilt angle setting unit 2209 (Step 502). At this time, a tilt angle for recording the land track is identical with a tilt angle for recording the groove track.

Subsequently, a control signal for continuously recording one land track and one groove track from a predetermined position is transmitted from the land•groove continuous recording/reproduction unit 2206 to the tilt angle controller 2207 and the track position controller 2208, whereby recording is performed by the optical head 2. At this time, output light from the semiconductor laser 2-1 of the optical head 2 is condensed as a light spot on the optical disk 1, whereby a recording mark is formed in accordance with a waveform of emitted light (Step 503).

After the continuous recording of the land track and the groove track is completed, output light from the semiconductor laser 2-1 of the optical head 2 is emitted at a reproduction power. A signal for continuously reproducing one land track and one groove track previously recorded is transmitted from the land•groove continuous recording/reproduction unit 2266 to the track position controller 2208, and a signal 2210 which is varied depending upon the presence of the recording mark on the optical disk 1 is input from the optical head 2 to the reproduction system 3 as a reproduction signal. The reproduction signal 2210 is subjected to reproduction signal processing such as amplification, waveform equalization, and digitization at the reproduction system 3, and a signal 2211 is input to the reproduction signal quality detector 2204 (step 503).

The reproduction signal quality detector 2204 detects a signal quality of the signal 2211, and a detection result of the reproduction signal quality is input to the optimum tilt angle determination unit 2205. When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when recording is performed at the above-mentioned tilt angle (Step 504).

Figure 26A:
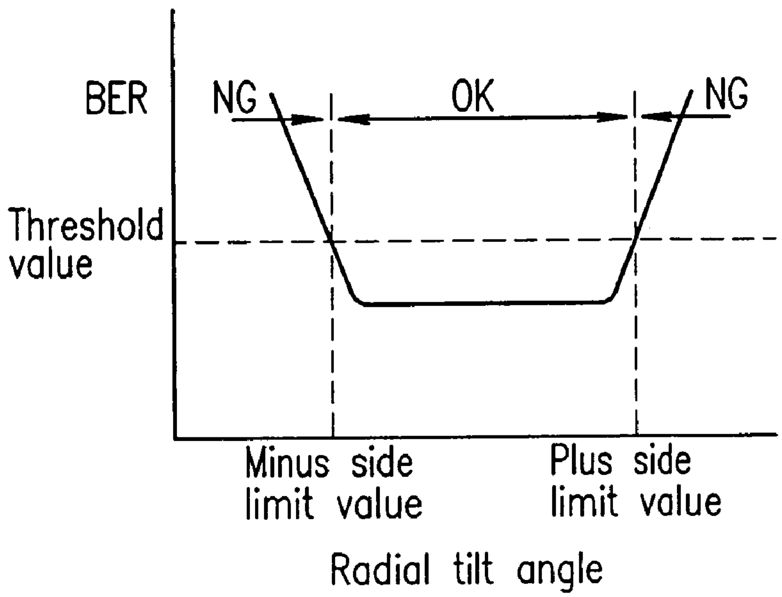
FIG. 26A is a graph showing a relationship between the radial tilt angle and the BER.

The reproduction signal quality detector 2204 detects, for example, a BER at which the recorded signal has been reproduced. FIG. 26A shows a relationship between the radial tilt angle $\alpha$ and the BER.

In FIG. 26A, the abscissa represents the radial tilt angle, and the ordinate represents the BER. In general, under the same reproduction conditions, more accurate recording and reproduction are performed with a smaller BER. It is assumed that a detection result in which the BER becomes a threshold value or less is OK, and a detection result in which the BER exceeds the threshold value is NG.

When the first result of the reproduction signal quality detector 2204 is NG, for example, (Step 504 no, Step 505 no), the optimum tilt angle determination unit 2205 sets a radial tilt angle tilted to a plus side from the initial radial angle (Step 506). When the first result of the reproduction signal quality detector 2204 is OK, for example, (Step 504 yes, Step 507 no), the optimum tilt angle determination unit 2205 sets a radial tilt angle decreased to a minus side from the initial radial tilt angle (Step 508). Continuous recording and continuous reproduction of the land track and the groove track at the set radial tilt angle are performed in the same way as described above (Step 503).

When the first result of the reproduction signal quality detector 2204 is NG, and the second result thereof is OK (Step 504 yes, Step 507 yes), the optimum tilt angle determination unit 2205 stores an average tilt angle of the current radial tilt angle and the previous radial tilt angle as a minus side limit value of the radial tilt angle (Step 509).

When the first result of the reproduction signal quality detector 2204 is OK, and the second result thereof is NG (Step 504 no, Step 505 yes), the optimum tilt angle determination unit 2205 stores an average tilt angle of the current radial tilt angle and the previous radial tilt angle as a minus side limit value of the radial tilt angle (Step 509).

When the first result of the reproduction signal quality detector 2204 is OK, and the second result thereof is OK, the optimum tilt angle determination unit 2205 sets a tilt angle which is further decreased to the minus side than the radial tilt angle recorded and reproduced at the second time, and continuous recording and continuous reproduction of the land track and the groove track are performed at the set radial tilt angle, whereby a reproduction signal quality is detected. When the third result of the reproduction signal quality detector 2204 is NG, the optimum tilt angle determination unit 2205 stores an average radial tilt angle of the current radial tilt angle and the previous radial tilt angle as the minus side limit value of the radial tilt angle.

A plus side limit value is obtained in a similar procedure to that of the minus side limit value in accordance with each of Steps 510 to 517. More specifically, every time the result of the reproduction signal quality detector 2204 is OK, the radial tilt angle is gradually increased to the plus side. When the result of the reproduction signal quality detector 2204 becomes NG, the optimum tilt angle determination unit 2205 stores an average radial tilt angle of the current radial tilt angle and the previous radial tilt angle as a plus side limit value.

The optimum tilt angle determination unit 2205 determines an average value of the minus side limit value and the plus side limit value, for example, as the optimum radial tilt angle (Step 518). The tilt position setting unit 2209 sets the optimum radial tilt angle.

In the present embodiment, a movement path of a light spot on the optical disk 1 is similar to that of the first embodiment, which has been described with reference to FIG. 3.

As described above, in order to obtain an optimum tilt angle, the land track and the groove track are recorded and reproduced by an equal or almost equal length, whereby an average characteristic of the land track and the groove track is obtained as an optimum radial tilt angle, and a radial tilt angle suitable for the land track and the groove track is determined.

Furthermore, in the present embodiment, recording and reproduction of the land track and the groove track are continuously performed. Therefore, it takes less time, compared with the case where optimum radial angles are obtained for the land track and the groove track, separately, and the obtained radial tilt angles are averaged.

For example, when a land track is recorded once and a groove track is recorded once in order to obtain an optimum radial tilt angle, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in a conventional apparatus, optimum radial tilt angles are obtained for a land track and a groove track, separately, so that a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 kinds of radial tilt angles so as to obtain an optimum radial tilt angle, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum radial tilt angle, whereby an optimum radial tilt angle can be determined in a short period of time, shortening a waiting time for rotation.

Figure 27:
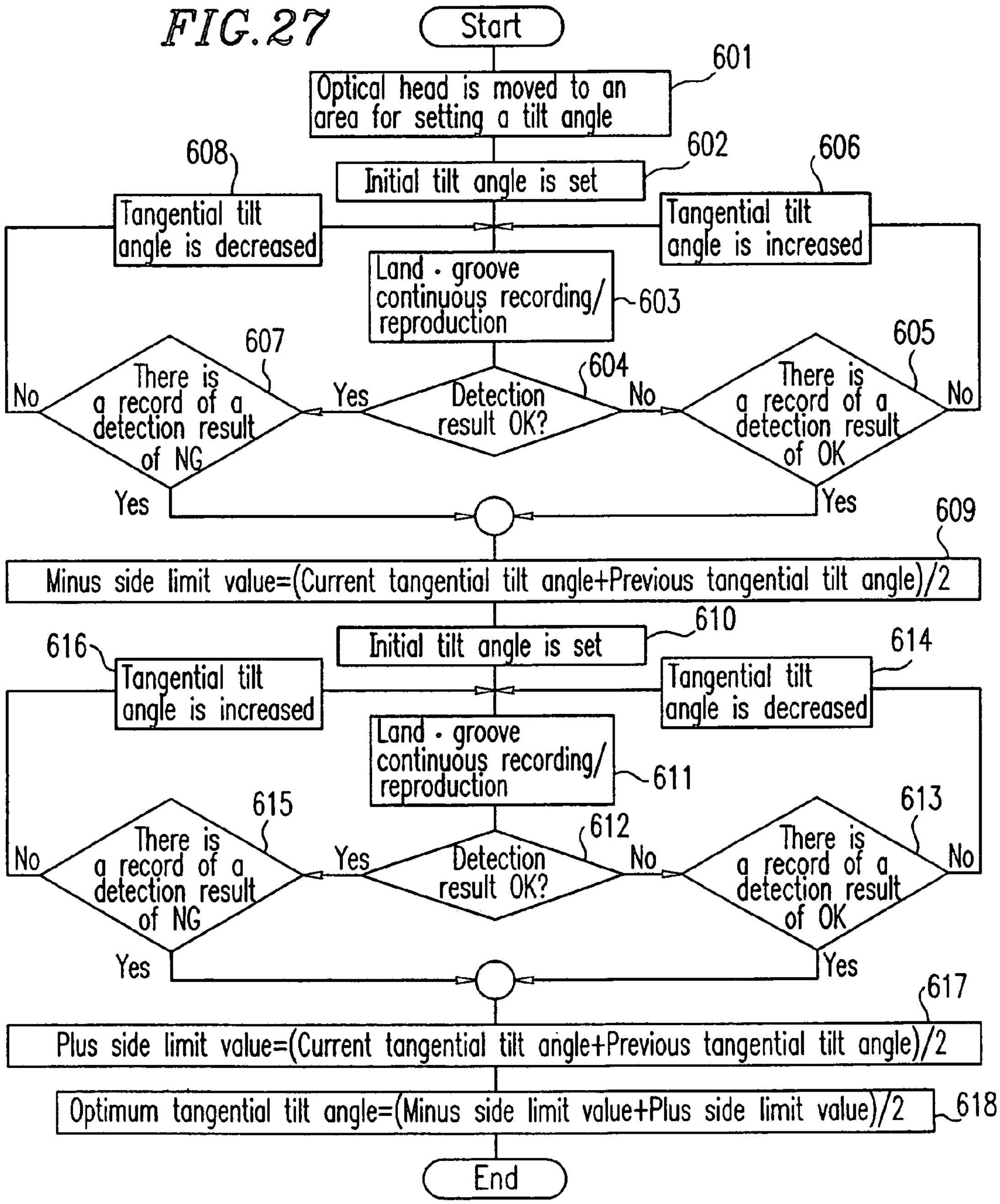
FIG. 27 is a flow chart showing process steps for determining an optimum tangential tilt angle in the fourth embodiment of the present invention.

Next, a procedure for obtaining a tangential tilt angle $\beta$ will be described with reference to a flow chart of FIG. 27.

In the present embodiment, in order to obtain an optimum value of a tangential tilt angle $\beta$, a minus side limit value and a plus side limit value of the tangential tilt angle are obtained, and thereafter, an optimum value between the minus side limit value and the plus side limit value is obtained by computation.

First, the optical head 2 is moved to an area for setting an optimum tilt angle (Step 601). Then, the tilt angle setting unit 2209 sets initial values of a radial tilt angle and a tangential tilt angle for obtaining, for example, a minus side limit value of the tangential tilt angle (Step 602). At this time, a tangential tilt angle for reproducing a land track is identical with a tangential tilt angle for reproducing a groove track.

Here, it is assumed that the radial tilt angle is fixed under the same recording conditions so as to examine effects of changes in the tangential tilt angle on a reproduction signal.

Subsequently, a control signal for continuously recording one land track and one groove track from a predetermined position is transmitted from the land•groove continuous recording/reproduction unit 2206 to the tilt angle controller 2207 and the track position controller 2208, whereby recording is performed by the optical head 2. At this time, output light from the semiconductor laser of the optical head 2 is condensed as a light spot on the optical disk 1, whereby a recording mark is formed in accordance with a waveform of emitted light (Step 603).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 2206 to the track position controller 2208, and a signal 2210 which is varied depending upon the presence of the recording mark on the optical disk 1 is input from the optical head 2 to the reproduction system 3 as a reproduction signal. The reproduction signal 2210 is subjected to reproduction signal processing such as amplification, waveform equalization, and digitization at the reproduction system 3, and a signal 2211 is input to the reproduction signal quality detector 2204 (Step 603).

The reproduction signal quality detector 2204 detects a signal quality of the signal 2211, and a detection result of the reproduction signal quality is input to the optimum tilt angle determination unit 2205. When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when reproduction is performed at the above-mentioned tilt angle (Step 604).

Figure 26B:
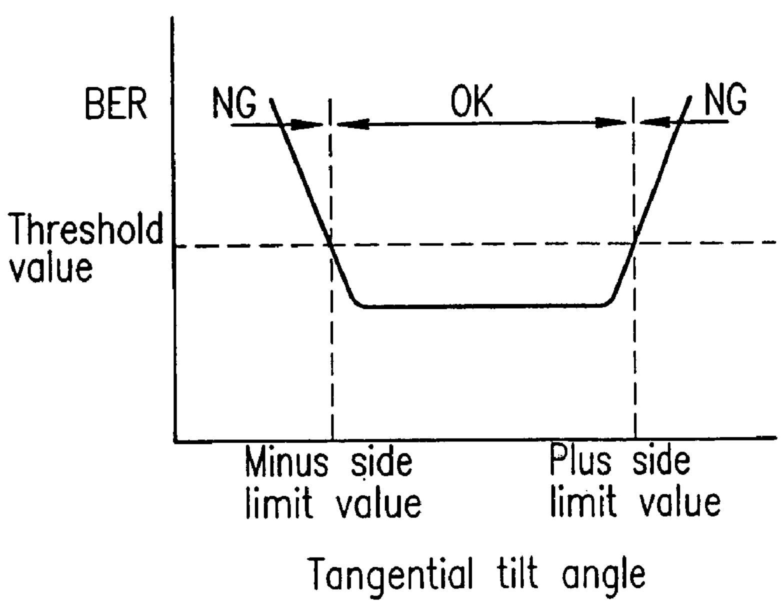
FIG. 26B is a graph showing a relationship between the tangential tilt angle and the BER.

The reproduction signal quality detector 2204 detects, for example, a BER at which the recorded signal has been reproduced. FIG. 26B shows a relationship between the tangential tilt angle β and the BER.

In FIG. 26B, the abscissa represents the tangential tilt angle, and the ordinate represents the BER. In general, under the same reproduction conditions, more accurate recording and reproduction are performed with a smaller BER. It is assumed that a detection result in which the BER becomes a threshold value or less is OK, and a detection result in which the BER exceeds the threshold value is NG.

When the first result of the reproduction signal quality detector 2204 is NG, for example, (Step 604 no, Step 605 no), the optimum tilt angle determination unit 2205 sets a tangential tilt angle increased to a plus side from the initial tangential tilt angle (Step 606). When the first result of the reproduction signal quality detector 2204 is OK, for example, (Step 604 yes, Step 607 no), the optimum tilt angle determination unit 2205 sets a tangential tilt angle decreased to a minus side from the initial tangential tilt angle (Step 608). Continuous recording and continuous reproduction of the land track and the groove track at the set tangential tilt angle are performed in the same way as described above (Step 603).

When the first result of the reproduction signal quality detector 2204 is NG, and the second result thereof is OK (Step 604 yes, Step 607 yes), the optimum tilt angle determination unit 2205 stores an average tilt angle of the current tangential tilt angle and the previous tangential tilt angle as a minus side limit value of the tangential tilt angle (Step 609).

When the first result of the reproduction signal quality detector 2204 is OK, and the second result thereof is NG (Step 604 no, Step 605 yes), the optimum tilt angle determination unit 2205 stores an average tilt angle of the current tangential tilt angle and the previous tangential tilt angle as A minus side limit value of the tangential tilt angle (Step 609).

When the first result of the reproduction signal quality detector 2204 is OK, and the second result thereof is OK, the optimum tilt angle determination unit 2205 sets a tilt angle which is further decreased to the minus side than the tangential tilt angle recorded and reproduced at the second time, and continuous recording and continuous reproduction of the land track and the groove track are performed at the set tangential tilt angle, whereby a reproduction signal quality is detected. When the third result of the reproduction signal quality detector 2204 is NG, the optimum tilt angle determination unit 2205 stores an average tangential tilt angle of the current tangential tilt angle and the previous tangential tilt angle as the minus side limit value of the tangential tilt angle.

A plus side limit value is obtained in a similar procedure to that of the minus side limit value in accordance with each of Steps 610 to 617. More specifically, every time the result of the reproduction signal quality detector 2204 is OK, the tangential tilt angle is gradually increased to the plus side. When the result of the reproduction signal quality detector 2204 becomes NG, the optimum tilt angle determination unit 2205 stores an average tangential tilt angle of the current tangential tilt angle and the previous tangential tilt angle as a plus side limit value.

The optimum tilt angle determination unit 2205 determines an average value of the minus side limit value and the plus side limit value, for example, as the optimum tangential tilt angle (Step 618). The tilt position setting unit 2209 sets the optimum tangential tilt angle.

When the minus side limit value and the plus side limit value are obtained, the initial value of the tangential tilt angle for obtaining the plus side limit value is prescribed to be a plus side from that of the tangential tilt angle for obtaining the lower limit value. More specifically, by starting from the values close to the respective limit values, with the initial value of the tangential tilt angle for obtaining the minus side limit value being different from the initial value of the tangential tilt angle for obtaining the plus side limit value, a tangential tilt angle is optimized in a short period of time.

In the present embodiment, an average value of the minus side limit value and the plus side limit value is determined as an optimum tangential tilt angle. However, in the case where an effective tangential tilt angle is likely to shift further to a minus side than the set tangential tilt angle, for example, due to the warpage and tracking offset of a disk, a value which divides the minus side limit value and the plus side limit value, for example, in a ratio of 2:1 may be determined as the optimum tangential tilt angle. By determining the value which divides the minus side limit value and the plus side limit value in a ratio of 2:1 as the optimum tangential tilt angle, a tolerance for the minus side tangential tilt angle side becomes large.

The reproduction signal quality detector 2204 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum tangential tilt angle can be determined more accurately.

Furthermore, the reproduction signal quality detector 2204 is designed to detect a BER at which a recorded signal has been reproduced. However, the reproduction signal quality detector 2204 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be continuously recorded and reproduced may be one track or less. Therefore, a waiting time for rotation will be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and optimum tilt angle can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and an optimum tilt angle can be determined more accurately.

Furthermore, if the worst value of a block detected by the reproduction signal quality detector 2204 is not adopted when two or more blocks are continuously recorded and reproduced, even when a block with a recording defect such as a scratch is present, the block can be eliminated. Thus, an optimum tilt angle can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and an optimum tilt angle can be determined more accurately.

Furthermore, if the worst value of a sector detected by the reproduction signal quality detector 2204 is not adopted when two or more sectors are continuously recorded and reproduced, even when a sector with a recording defect such as a scratch is present, the sector can be eliminated. Thus, an optimum tilt angle can be determined more accurately.

Embodiment 5

The fifth embodiment is different from the fourth embodiment in the steps of obtaining a tilt angle.

Figure 28:
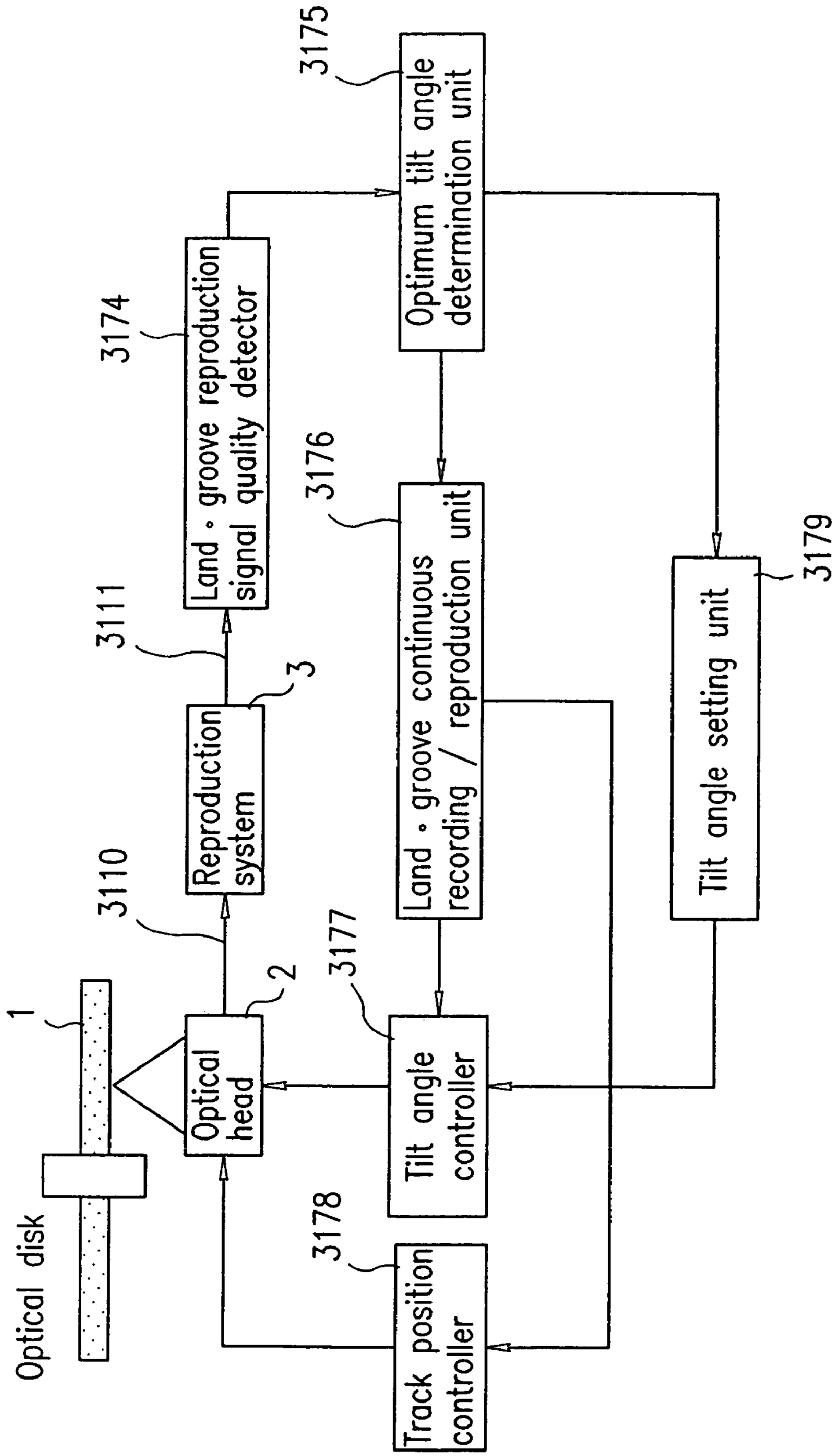
FIG. 28 is a block diagram showing the fifth embodiment of an optical disk apparatus according to the present invention.

FIG. 28 shows a structure of a phase-change type optical disk apparatus in the fifth embodiment of the present invention. In FIG. 28, reference numeral 1 denotes an optical disk, 2 denotes an optical head, 3 denotes a reproduction system, 3174 denotes a land•groove reproduction signal quality detector, 3175 denotes an optimum tilt angle determination unit, 3176 denotes a land•groove continuous recording/reproduction unit, 3177 denotes a tilt angle controller, 3178 denotes a track position controller, and 3179 denotes a tilt angle setting unit.

The optical disk 1 is as described with reference to FIG. 3.

Figure 29:
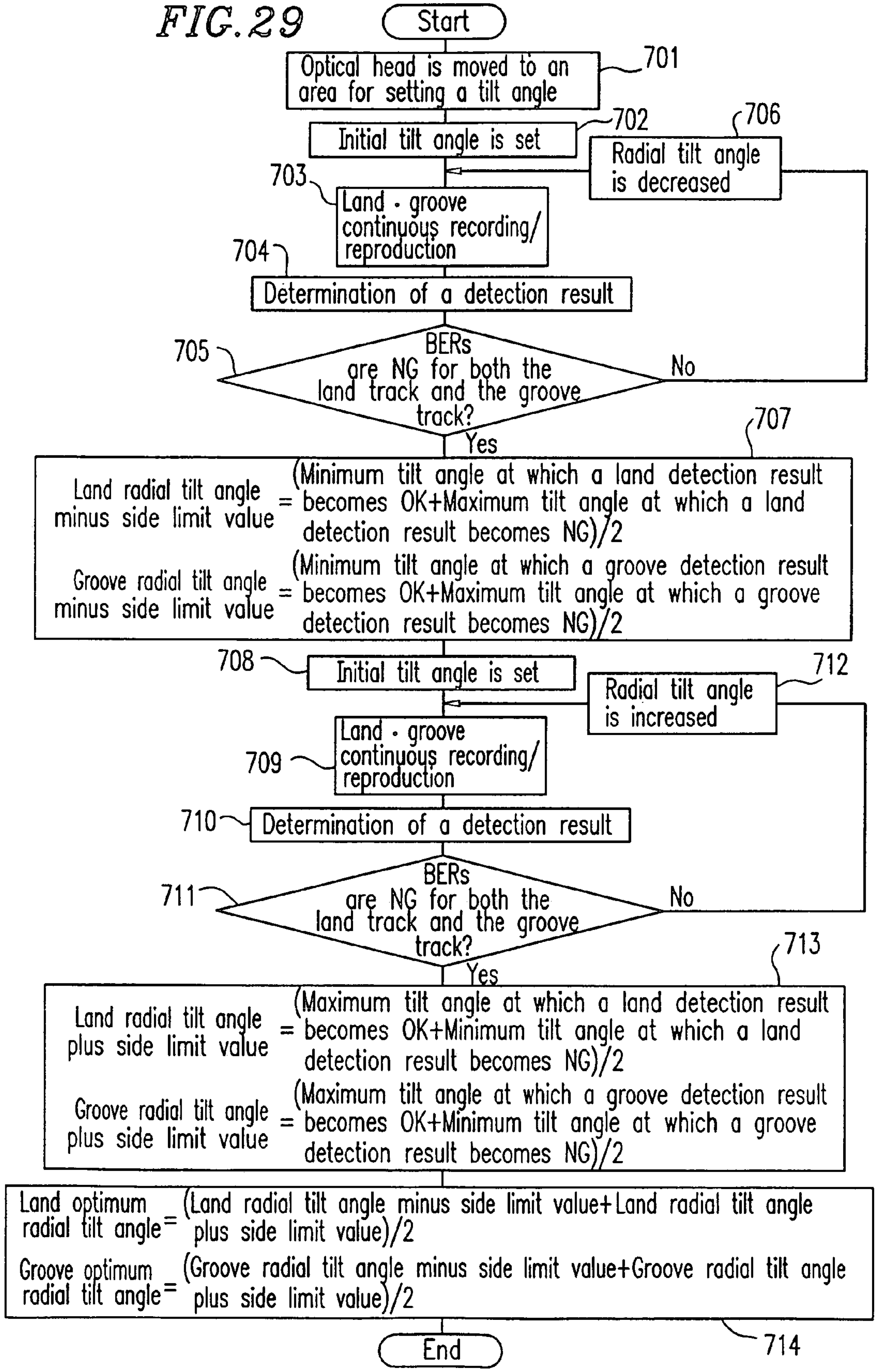
FIG. 29 is a flow chart showing process steps for determining an optimum radial tilt angle in the fifth embodiment of the present invention.

FIG. 29 is a flow chart showing process steps of an optical disk apparatus of the present embodiment. A procedure for obtaining a tilt angle will be described with reference to the flow chart.

In an optical disk apparatus, tilt angles to be determined include at least a radial tilt angle and a tangential tilt angle. In the present embodiment, first, a method for determining the radial tilt angle will be described, and a method for determining a tangential tilt angle will be described later.

The optical disk 1 is loaded in an optical disk apparatus. Predetermined operations such as identifying a disk type and a rotation control are performed. Thereafter, the optical head 2 is moved to an area for setting an optimum tilt angle by the track position controller 3178 (Step 701).

Initial values of the radial tilt angle and the tangential tilt angle are set in the tilt angle controller 3177 by the tilt angle setting unit 3179 (Step 702). At this time, a tilt angle for recording the land track is identical with a tilt angle for recording the groove track.

Subsequently, a control signal for continuously recording one land track and one groove track from a predetermined position is transmitted from the land•groove continuous recording/reproduction unit 3176 to the tilt angle controller 3177 and the track position controller 3178, whereby recording is performed by the optical head 2. At this time, output light from the semiconductor laser of the optical head 2 is condensed as a light spot on the optical disk 1, whereby a recording mark is formed in accordance with a waveform of emitted light (Step 703).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 3176 to the track position controller 3178, and a signal 3110 which is varied depending upon the presence of the recording mark on the optical disk 1 is input from the optical head 2 to the reproduction system 3 as a reproduction signal. The reproduction signal 3110 is subjected to reproduction signal processing such as amplification, waveform equalization, and digitization at the reproduction system 3, and a signal 3111 is input to the land•groove reproduction signal quality detector 3174 (Step 703).

The land•groove reproduction signal quality detector 3174 detects a signal quality of the signal 3111 for the land track and the groove track, separately, and a detection result of the reproduction signal quality is input to the optimum tilt angle determination unit 3175 (Step 704).

For example, when BERs are not NG for both the land track and the groove track, as a detection result of the reproduction signal quality detector 3174 (Step 705 no), the optimum tilt angle determination unit 3175 sets a radial tilt angle at which BERs become OK for both the land track and the groove track as an initial radial tilt angle (Step 706). While the radial tilt angle is gradually decreased to a minus side, continuous recording and continuous reproduction of the land track and the groove track are performed at each time, and results of the land•groove reproduction signal quality detector 3174 at the respective radial tilt angles are stored. When BERs become NG for both the land track and the groove track (Step 705 yes), an average radial tilt angle of a minimum radial tilt angle at which the BER is OK and a maximum radial tilt angle at which the BER is NG is obtained for the land track and the groove track, respectively, and each average radial tilt angle is stored as a minus side limit value of the radial tilt angle (Step 707).

A plus side limit value is obtained in a similar procedure to that of the minus side limit value in accordance with each of Steps 708 to 713. More specifically, the optimum tilt angle determination unit 3175 sets a radial tilt angle at which BERs become OK for both the land track and the groove track as an initial radial tilt angle (Step 708). While the radial tilt angle is gradually increased to the plus side, continuous recording and continuous reproduction of the land track and the groove track are performed at each time. When BERs become NG for both the land track and the groove track as a result of the land•groove reproduction signal quality detector 3174 (Step 711 yes), an average radial tilt angle of a maximum radial tilt angle at which the BER is OK and a minimum radial tilt angle at which the BER is NG is obtained for the land track and the groove track, respectively, and each average radial tilt angle is stored as a plus side limit value of the average radial tilt angle (Step 713).

The optimum tilt angle determination unit 3175 determines, for example, an average value of the minus side limit value and the plus side limit value as an optimum radial tilt angle (Step 714).

When the minus side limit value and the plus side limit value are obtained, the initial value of the radial tilt angle for obtaining the plus side limit value is prescribed to be a plus side from that of the radial tilt angle for obtaining the minus side limit value. More specifically, by starting from the values close to the respective limit values, with the initial value of the radial tilt angle for obtaining the minus side limit value being different from the initial value of the radial tilt angle for obtaining the plus side limit value, a radial tilt angle is optimized in a short period of time.

In the present embodiment, an average value of the minus side limit value and the plus side limit value is determined as an optimum radial tilt angle. However, in the case where an effective radial tilt angle is likely to shift further to minus side than the set optimum radial tilt angle, for example, due to the warpage and/or tilt of a disk, a value which divides the minus side limit value and the plus side limit value, for example, in a ratio of 2:1 may be determined as the optimum radial tilt angle. By determining the value which divides the minus side limit value and the plus side limit value in a ratio of 2:1 as the optimum radial tilt angle, a tolerance for the minus side radial angle side becomes large.

In the present embodiment, a movement path of a light spot on the optical disk 1 is similar to that of the first embodiment, which has been described with reference to FIG. 3.

In the present embodiment, recording and reproduction of the land track and the groove track are continuously performed. Therefore, it takes less time, compared with the case where optimum radial angles are obtained for the land track and the groove track, separately, and the obtained radial tilt angles are averaged.

For example, when a land track is recorded once and a groove track is recorded once in order to obtain an optimum radial tilt angle, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in a conventional apparatus, optimum radial tilt angles are obtained for a land track and a groove track, separately, so that a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 kinds of radial tilt angles so as to obtain an optimum radial tilt angle, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of date so as to determine an optimum radial tilt angle, whereby an optimum radial tilt angle can be determined in a short period of time, shortening a waiting time for rotation.

Figure 30:
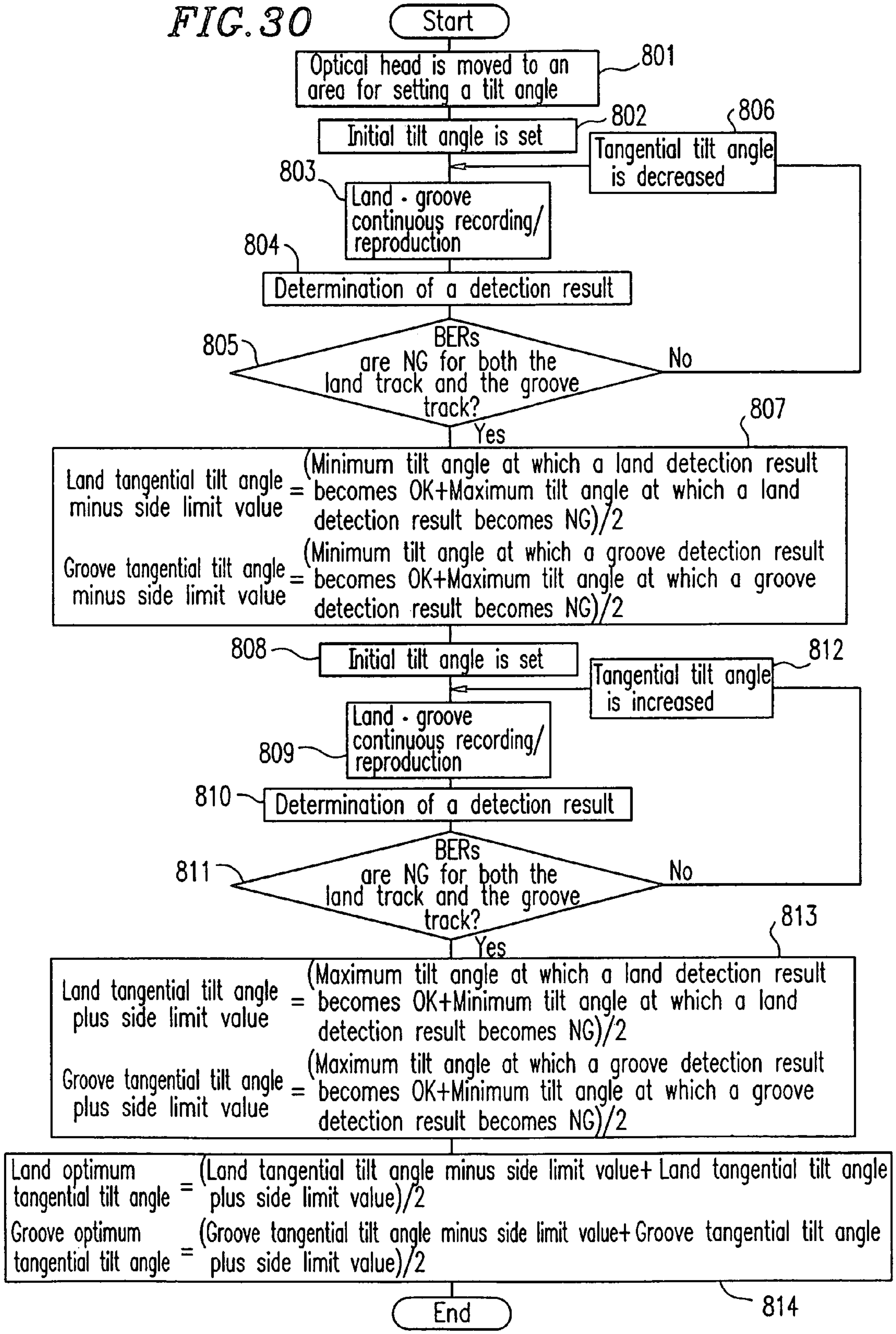
FIG. 30 is a flow chart showing process steps for determining an optimum tangential tilt angle in the fifth embodiment of the present invention.

Next, a procedure for obtaining a tangential tilt angle β will be described with reference to a flow chart of FIG. 30.

In the present embodiment, in order to obtain an optimum value of a tangential tilt angle β, a minus side limit value and a plus side limit value of the tangential tilt angle are obtained, and thereafter, an optimum value between the minus side limit value and the plus side limit value is obtained by computation.

First, the optical head 2 is moved to an area for setting an optimum tangential tilt angle (Step 801). Then, the tilt angle setting unit 3179 sets initial values of a radial tilt angle and a tangential tilt angle for obtaining, for example, a minus side limit value of the tangential tilt angle (Step 802). At this time, a tangential tilt angle for recording a land track is identical with a tangential tilt angle for recording a groove track.

Subsequently, a control signal for continuously recording one land track and one groove track from a predetermined position is transmitted from the land•groove continuous recording/reproduction unit 3176 to the tilt angle controller 3177 and the track position controller 3178, whereby recording is performed by the optical head 2. At this time, output light from the semiconductor laser of the optical head 2 is condensed as a light spot on the optical disk 1, whereby a recording mark is formed in accordance with a waveform of emitted light (Step 803).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 3176 to the track position controller 3178, and a signal 3110 which is varied depending upon the presence of the recording mark on the optical disk 1 is input from the optical head 2 to the reproduction system 3 as a reproduction signal. The reproduction signal 3110 is subjected to reproduction signal processing such as amplification, waveform equalization, and digitization at the reproduction system 3, and a signal 3111 is input to the land•groove reproduction signal quality detector 3174 (Step 803).

The land•groove reproduction signal quality detector 3174 detects a signal quality of the signal 3111, and a detection result of the reproduction signal quality is input to the optimum tilt angle determination unit 3175 (Step 804).

For example, when BERs are OK for both the land track and the groove track, as a detection result of the reproduction signal quality detector 3174 (Step 805, no), the optimum tilt angle determination unit 3175 sets a tangential tilt angle at which BERs become OK for both the land track and the groove track as an initial tangential tilt angle (Step 806). While the tangential tilt angle is gradually decreased to a minus side, continuous recording and continuous reproduction of the land track and the groove track are performed at each time, and results of the land•groove reproduction signal quality detector 3174 at the respective tangential tilt angles are stored. When BERs become NG for both the land track and the groove track (Step 805 yes), an average tangential tilt angle of a minimum tangential tilt angle at which the BER is OK and a maximum tangential tilt angle at which the BER is NG is obtained for the land track and the groove track, respectively, and each average tangential tilt angle is stored as a minus side limit value of the tangential tilt angle (Step 807).

A plus side limit value is obtained in a similar procedure to that of the minus side limit value in accordance with each of Steps 808 to 813. More specifically, the optimum tilt angle determination unit 3175 sets a tangential tilt angle at which BERs become OK for both the land track and the groove track as an initial tangential tilt angle (Step 808). While the tangential tilt angle is gradually increased to the plus side, continuous recording and continuous reproduction of the land track and the groove track are performed at each time. When BERs become NG for both the land track and the groove track as a result of the land•groove reproduction signal quality detector 3174 (Step 811 yes), an average tangential tilt angle of a maximum tangential tilt angle at which the BER is OK and a minimum tangential tilt angle at which the BER is NG is obtained for the land track and the groove track, respectively, and each average tangential tilt angle is stored as a plus side limit value of the tangential tilt angle (Step 813).

The optimum tilt angle determination unit 3175 determines, for example, an average value of the minus side limit value and the plus side limit value as an optimum tangential tilt angle, for the land track and the groove track, respectively (Step 814).

When the minus side limit value and the plus side limit value are obtained, the initial value of the tangential tilt angle for obtaining the plus side limit value is prescribed to be a plus side from that of the tangential tilt angle for obtaining the minus side limit value. More specifically, by starting from the values close to the respective limit values, with the initial value of the tangential tilt angle for obtaining the minus side limit value being different from the initial value of the tangential tilt angle for obtaining the plus side limit value, a tangential tilt angle is optimized in a short period of time.

In the present embodiment, an average value of the minus side limit value and the plus side limit value is determined as an optimum tangential tilt angle. However, in the case where an effective tangential tilt angle is likely to shift further to a minus side than the set optimum tangential tilt angle, for example, due to the warpage and/or tilt of a disk, a value which divides the minus side limit value and the plus side limit value, for example, in a ratio of 2:1 may be determined as the optimum tangential tilt angle. By determining the value which divides the minus side limit value and the plus side limit value in a ratio of 2:1 as the optimum tangential tilt angle, a tolerance for the minus side tangential tilt angle side becomes large.

The land•groove reproduction signal quality detector 3174 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum tangential tilt angle can be determined more accurately.

Furthermore, the land•groove reproduction signal quality detector 3174 is designed to detect a BER at which a recorded signal has been reproduced. However, the land•groove reproduction signal quality detector 3174 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be continuously recorded and reproduced may be one track or less. Therefore, a waiting time for rotation will be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and optimum tangential tilt angle can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and an optimum tangential tilt angle can be determined more accurately.

Furthermore, if the worst value of a block detected by the land•groove reproduction signal quality detector 3174 is not adopted when two or more blocks are continuously recorded and reproduced, even when a block with a recording defect such as a scratch is present, the block can be eliminated. Thus, an optimum tangential tilt angle can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and an optimum tangential tilt angle can be determined more accurately.

Furthermore, if the worst value of a sector detected by the land•groove reproduction signal quality detector 3174 is not adopted when two or more sectors are continuously recorded and reproduced, even when a sector with a recording defect such as a scratch is present, the sector can be eliminated. Thus, an optimum tangential tilt angle can be determined more accurately.

In the fourth and fifth embodiments of the present invention, in order to detect a reproduction signal quality by the reproduction signal detectors 2204 and 3174, a detection method based on a BER has been illustrated. Alternatively, the following other detection methods may be used.

Figure 31A:
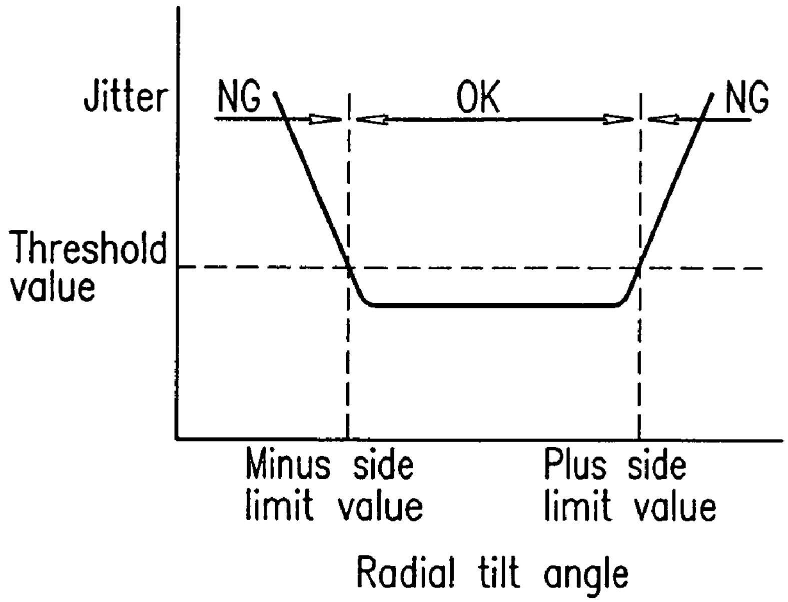
FIG. 31A is a graph showing a relationship between the radial tilt angle and the jitter.
Figure 31B:
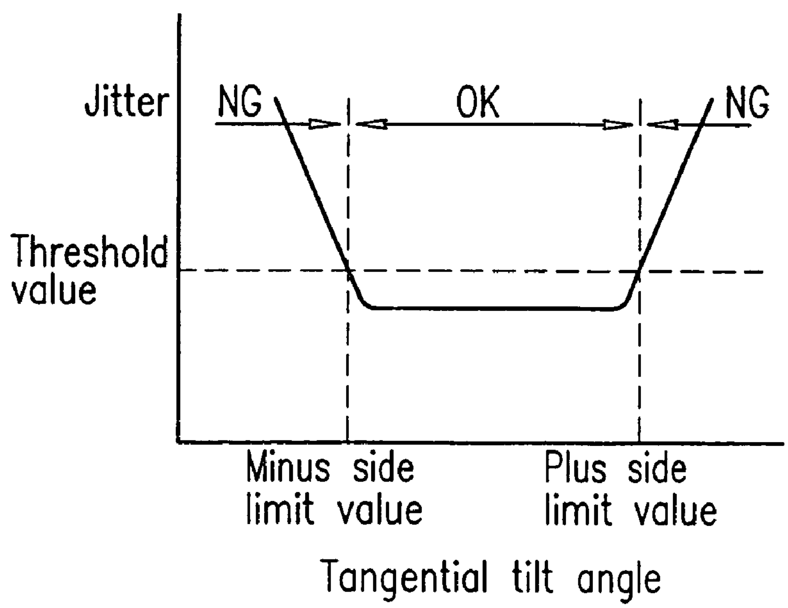
FIG. 31B is a graph showing a relationship between the tangential tilt angle and the jitter.

As an example of the detection method, a method for detecting a jitter will be exemplified. FIG. 31A shows a relationship between the radial tilt angle and the jitter. In this figure, the abscissa represents the radial tilt angle, and the ordinate represents the jitter. FIG. 31B shows a relationship between the tangential tilt angle and the jitter. In this figure, the abscissa represents the tangential tilt angle, and the ordinate represents the jitter.

The jitter refers to a time shift between a reproduction signal and an original signal. The jitter occurs due to a decrease in a reproduction signal amplitude, etc. caused by an aberration of a spot of a laser beam ascribed to a tilt and decreases with an increase in a reproduction signal amplitude. The jitter amount becomes almost constant when the reproduction signal amplitude is saturated. Generally, more accurate recording is performed as the jitter becomes smaller, under the same reproduction conditions. It is assumed that a detection result in which the jitter becomes equal to or lower than a threshold value is OK, and a detection result in which the jitter exceeds a threshold value is NG.

The jitter can be detected as an average value in a measurement interval, and does not change enormously even when an area with a recording defect such as a scratch is locally present. Thus, the jitter can suitably be used for determining an optimum tilt angle.

Figure 32A:
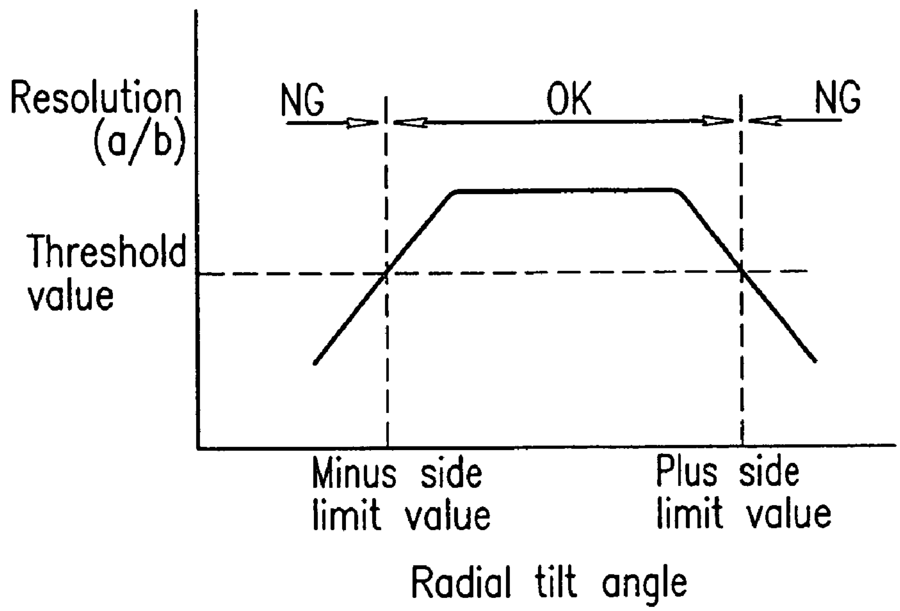
FIG. 32A is a graph showing a relationship between the radial tilt angle and the resolution.
Figure 32B:
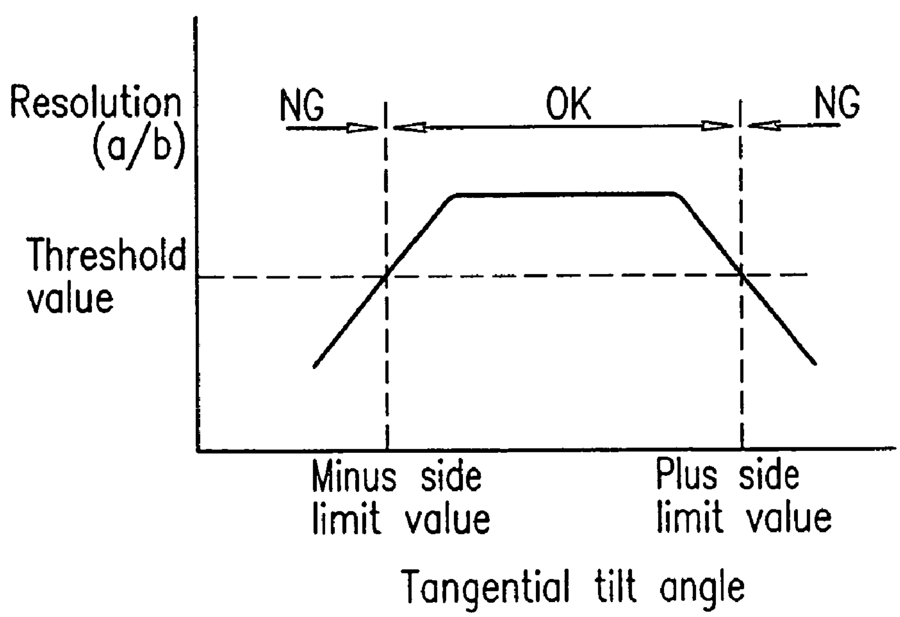
FIG. 32B is a graph showing a relationship between the tangential tilt angle and the resolution.

As another example of the detection method, a method for detecting resolution will be described. FIG. 32A shows a relationship between the radial angle and the resolution. In this figure, the abscissa represents the radial tilt angle, and the ordinate represents the resolution. FIG. 32B shows a relationship between the tangential tilt angle and the resolution. The abscissa represents the tangential tilt angle, and the ordinate represents the resolution.

The resolution refers to a ratio between an amplitude of a reproduction signal in the shortest period an amplitude of a reproduction signal in the longest period, as shown in FIG. 16. Generally, more accurate recording is performed as the resolution becomes larger, under the same reproduction conditions. It is assumed that a detection result in which the resolution becomes equal to or higher than a threshold value is OK, and a detection result in which the resolution becomes lower than a threshold value is NG.

The resolution can be detected as an average value in a measurement interval, and does not change enormously even when an area with a recording defect such as a scratch is locally present. Thus, the resolution can suitably be used for determining an optimum tilt angle.

Figure 33A:
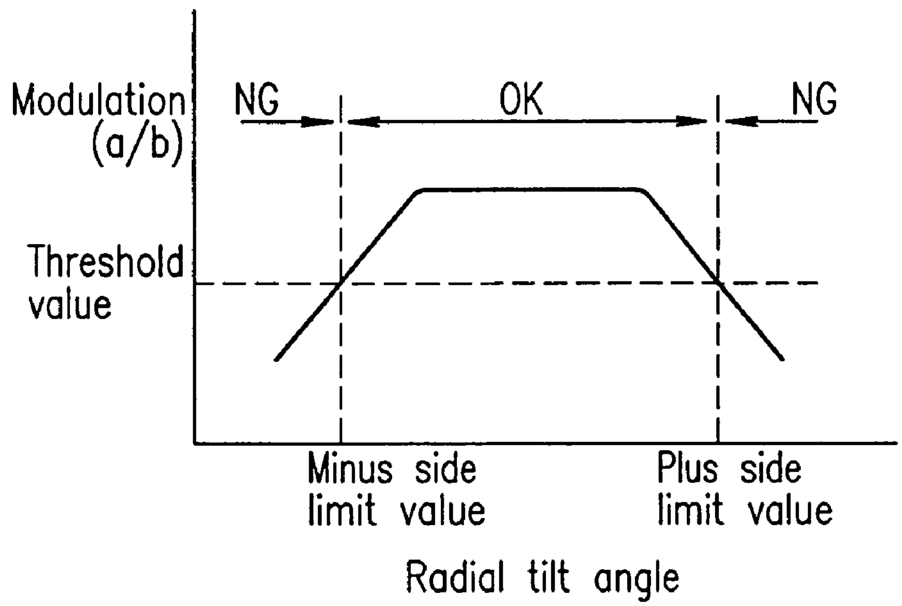
FIG. 33A is a graph showing a relationship between the radial tilt angle and the modulation.
Figure 33B:
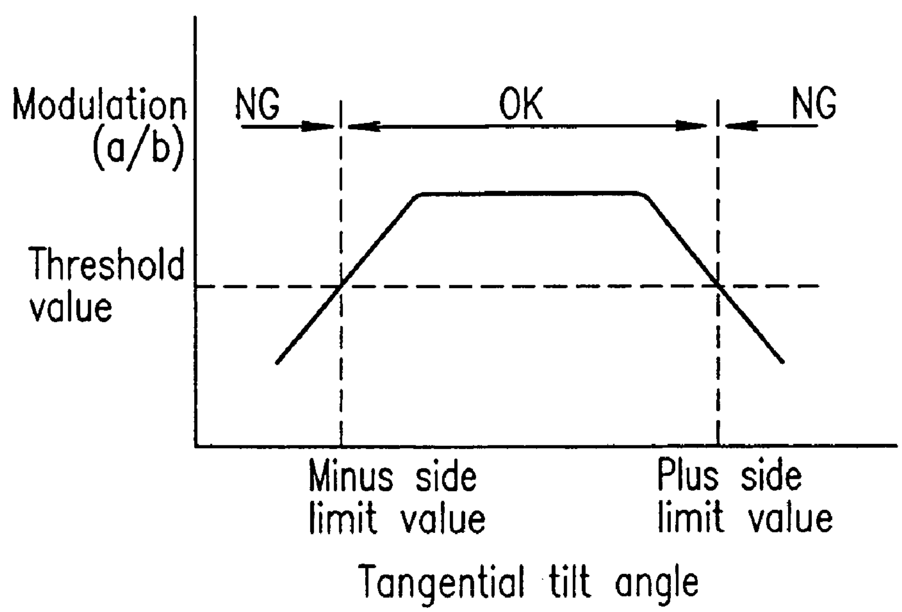
FIG. 33B is a graph showing a relationship between the tangential tilt angle and the modulation.

As another example of the detection method, a method for detecting modulation will be described. FIG. 33A shows a relationship between the radial tilt angle and the modulation. In this figure, the abscissa represents the radial tilt angle, and the ordinate represents the modulation. FIG. 33B shows a relationship between the tangential tilt angle and the modulation. The abscissa represents the tangential tilt angle, and the ordinate represents the modulation.

The modulation refers to a ratio between an AC component and a DC component in a reproduction signal in a time interval, as shown in FIG. 18. Generally, more accurate recording is performed as the modulation becomes larger, under the same reproduction conditions. It is assumed that a detection result in which the modulation becomes equal to or higher than a threshold value is OK, and a detection result in which the modulation becomes lower than a threshold value is NG.

The modulation can be detected as an average value in a measurement interval, and does not change enormously even when an area with a recording defect such as a scratch is locally present. Thus, the modulation can suitably be used for determining an optimum tilt angle.

Figure 34A:
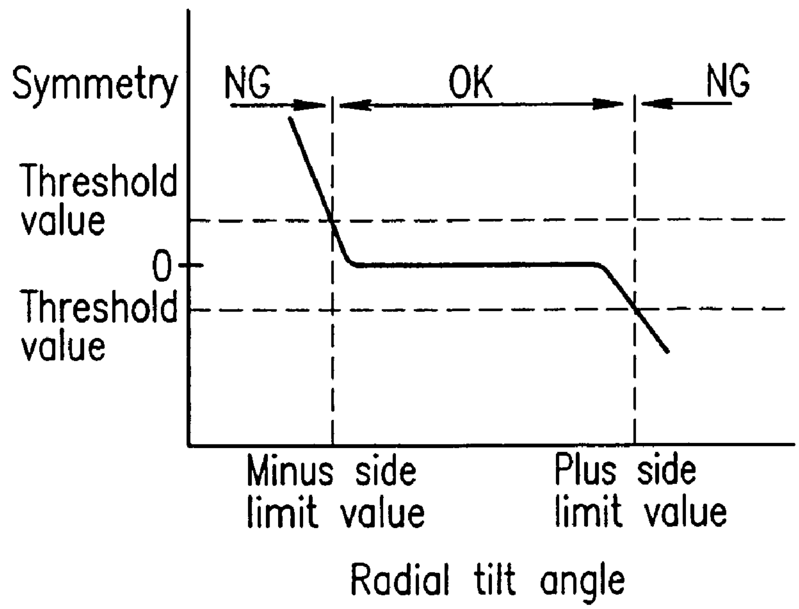
FIG. 34A is a graph showing a relationship between the radial tilt angle and the symmetry.
Figure 34B:
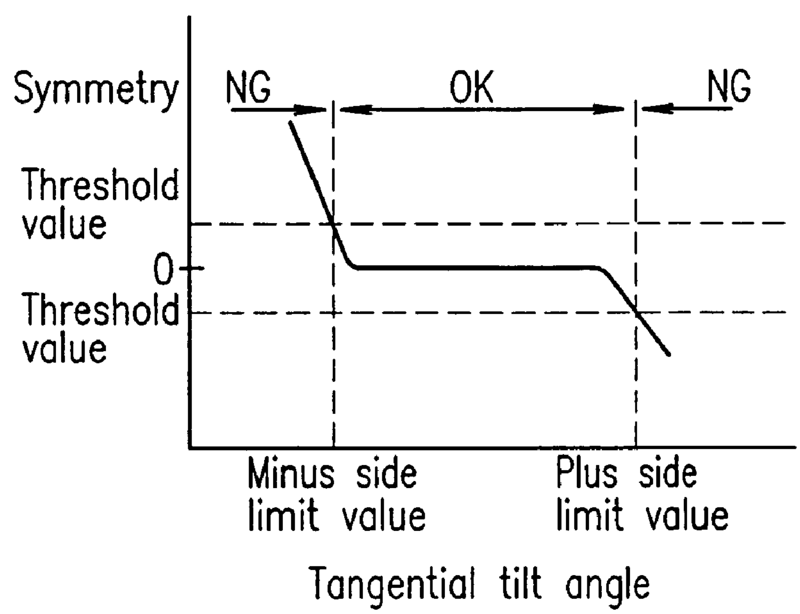
FIG. 34B is a graph showing a relationship between the tangential tilt angle and the symmetry.

As another example of the detection method, a method for detecting symmetry will be described. FIG. 34A shows a relationship between the radial angle and the symmetry. In this figure, the abscissa represents the radial tilt angle, and the ordinate represents the symmetry. FIG. 34B shows a relationship between the tangential tilt angle and the symmetry. The abscissa represents the tangential tilt angle, and the ordinate represents the symmetry.

Figure 35:
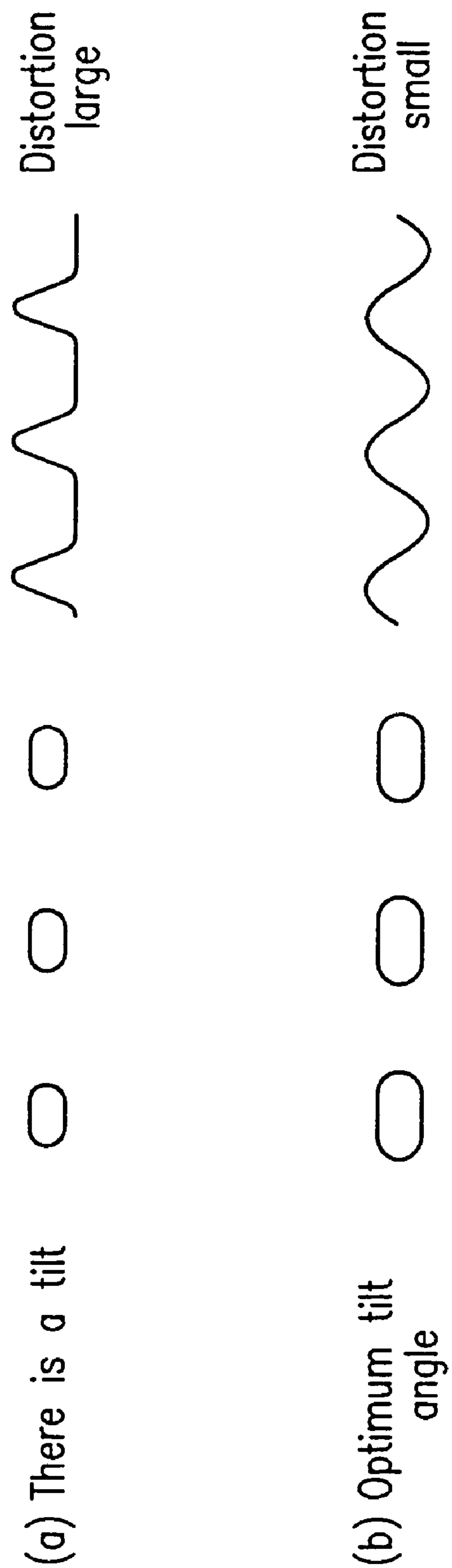
FIG. 35 is a diagram illustrating a symmetry.

The symmetry refers to a value which shows a secondary harmonic component of a reproduction signal, as shown in FIG. 35. The symmetry occurs due to a shift of a shape of a recording mark from a desired shape, caused by an aberration of a spot of a laser beam ascribed to a tilt. Generally, more accurate recording is performed as the symmetry becomes smaller, under the same reproduction conditions. It is assumed that a detection result in which an absolute value of the symmetry becomes equal to or higher than a threshold value is NG, and a detection result in which an absolute value of the symmetry becomes lower than a threshold value is OK.

The symmetry can be detected as an average value in a measurement interval, and does not change enormously even when an area with a recording defect such as a scratch is locally present. Thus, the symmetry can suitably be used for determining an optimum tilt angle.

Figure 36A:
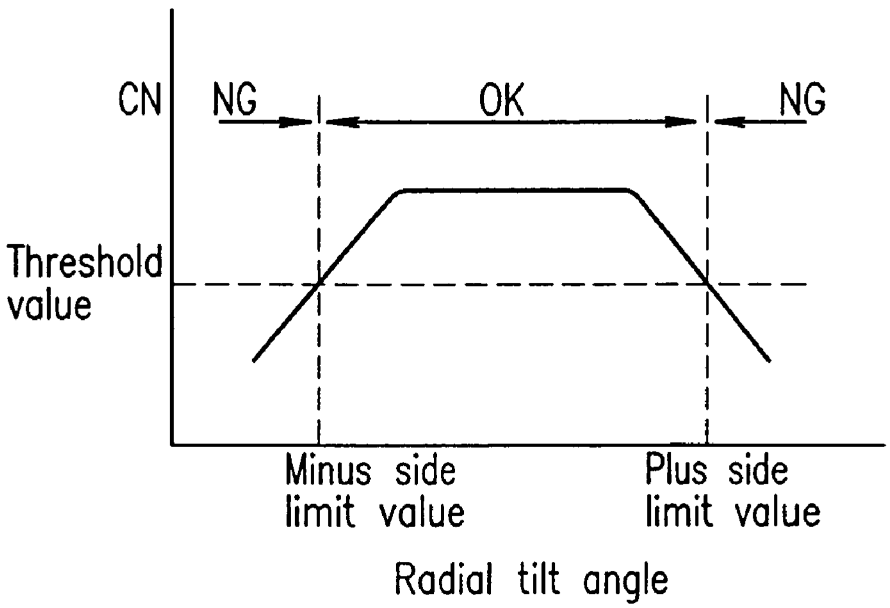
FIG. 36A is a graph showing a relationship between the radial tilt angle and the CN.
Figure 36B:
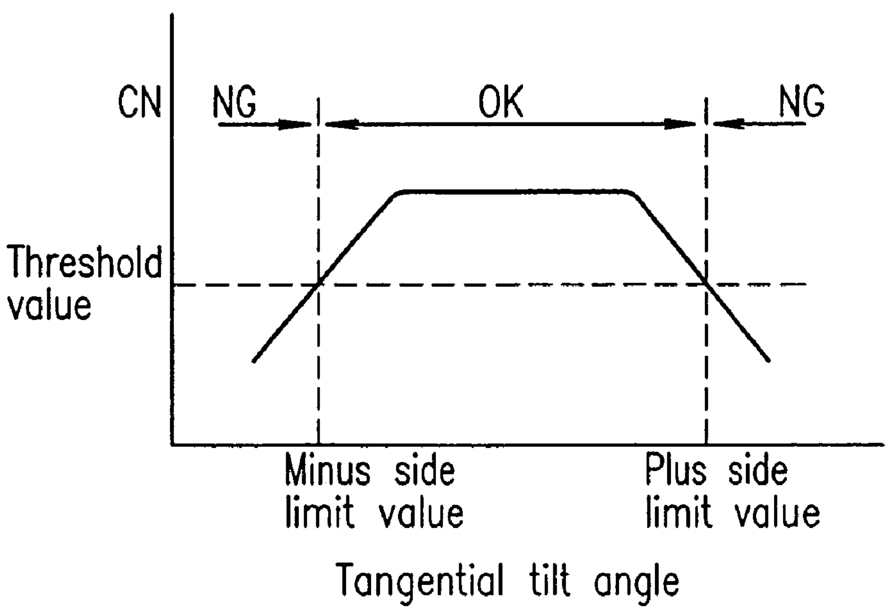
FIG. 36B is a graph showing a relationship between the tangential tilt angle and the CN.

As another example of the detection method, a method for detecting CN will be described. FIG. 36A shows a relationship between the radial tilt angle and the CN. In this figure, the abscissa represents the radial tilt angle, and the ordinate represents the CN. FIG. 36B shows a relationship between the tangential tilt angle and the CN. The abscissa represents the tangential tilt angle, and the ordinate represents the CN.

The CN refers to a ratio between a signal component and a noise of a reproduction signal at a particular frequency. Generally, more accurate recording is performed as the CN becomes larger, under the same reproduction conditions. It is assumed that a detection result in which the CN becomes equal to or higher than a threshold value is OK, and a detection result in which the CN becomes lower than a threshold value is NG.

The CN can be detected as an average value in a measurement interval, and does not change enormously even when an area with a recording defect such as a scratch is locally present. Thus, the CN can suitably be used for determining an optimum tilt angle.

In the fourth and fifth embodiments of the present invention, when an optimum radial tilt angle is determined, recording and reproduction are performed by changing only a radial tilt angle under the condition that a tangential tilt angle is fixed. However, the radial tilt angle and the tangential tilt angle may be changed simultaneously without fixing the tangential tilt angle (e.g., a ratio between the radial tilt angle and the tangential tilt angle is prescribed to be constant).

Similarly, in the fourth and fifth embodiments of the present invention, when an optimum tangential tilt angle is determined, recording and reproduction are performed by changing only a tangential tilt angle under the condition that a radial tilt angle is fixed. However, the radial tilt angle and the tangential tilt angle may be changed simultaneously without fixing the radial tilt angle (e.g., a ratio between the radial tilt angle and the tangential tilt angle is prescribed to be constant).

For example, in the case where a shift occurs in a light-emission wavelength due to the difference in laser power between recording and reproduction, which causes a difference in chromatic aberration, both a radial tilt angle and a tangential tilt angle are tilted to a plus side or a minus side from a presumed tilt angle. Therefore, when an optimum tilt angle is determined, a radial tilt angle and a tangential tilt angle are simultaneously changed, whereby a more practical optimum tilt angle can be determined.

Figure 22C:
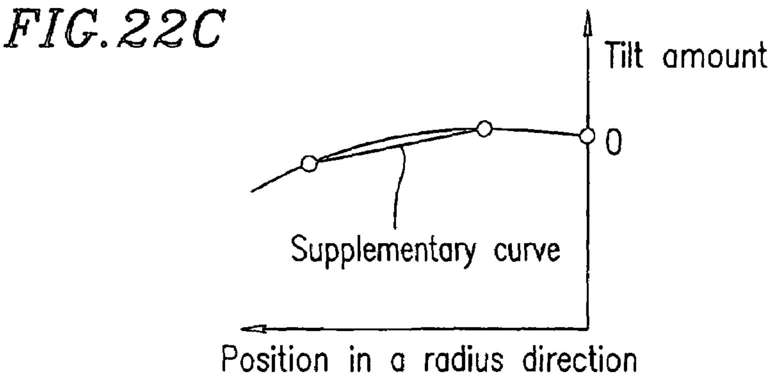
FIG. 22C is a graph showing a relationship between the position in a radius direction of the optical disk and the tilt angle.

In the fourth and fifth embodiments, prior to setting the optimum radial tilt angle and the optimum tangential tilt angle, the optical head 2 is moved to a predetermined area. This area is an outermost area 1*a* of the optical disk 1, for example, as shown in FIG. 22A. However, when the optical disk 1 is warped or when the optical disk 1 is not properly placed in an apparatus, the optimum radial tilt angle and the optimum tangential tilt angle obtained in the outermost area 1*a* of the optical disk 1 are not necessarily optimum for an inner track portion of the optical disk 1. More specifically, the optimum radial tilt angle and the optimum tangential tilt angle may be different between the outer track portion and the inner track portion of the optical disk 1. Therefore, in a plurality of places on the optical disk 1 (e.g., in an outermost track and an innermost track of the optical disk 1), an optimum radial tilt angle and an optimum tangential tilt angle are obtained, and a supplementary curve connecting the optimum tilt angle points in the outermost track and in the innermost track as shown in FIG. 22C is formed for the optimum radial tilt angle and the optimum tangential tilt angle, separately. When the optical disk 1 is recorded and reproduced, an optimum radial tilt angle and an optimum tangential tilt angle may be set, respectively, in accordance with a recording position and a reproduction position of the optical disk 1 based on the supplementary curve connecting the optimum tilt angle points in the outermost track and the innermost track.

Embodiment 6

In the sixth embodiment, an intensity (i.e. power) of output light from a semiconductor laser, which is common to a land track and a groove track of an optical disk is set.

Figure 37:
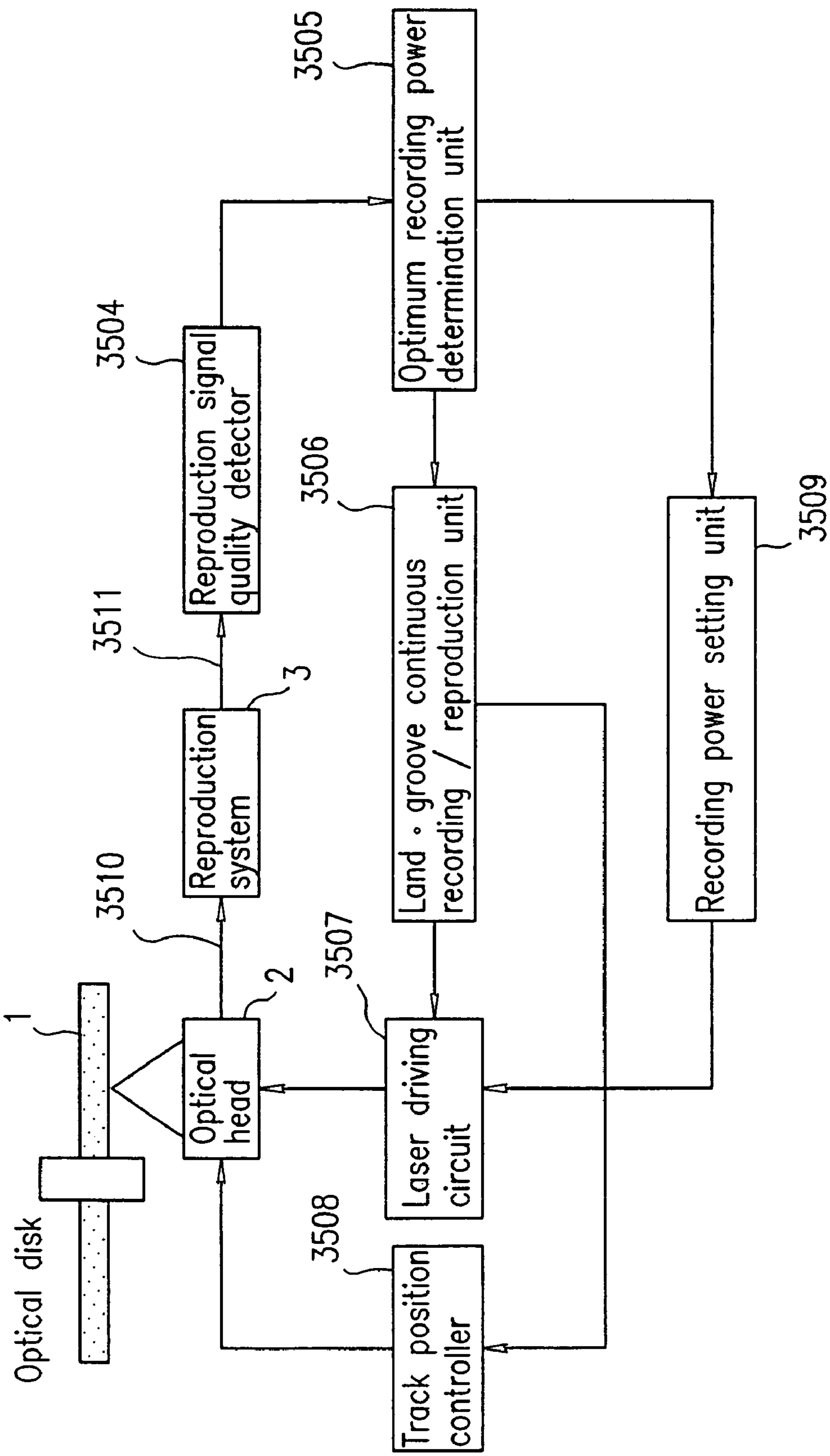
FIG. 37 is a block diagram showing the sixth embodiment of an optical disk apparatus according to the present invention.

FIG. 37 shows a structure of a phase-change type optical disk apparatus in the sixth embodiment of the present invention. In FIG. 37, reference numeral 1 denotes an optical disk, 2 denotes an optical head, 3 denotes a reproduction system, 3504 denotes a reproduction signal quality detector, 3505 denotes an optimum recording power determination unit, 3506 denotes a land•groove continuous recording/reproduction unit, 3507 denotes a laser driving circuit, 3508 denotes a track position controller, and 3509 denotes a recording power setting unit.

The optical disk 1 is as described with reference to FIG. 3.

Figure 38:
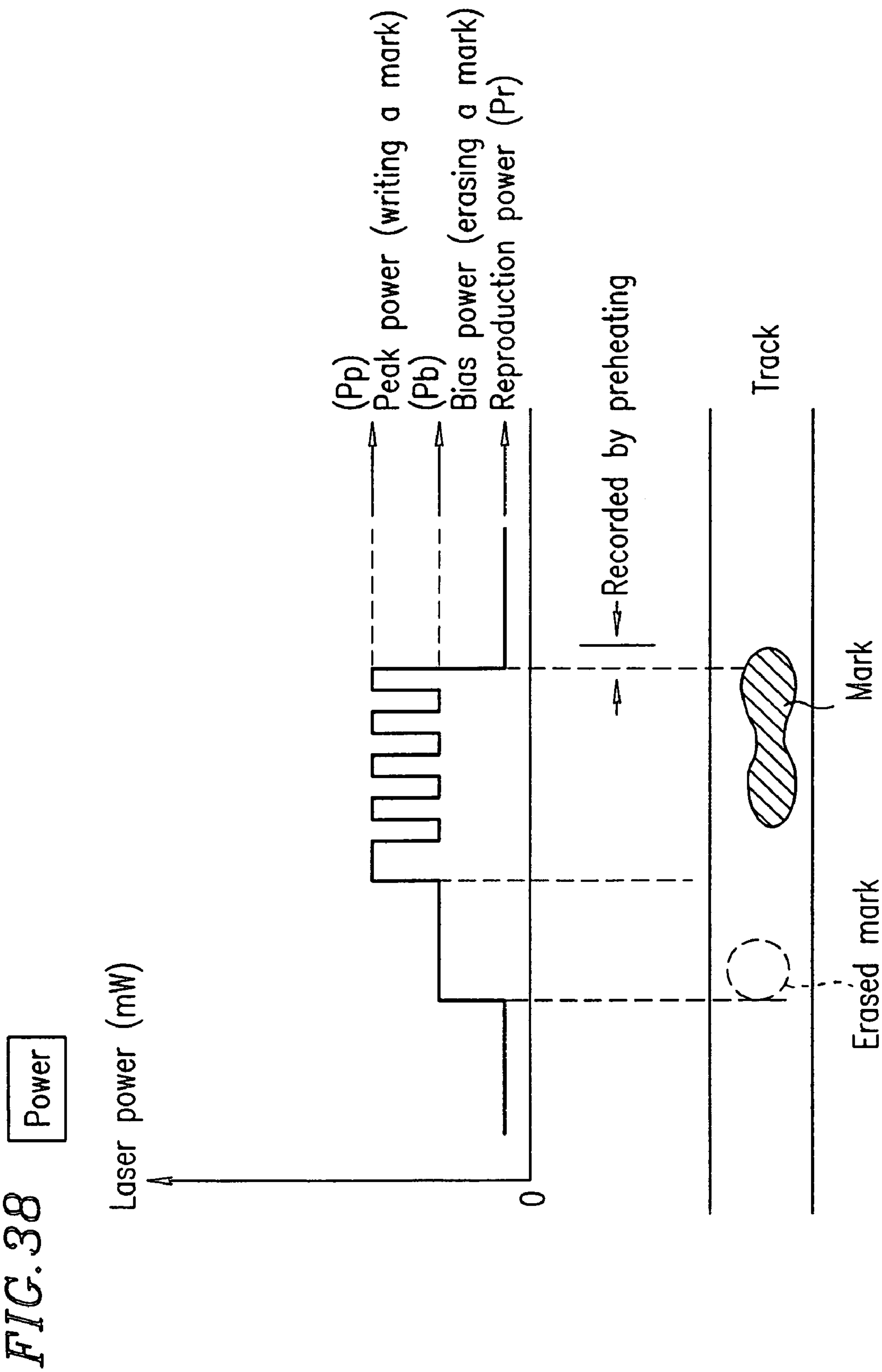
FIG. 38 is a diagram showing the power of a laser beam in the sixth embodiment of the present invention.

FIG. 38 shows an intensity (i.e., three kinds of power; a reproduction power, a bias power, and a peak power) of a laser beam from a semiconductor laser of the optical head 2, and a recording state (i.e., an erased mark and a recorded mark) of a track of the optical disk 1 obtained by using these powers.

The intensity of a laser beam from the semiconductor laser of the optical head 2 can be adjusted by the laser driving circuit 3507.

Figure 39:
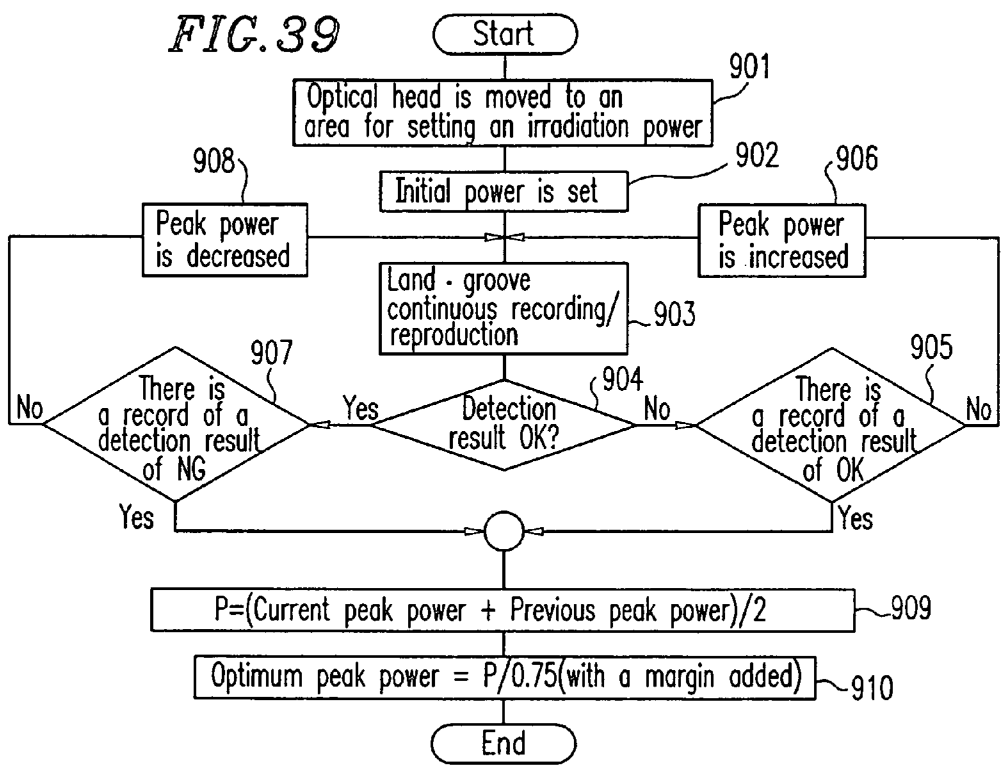
FIG. 39 is a flow chart showing process steps for determining an optimum peak power in the sixth embodiment of the present invention.

FIG. 39 is a flow chart showing process steps of an optical disk apparatus of the present embodiment. A procedure for obtaining a power of a laser beam will be described with reference to the flow chart.

In a phase-change type optical disk apparatus, powers to be determined include at least a peak power and a bias power. In the present embodiment, first, a method for determining a peak power will be described, and a method for determining a bias power will be described later.

The optical disk 1 is loaded in an optical disk apparatus. Predetermined operations such as identifying a disk type and a rotation control are performed. Thereafter, the optical head 2 is moved to an area for setting an optimum irradiation power by the track position controller 3508 (Step 901). It is assumed that this area is a recording area other than a user area provided in an innermost track or an outermost track of the optical disk 1 in which a user records data.

Initial values of the peak power and the bias power are set in the laser driving circuit 3507 by the recording power setting unit 3509 (Step 902). At this time, a power for recording the land track is identical with a power for recording the groove track.

Subsequently, a control signal for continuously recording one land track and one groove track from a predetermined position is transmitted from the land•groove continuous recording/reproduction unit 3506 to the laser driving circuit 3507 and the track position controller 3508, whereby recording is performed by the optical head 2. At this time, output light from the semiconductor laser of the optical head 2 is condensed as a light spot on the optical disk 1, whereby a recording mark is formed in accordance with a waveform of emitted light (Step 903).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 3506 to the track position controller 3508, and a signal 3510 which is varied depending upon the presence of the recording mark on the optical disk 1 is input from the optical head 2 to the reproduction system 3 as a reproduction signal. The reproduction signal 3510 is subjected to reproduction signal processing such as amplification, waveform equalization, and digitization at the reproduction system 3, and a signal 3511 is input to the reproduction signal quality detector 3504 (Step 903).

The reproduction signal quality detector 3504 detects a signal quality of the signal 3511, and a detection result of the reproduction signal quality is input to the optimum recording power determination unit 3505 (Step 904). When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when recording is performed at the above-mentioned power (Step 904).

Figure 40A:
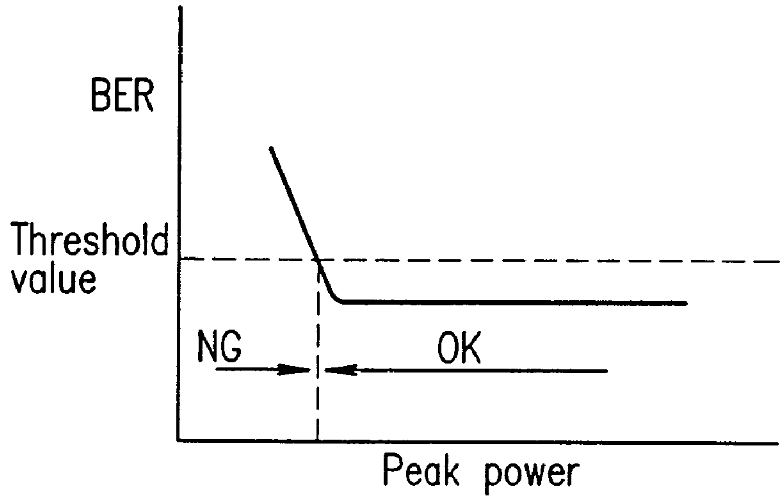
FIG. 40A is a graph showing a relationship between the peak power and the BER.

The reproduction signal quality detector 3504 detects, for example, a BER at which the recorded signal has been reproduced. FIG. 40A shows a relationship between the peak power and the BER.

In FIG. 40A, the abscissa represents the peak power, and the ordinate represents the BER. In general, under the same reproduction conditions, more accurate recording and reproduction are performed with a smaller BER. It is assumed that a detection result in which the BER becomes a threshold value or less is OK, and a detection result in which the BER exceeds the threshold value is NG.

When the first result of the reproduction signal quality detector 3504 is NG, for example, (Step 904 no, is Step 905 no), the optimum recording power determination unit 3505 sets a peak power larger than the initial power (Step 906). When the first result of the reproduction signal quality detector 3504 is OK, for example, (Step 904 yes, Step 907 no), the optimum recording power determination unit 3505 sets a peak power smaller than the initial power (Step 908). Continuous recording and continuous reproduction of the land track and the groove track at the set peak power are performed in the same way as described above (Step 903).

When the first result of the reproduction signal quality detector 3504 is NG, and the second result thereof is OK (Step 904 yes, Step 907 yes), the optimum recording power determination unit 3505 determines a power obtained by adding a predetermined margin to an average power of the current peak power and the previous peak power as an optimum peak power (Step 909 and 910).

When the first result of the reproduction signal quality detector 3504 is OK, and the second result thereof is NG (Step 904 no, Step 905 yes), the optimum recording power determination unit 3505 determines a power obtained by adding a predetermined margin to an average power of the current peak power and the previous peak power as an optimum peak power (Steps 909 and 910).

When the first result of the reproduction signal quality detector 3504 is OK, and the second result thereof is OK, the optimum recording power determination unit 3505 sets a power smaller than the peak power used during the second recording, and continuous recording and continuous reproduction of the land track and the groove track are performed at the set peak power, whereby a reproduction signal quality is detected. When the third result of the reproduction signal quality detector 3504 is NG, the optimum recording power determination unit 3505 determines a power obtained by adding a predetermined margin to an average power of the current peak power and the previous peak power as an optimum peak power (Steps 909 and 910). The recording power setting unit 3509 selects the optimum peak power when data is recorded.

In the present embodiment, a movement path of a light spot on the optical disk 1 is similar to that of the first embodiment, which has been described with reference to FIG. 3.

As described above, in order to obtain an optimum peak power, the land track and the groove track are recorded and reproduced by an equal or almost equal length, whereby an average characteristic of the land track and the groove track is obtained as an optimum peak power, and an optimum peak power suitable for the land track and the groove track is determined.

Furthermore, in the present embodiment, recording and reproduction of the land track and the groove track are continuously performed. Therefore, it takes less time, compared with the case where optimum peak powers are obtained for the land track and the groove track, separately, and the obtained peak powers are averaged.

For example, when a land track is recorded once and a groove track is recorded once in order to obtain an optimum peak power, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in a conventional apparatus, optimum peak powers are obtained for a land track and a groove track, separately, so that a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 levels of peak powers so as to obtain an optimum peak power, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum recording power, whereby an optimum recording power for recording a user area can be determined in a short period of time, shortening a waiting time for rotation.

Next, a procedure for determining a bias power will be described. A bias power has a narrower margin of power at which user data can be recorded, compared with a peak power. For example, a margin of the peak power is about 6 mW (9 mW to 15 mW), whereas a margin of the bias power is about 3 mW (3 mW to 6 mW).

In the present embodiment, in order to obtain an optimum value of a bias power, a lower limit value and an upper limit value of a bias power at which user data can be recorded is obtained, and thereafter, an optimum value between the lower limit value and the upper limit value is obtained by computation.

A procedure for obtaining a bias power will be described with reference to a flow chart shown in FIG. 41.

The optical disk 1 is loaded in an optical disk apparatus. Predetermined operations such as identifying a disk type and a rotation control are performed. Thereafter, the optical head 2 is moved to an area for setting an optimum irradiation power by the track position controller 3508 (Step 1001).

Initial values of the peak power and the bias power are set in the laser driving circuit 3507 by the recording power setting unit 3509, for example, for obtaining a lower limit value of the bias power (Step 1002). At this time, a power for recording the land track is identical with a power for recording the groove track.

Subsequently, a control signal for continuously recording one land track and one groove track from a predetermined position is transmitted from the land•groove continuous recording/reproduction unit 3506 to the laser driving circuit 3507 and the track position controller 3508, whereby recording is performed by the optical head 2. At this time, output light from the semiconductor laser of the optical head 2 is condensed as a light spot on the optical disk 1, whereby a recording mark is formed in accordance with a waveform of emitted light (Step 1003).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 3506 to the track position controller 3508, and a signal 3510 which is varied depending upon the presence of the recording mark on the optical disk 1 is input from the optical head 2 to the reproduction system 3 as a reproduction signal. The reproduction signal 3510 is subjected to reproduction signal processing such as amplification, waveform equalization, and digitization at the reproduction system 3, and a signal 3511 is input to the reproduction signal quality detector 3504 (Step 1003).

The reproduction signal quality detector 3504 detects a signal quality of the signal 3511, and a detection result of the reproduction signal quality is input to the optimum recording power determination unit 3505 (Step 1004). When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when recording is performed at the above-mentioned power (Step 1004).

Figure 40B:
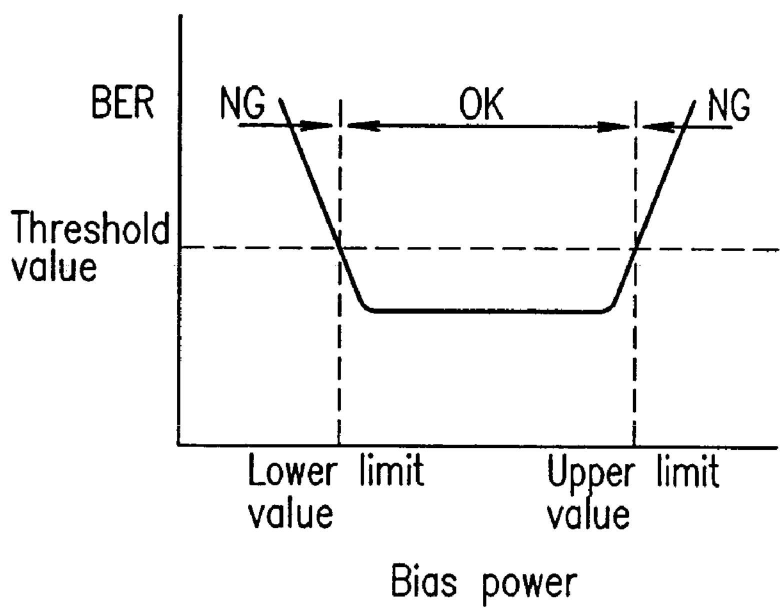
FIG. 40B is a graph showing a relationship between the bias power and the BER.

The reproduction signal quality detector 3504 detects, for example, a BER at which the recorded signal has been reproduced. FIG. 40B shows a relationship between the bias power and the SER.

In FIG. 40B, the abscissa represents the bias power, and the ordinate represents the BER. In general, under the same reproduction conditions, more accurate recording and reproduction are performed with a smaller BER. It is assumed that a detection result in which the BER becomes a threshold value or less is OK, and a detection result in which the BER exceeds the threshold value is NG.

When the first result of the reproduction signal quality detector 3504 is NG, for example, (Step 1004 no, Step 1005 no), the optimum recording power determination unit 3505 sets a bias power larger than the initial power (Step 1006). When the first result of the reproduction signal quality detector 3504 is OK, for example, (Step 1004 yes, Step 1007 no), the optimum recording power determination unit 3505 sets a bias power smaller than the initial power (Step 1008). Continuous recording and continuous reproduction of the land track and the groove track at the set bias power are performed in the same way as described above (Step 1003).

When the first result of the reproduction signal quality detector 3504 is NG, and the second result thereof is OK (Step 1004 yes, Step 1007 yes), the optimum recording power determination unit 3505 stores an average power of the current bias power and the previous bias power as a lower limit value of the bias power (Step 1009).

When the first result of the reproduction signal quality detector 3504 is OK, and the second result thereof is NG (Step 1004 no, Step 1005 yes), the optimum recording power determination unit 3505 stores an average power of the current bias power and the previous bias power as a lower limit value of the bias power (Step 1009).

When the first result of the reproduction signal quality detector 3504 is OK, and the second result thereof is OK, the optimum recording power determination unit 3505 sets a power smaller than the bias power used during the second recording, and continuous recording and continuous reproduction of the land track and the groove track are performed at the set bias power, whereby a reproduction signal quality is detected. When the third result of the reproduction signal quality detector 3504 is NG, the optimum recording power determination unit 3505 stores an average power of the current bias power and the previous bias power as a lower limit value of the bias power.

An upper limit value of the bias power is obtained in a similar procedure to that of the lower limit value in accordance with each of Steps 1010 to 1017. More specifically, every time the result of the reproduction signal quality detector 3504 is OK, the bias power is gradually increased. When the result of the reproduction signal quality detector 3504 becomes NG, the optimum recording power determination unit 3505 stores an average power of the current bias power and the previous bias power as an upper limit value of the bias power.

The optimum recording power determination unit 3505 determines an average value of the lower limit value and the upper limit value, for example, as the optimum bias power (Step 1018). The recording power setting unit 3509 selects the optimum bias power when data is erased and recorded.

When the lower limit value and the upper limit value are obtained, the initial value of the bias power for obtaining the upper limit value is prescribed to be higher than that of the bias power for obtaining the lower limit value. More specifically, by starting from the values close to the respective limit values, with the initial value of the bias power for obtaining the lower limit value being different from the initial value of the bias power for obtaining the upper limit value, a bias power is optimized in a short period of time.

In the present embodiment, an average value of the lower limit value and the upper limit value is determined as an optimum bias power. However, in the case where an effective power is likely to become much smaller than the set optimum power in an area of the optical disk 1 in which user data is actually recorded, for example, due to the warpage of a disk, a value which divides the lower limit value and the upper limit value, for example, in a ratio of 2:1 may be determined as the optimum power. By determining the value which divides the lower limit value and the upper limit value in a ratio of 2:1 as the optimum power, a tolerance for the low power side becomes large.

The reproduction signal quality detector 3504 may be designed in such a manner that it detects a BER at which a recorded signal has been reproduced, and does not count errors generated continuously at a predetermined time or times. Thus, even when an area with a reproduction defect such as a scratch is locally present, the effect thereof can be eliminated, and an optimum equalizer characteristic can be determined more accurately.

Furthermore, the reproduction signal quality detector 3504 is designed to detect a BER at which a recorded signal has been reproduced. However, the reproduction signal quality detector 3504 may detect a bit error rate, for example, as long as a reproduction signal quality can be detected.

Figure 42A:
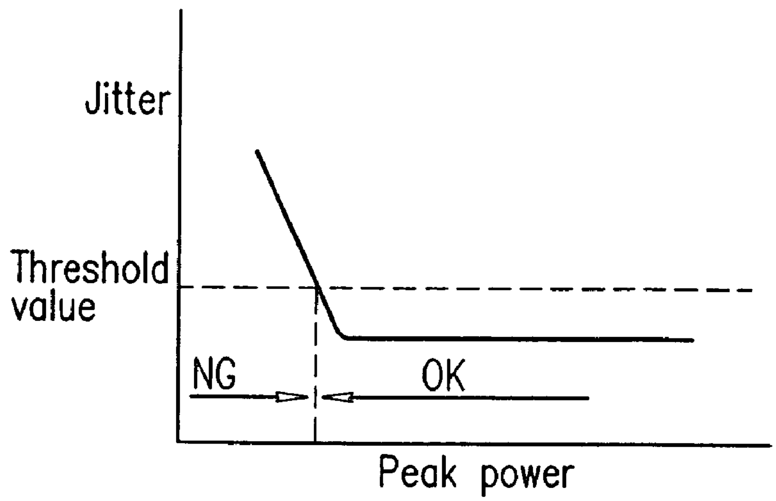
FIG. 42A is a graph showing a relationship between the peak power and the jitter.
Figure 42B:
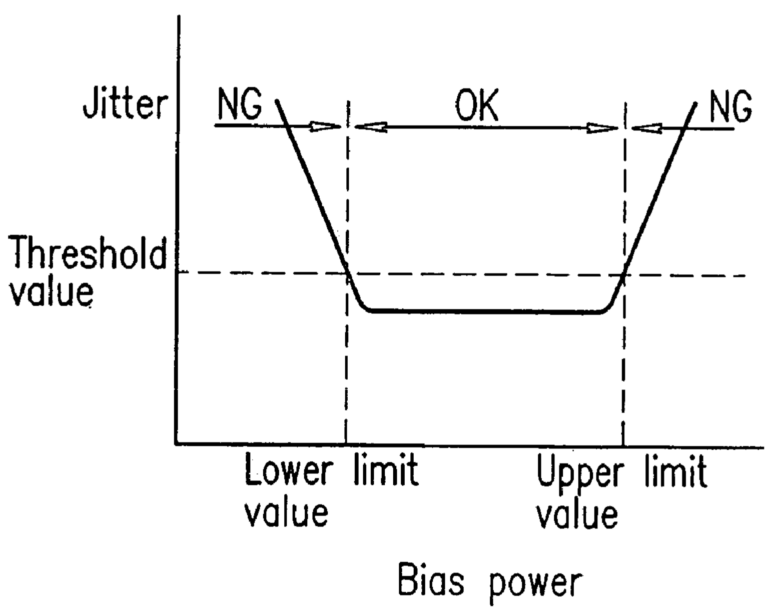
FIG. 42B is a graph showing the bias power and the jitter.

As another example of the detection method, a method for detecting a jitter will be exemplified. FIG. 42A shows a relationship between the peak power and the jitter. In this figure, the abscissa represents the peak power, and the ordinate represents the jitter. FIG. 42B shows a relationship between the bias power and the jitter. In this figure, the abscissa represents the bias power, and the ordinate represents the jitter.

The jitter refers to a time shift between a reproduction signal and an original signal. Generally, more accurate reproduction is performed as the jitter becomes smaller, under the same recording conditions. It is assumed that a detection result in which the jitter becomes equal to or lower than a threshold value is OK, and a detection result in which the jitter exceeds a threshold value is NG.

The jitter can be detected as an average value in a measurement interval, and does not change enormously even when an area with a recording defect such as a scratch is locally present. Thus, the jitter can suitably be used for determining an optical power.

Figure 43A:
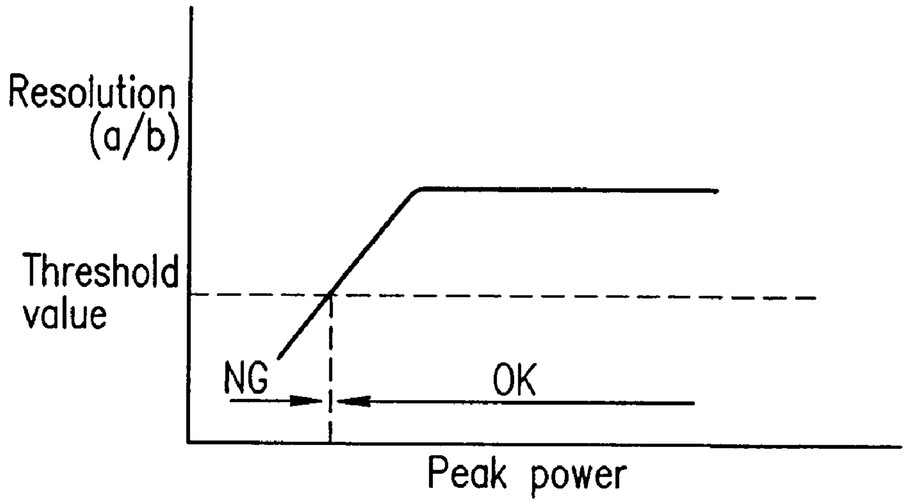
FIG. 43A is a graph showing a relationship between the peak power and the resolution.
Figure 43B:
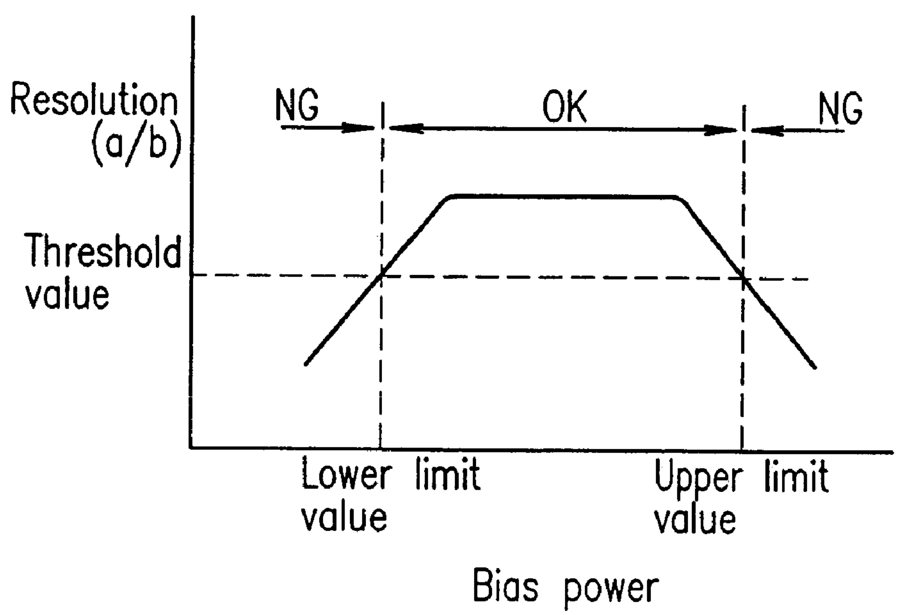
FIG. 43B is a graph showing a relationship between the bias power and the resolution.

As another example of the detection method, a method for detecting resolution will be described. FIG. 43A shows a relationship between the peak power and the resolution. In this figure, the abscissa represents the peak power, and the ordinate represents the resolution. FIG. 43B shows a relationship between the bias power and the resolution. The abscissa represents the bias power, and the ordinate represents the resolution.

The resolution refers to a ratio between an amplitude of a reproduction signal in the shortest period and an amplitude of a reproduction signal in the longest period, as shown in FIG. 16. Generally, more accurate recording is performed as the resolution becomes larger, under the same reproduction conditions. It is assumed that a detection result in which the resolution becomes equal to or higher than a threshold value is OK, and a detection result in which the resolution becomes lower than a threshold value is NG.

The resolution can be detected as an average value in a measurement interval, and does not change enormously even when an area with a recording defect such as a scratch is locally present. Thus, the resolution can suitably be used for determining an optimum power.

Figure 44A:
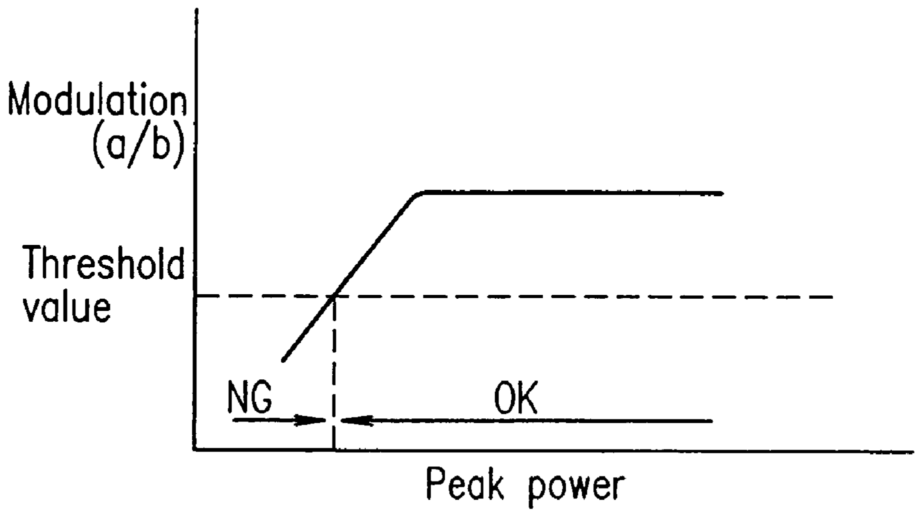
FIG. 44A is a graph showing a relationship between the peak power and the modulation.
Figure 44B:
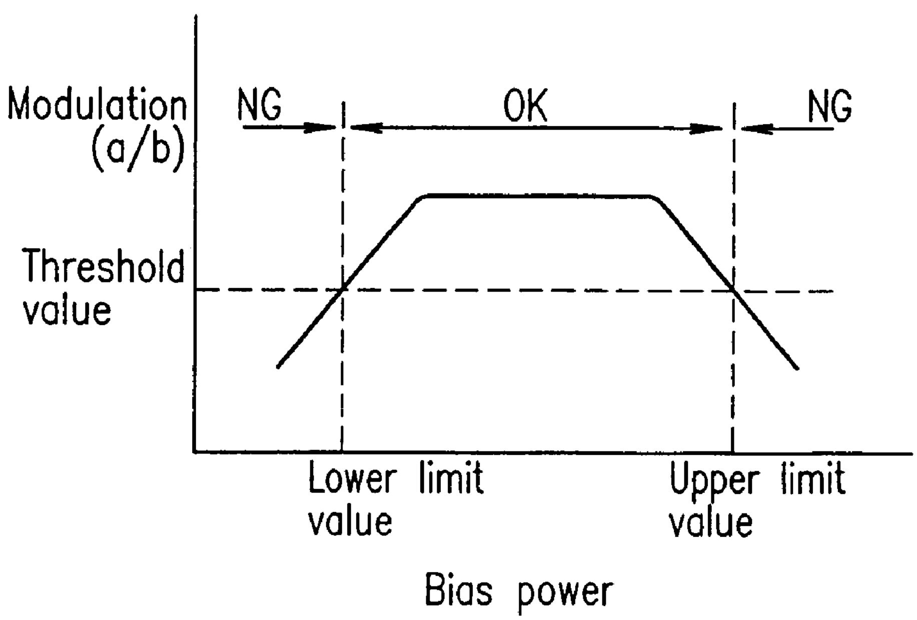
FIG. 44 is a graph showing a relationship between the bias power and the modulation.

As another example of the detection method, a method for detecting modulation will be described. FIG. 44A shows a relationship between the peak power and the modulation. In this figure, the abscissa represents the peak power, and the ordinate represents the modulation. FIG. 44B shows a relationship between the bias power and the modulation. The abscissa represents the bias power, and the ordinate represents the modulation.

The modulation refers to a ratio between an AC component and a DC component in a reproduction signal in a time interval, as shown in FIG. 18. Generally, more accurate recording is performed as the modulation becomes larger, under the same reproduction conditions. It is assumed that a detection result in which the modulation becomes equal to or higher than a threshold value is OK, and a detection result in which the modulation becomes lower than a threshold value is NG.

The modulation can be detected as an average value in a measurement interval, and does not change enormously even when an area with a recording defect such as a scratch is locally present. Thus, the modulation can suitably be used for determining an optimum power.

Figure 45A:
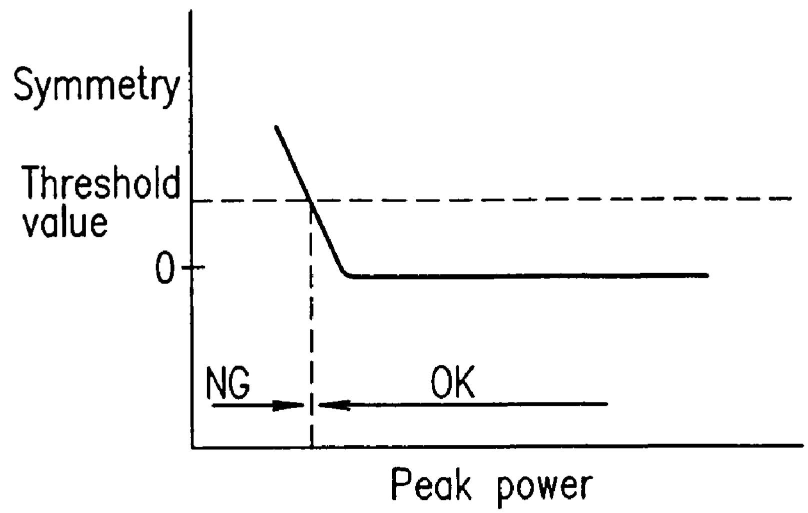
FIG. 45A is a graph showing a relationship between the peak power and the symmetry.

As another example of the detection method, a method for detecting symmetry will be described. FIG. 45A shows a relationship between the peak power and the symmetry. In this figure, the abscissa represents the peak power, and the ordinate represents the symmetry.

Figure 45B:
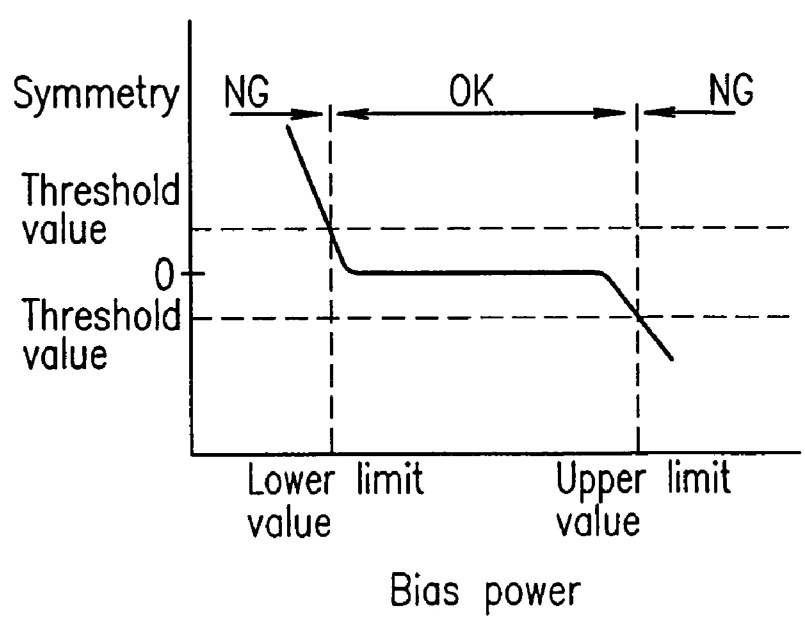
FIG. 45B is a graph showing a relationship between the bias power and the symmetry.

FIG. 45B shows a relationship between the bias power and the symmetry. The abscissa represents the bias power, and the ordinate represents the symmetry.

Figure 46:
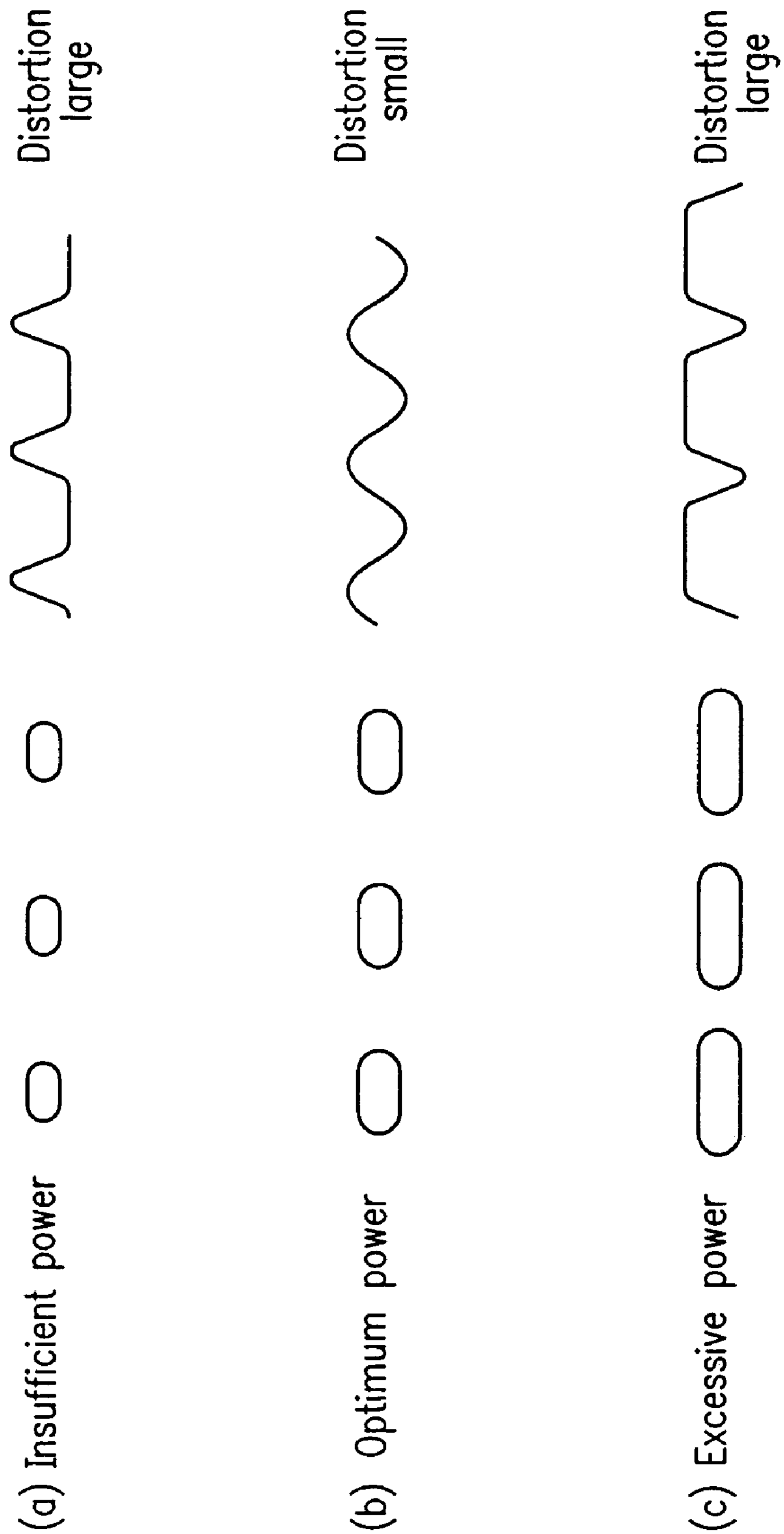
FIG. 46 is a diagram illustrating a symmetry.

The symmetry refers to a value which shows a secondary harmonic component of a reproduction signal, as shown in FIG. 46. The symmetry occurs due to a shift of a shape of a recording mark from a desired shape, caused by an insufficient irradiation power or an excessive irradiation power of a laser beam. Generally, more accurate recording is performed as the symmetry becomes smaller, under the same reproduction conditions. It is assumed that a detection result in which an absolute value of the symmetry becomes equal to or higher than a threshold value is NG, and a detection result in which an absolute value of the symmetry becomes lower than a threshold value is OK.

The symmetry can be detected as an average value in a measurement interval, and does not change enormously even when an area with a recording defect such as a scratch is locally present. Thus, the symmetry can suitably be used for determining an optimum power.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording is performed on a sector basis, an area to be continuously recorded and reproduced may be one track or less. Therefore, a waiting time for rotation will be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and an optimum power can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and an optimum power can be determined more accurately.

Furthermore, if the worst value of a block detected by the reproduction signal quality detector 3504 is not adopted when two or more blocks are continuously recorded and reproduced, even when a block with a recording defect such as a scratch is present, the block can be eliminated. Thus, an optimum power can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and an optimum power can be determined more accurately.

Furthermore, if the worst value of a sector detected by the reproduction signal quality detector 3504 is not adopted when two or more sectors are continuously recorded and reproduced, even when a sector with a recording defect such as a scratch is present, the sector can be eliminated. Thus, an optimum power can be determined more accurately.

In the present embodiment of the present invention, when an optimum peak power is determined, recording is performed by changing only a peak power under the condition that a bias power is fixed. However, the peak power and the bias power may be changed simultaneously without fixing the bias power (e.g., a ratio between the peak power and the bias power is prescribed to be constant). Similarly, when an optimum bias power is determined, the peak power and the bias power may be changed simultaneously without fixing the peak power (e.g., a ratio between the peak power and the bias power is prescribed to be constant).

For example, in the case where a dust adheres to a lens, both a peak power and a bias power become lower than the presumed power. Therefore, when an optimum power is determined, a peak power and a bias power are simultaneously changed, whereby a more practical optimum power can be determined.

A signal with a pattern different from a recording signal for performing the continuous recording may be recorded in an area to be continuously recorded before each continuous recording for detecting a reproduction signal quality. By recording such a signal with a different pattern, a previously recorded signal component remaining in the area is made small (e.g., the signal component is recorded with a power lower than that of the previous recording), and the previously recorded signal will be not reproduced erroneously even in the case where sufficient recording has not been performed. Thus, a power can be optimized more accurately.

Furthermore, recording may be performed in the area to be continuously recorded only by using a bias power before each continuous recording for detecting a reproduction signal quality. By performing recording with only a bias power, the previously recorded signal component remaining in the area is made small (e.g., the signal component is recorded with a power lower than the previous recording), and the previously recorded signal will be not reproduced erroneously even in the case where sufficient recording has not been performed. Thus, a power can be optimized more accurately.

Embodiment 7

The seventh embodiment is different from the sixth embodiment in the steps of obtaining the intensity of output light of a semiconductor laser, i.e., the power of a laser beam.

Figure 47:
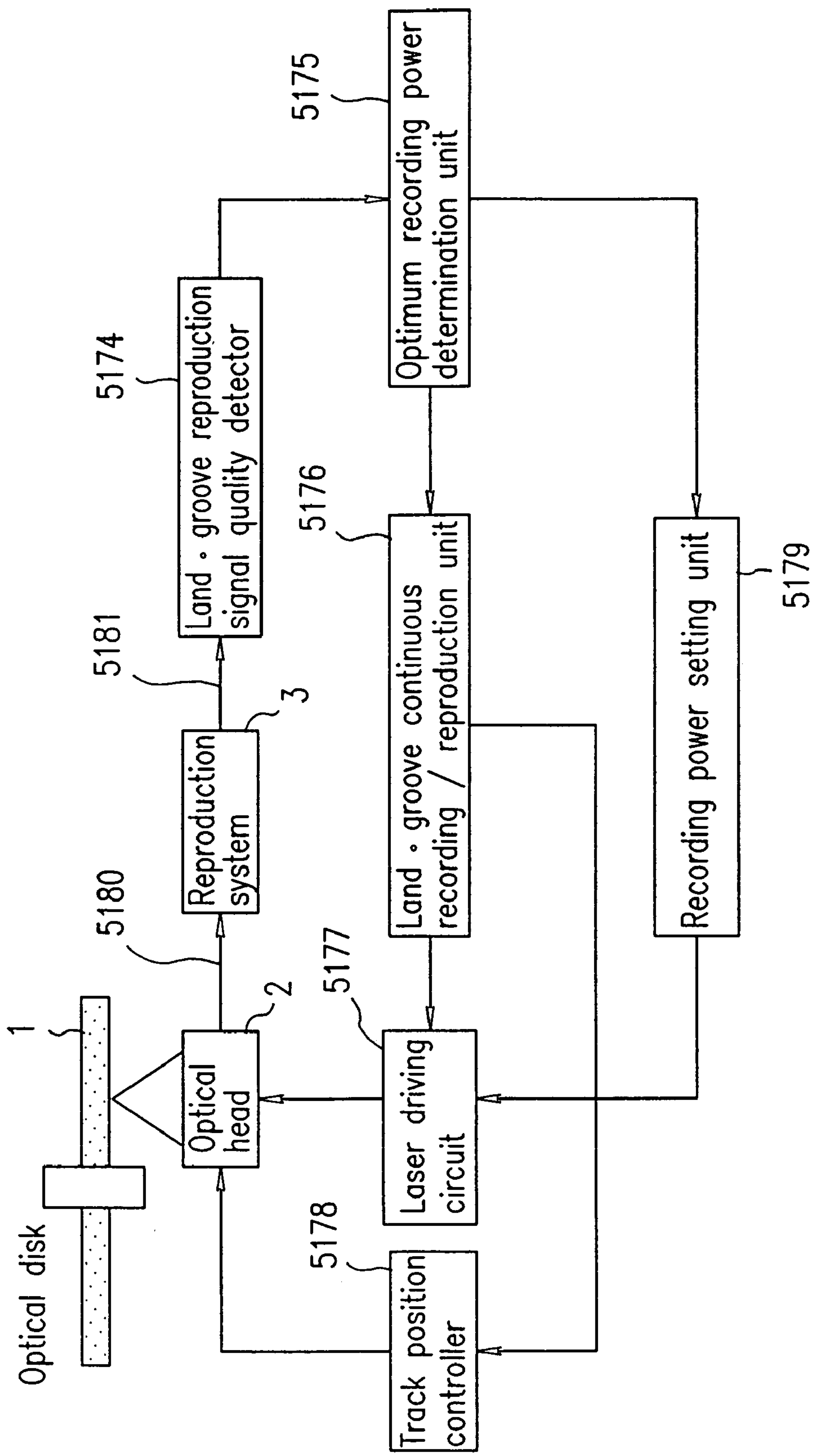
FIG. 47 is a block diagram showing the seventh embodiment of an optical disk apparatus according to the present invention.

FIG. 47 shows a structure of a phase-change type optical disk apparatus in the seventh embodiment of the present invention. In FIG. 47, reference numeral 1 denotes an optical disk, 2 denotes an optical head, 3 denotes a reproduction system, 5174 denotes a land•groove reproduction signal quality detector, 5175 denotes an optimum recording power determination unit, 5176 denotes a land•groove continuous recording/reproduction unit, 5177 denotes a laser driving circuit, 5178 denotes a track position controller, and 5179 denotes a recording power setting unit.

The optical disk 1 is as described with reference to FIG. 3.

Figure 48:
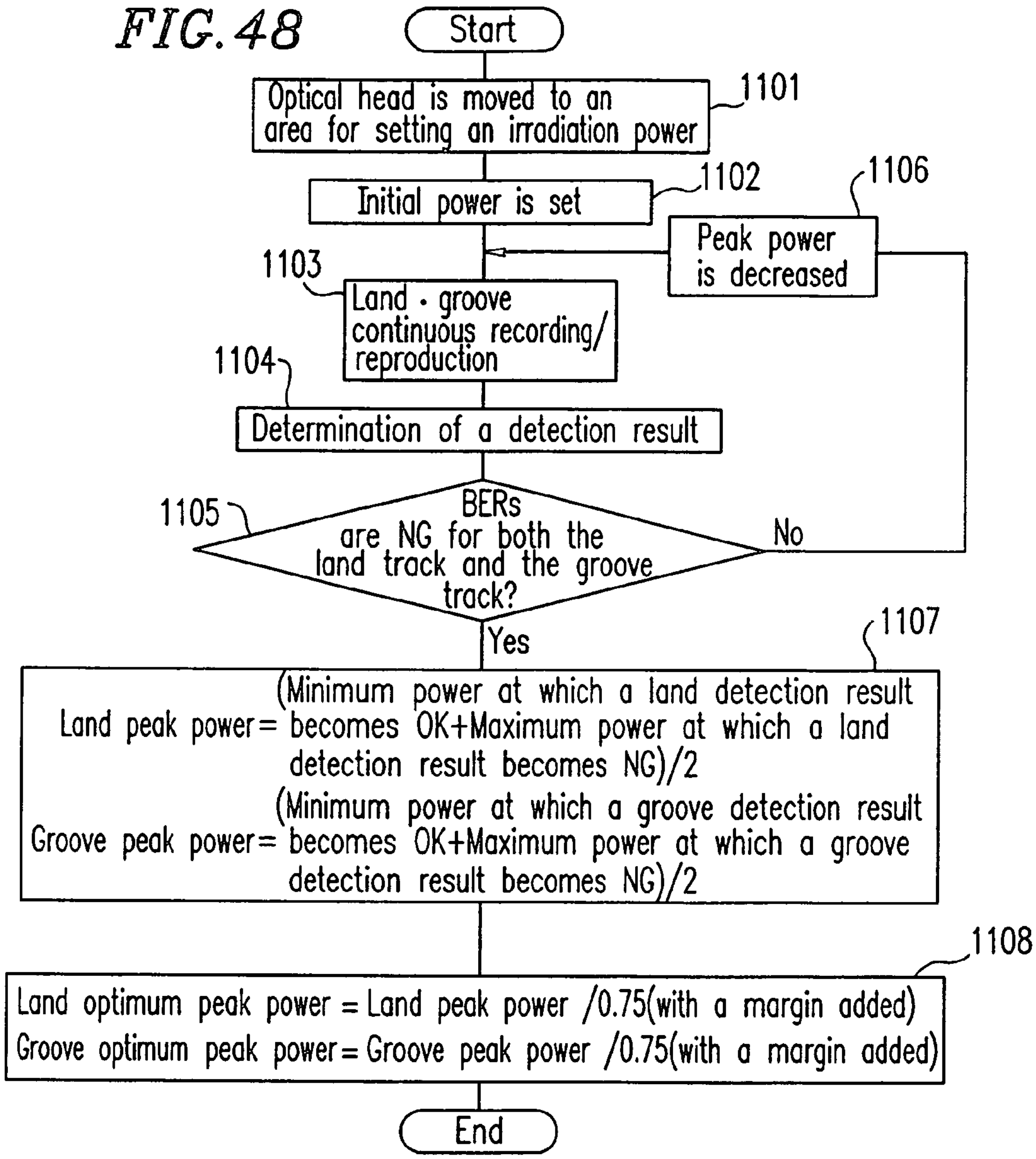
FIG. 48 is a flow chart showing process steps for determining an optimum peak power in the seventh embodiment according to the present invention.

FIG. 48 is a flow chart showing process steps of an optical disk apparatus of the present embodiment. A procedure for obtaining a power of a laser beam will be described with reference to the flow chart.

In a phase-change type optical disk apparatus, powers to be determined include at least a peak power and a bias power. In the present embodiment, first, a method for determining a peak power will be described, and a method for determining a bias power will be described later.

The optical disk 1 is loaded in an optical disk apparatus. Predetermined operations such as identifying a disk type and a rotation control are performed. Thereafter, the optical head 2 is moved to an area for setting an optimum irradiation power by the track position controller 5178 (Step 1101). It is assumed that this area is a recording area other than a user area provided in an innermost track or an outermost track of the optical disk 1 in which a user records date.

Initial values of the peak power and the bias power are set in the laser driving circuit 5177 by the recording power setting unit 5179 (Step 1102). At this time, a power for recording the land track is identical with a power for recording the groove track.

Subsequently, a control signal for continuously recording one land track and one groove track from a predetermined position is transmitted from the land•groove continuous recording/reproduction unit 5176 to the laser driving circuit 5177 and the track position controller 5178, whereby recording is performed by the optical head 2. At this time, output light from the semiconductor laser of the optical head 2 is condensed as a light spot on the optical disk 1, whereby a recording mark is formed in accordance with a waveform of emitted light (Step 1103).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 5176 to the track position controller 5178, and a signal 5180 which is varied depending upon the presence of the recording mark on the optical disk 1 is input from the optical head 2 to the reproduction system 3 as a reproduction signal. The reproduction signal 5180 is subjected to reproduction signal processing such as amplification, waveform equalization, and digitization at the reproduction system 3, and a signal 5181 is input to the land•groove reproduction signal quality detector 5174 (Step 1103).

The land•groove reproduction signal quality detector 5174 detects a signal quality of the signal 5181 for the land track and the groove track, separately, and a detection result of the reproduction signal quality is input to the optimum recording power determination unit 5175 (Step 1104).

The land•groove reproduction signal quality detector 5174 detects, for example, a BER at which the recorded signal has been reproduced.

For example, when BERs are OK for both the land track and the groove track, as a detection result of the reproduction signal quality detector 5174 (Step 1105 no), the optimum recording power determination unit 5175 sets a peak power at which BERs become OK for both the land track and the groove track as an initial power (Step 1106). While the peak power is gradually decreased, continuous recording and continuous reproduction of the land track and the groove track are performed at each time, and results of the land•groove reproduction signal quality detector 5174 at the respective peak powers are stored. When BERs become NG for both the land track and the groove track (Step 1105 yes), an average power of a minimum peak power at which the BER is OK and a maximum peak power at which the BER is NG is obtained for the land track and the groove track, respectively, (Step 1107), and each power obtained by adding a certain margin to these average powers is determined as each optimum peak power (Step 1108).

In the present embodiment, a movement path of a light spot on the optical disk 1 is similar to that of the first embodiment, which has been described with reference to FIG. 3.

In the present embodiment, recording and reproduction of the land track and the groove track are continuously performed. Therefore, it takes less time, compared with the case where optimum powers are obtained for the land track and the groove track, separately.

For example, when a land track is recorded once and a groove track is recorded once in order to obtain an optimum power, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in the case where optimum powers are obtained for a land track and a groove track, separately, a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 kinds of powers so as to obtain an optimum power, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum power, whereby an optimum power for recording a user area can be determined in a short period of time, shortening a waiting time for rotation.

Next, a procedure for determining a bias power will be described. A bias power has a narrower margin of power at which user data can be recorded, compared with a peak power. For example, a margin of the peak power is about 6 mW (9 mW to 15 mW), whereas a margin of the bias power is about 3 mW (3 mW to 6 mW).

In the present embodiment, in order to obtain an optimum value of a bias power, a lower limit value and an upper limit value of a bias power at which user data can be recorded is obtained, and thereafter, an optimum value between the lower limit value and the upper limit value is obtained by computation.

Figure 49:
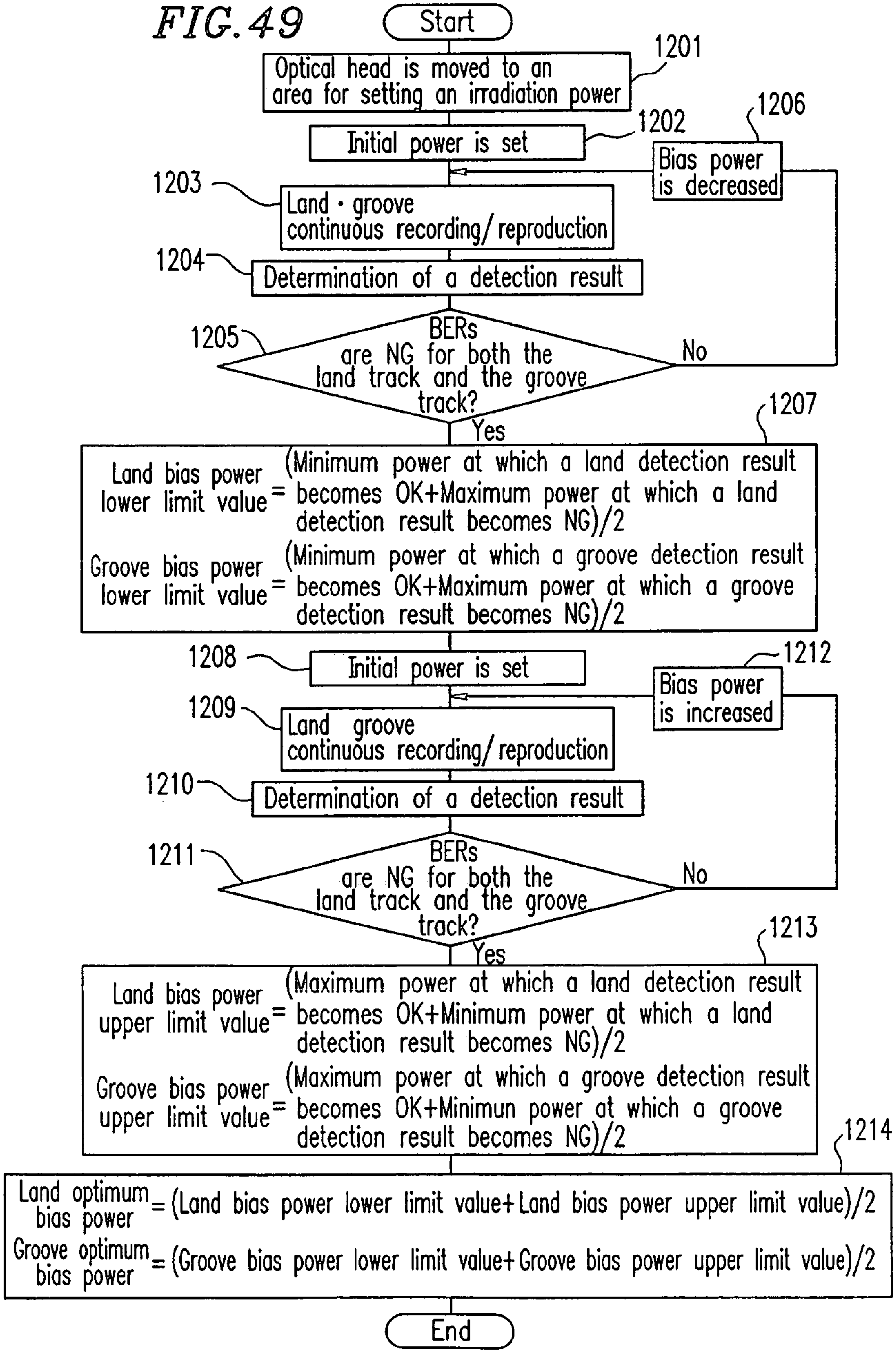
FIG. 49 is a flow chart showing process steps for determining an optimum bias power in the seventh embodiment according to the present invention.

A procedure for obtaining a bias power will be described with reference to a flow chart shown in FIG. 49.

The optical disk 1 is loaded in an optical disk apparatus. Predetermined operations such as identifying a disk type and a rotation control are performed. Thereafter, the optical head 2 is moved to an area for setting an optimum irradiation power by the track position controller 5178 (Step 1201).

Initial values of the peak power and the bias power are set in the laser driving circuit 5177 by the recording power setting unit 5179, for example, for obtaining a lower limit value of the bias power (Step 1202). At this time, a power for recording the land track is identical with a power for recording the groove track.

Subsequently, a control signal for continuously recording one land track and one groove track from a predetermined position is transmitted from the land•groove continuous recording/reproduction unit 5176 to the laser driving circuit 5177 and the track position controller 5178, whereby recording is performed by the optical head 2. At this time, output light from the semiconductor laser of the optical head 2 is condensed as a light spot on the optical disk 1, whereby a recording mark is formed in accordance with a waveform of emitted light (Step 1203).

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 5176 to the track position controller 5178, and a signal 5180 which is varied depending upon the presence of the recording mark on the optical disk 1 is input from the optical head 2 to the reproduction system 3 as a reproduction signal. The reproduction signal 5180 is subjected to reproduction signal processing such as amplification, waveform equalization, and digitization at the reproduction system 3, and a signal 5181 is input to the land•groove reproduction signal quality detector 5174 (Step 1203).

The land•groove reproduction signal quality detector 5174 detects a signal quality of the signal 5181, and a detection result of the reproduction signal quality is input to the optimum recording power determination unit 5175 (Step 1204).

The land•groove reproduction signal quality detector 5174 detects, for example, a BER at which the recorded signal has been reproduced.

For example, when BERs are OK for both the land track and the groove track, as a detection result of the reproduction signal quality detector 5174 (Step 1205 no), the optimum recording power determination unit 5175 sets a bias power at which BERs become OK for both the land track and the groove track as an initial power (Step 1206). While the bias power is gradually decreased, continuous recording and continuous reproduction of the land track and the groove track are performed at each time, and results of the land•groove reproduction signal quality detector 5174 at the respective bias powers are stored. When BERs become NG for both the land track and the groove track (Step 1205 yes), an average power of a minimum bias power at which the BER is OK and a maximum bias power at which the BER is NG is obtained for the land track and the groove track, respectively, and determined as a lower limit value of the bias power (Step 1207).

An upper limit value is obtained in a similar procedure to that of the lower limit value in accordance with each of Steps 1208 to 1213. More specifically, a bias power at which BERs become OK for both the land track and the groove track is set as an initial bias power. While the bias power is gradually increased, the continuous recording and reproduction of the land track and the groove track are performed at each time. When the result of the land•groove reproduction signal quality detector 5174 becomes NG for both the land track and the groove track, an average bias power of a bias power at which the BER is OK and a maximum bias power at which the BER is NG is obtained for the land track and the groove track, respectively, and each average bias power is stored as an upper limit value of the average bias power.

The optimum recording power determination unit 5175 determines an average value of the lower limit value and the upper limit value, for example, as the optimum bias power (Step 1214).

When the lower limit value and the upper limit value are obtained, the initial value of the bias power for obtaining the upper limit value is prescribed to be higher than that of the bias power for obtaining the lower limit value. More specifically, by starting from the values close to the respective limit values, with the initial value of the bias power for obtaining the lower limit value being different from the initial value of the bias power for obtaining the upper limit value, a bias power is optimized in a short period of time.

In the present embodiment, an average value of the lower limit value and the upper limit value is determined as an optimum bias power. However, in the case where an effective power is likely to become much smaller then the set optimum power in an area of the optical disk 1 in which user data is actually recorded, for example, due to the warpage of a disk, a value which divides the lower limit value and the upper limit value, for example, in a ratio of 2:1 may be determined as the optimum power. By determining the value which divides the lower limit value and the upper limit value in a ratio of 2:1 as the optimum power, a tolerance for the low power side becomes large.

The land•groove reproduction signal quality detector 5174 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum power can be determined more accurately.

Furthermore, the land•groove reproduction signal quality detector 5174 is designed to detect a BER at which a recorded signal has been reproduced. However, the land•groove reproduction signal quality detector 5174 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be continuously recorded and reproduced may be one track or less. Therefore, a waiting time for rotation will be shortened, compared with the case where one groove track and one land track are continuously recorded and reproduced. Furthermore, deterioration due to repeated recording can be delayed by a decrease in area which is continuously recorded at any one time.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and an optimum power can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and an optimum power can be determined more accurately.

Furthermore, if the worst value of a block detected by the land•groove reproduction signal quality detector 5174 is not adopted when two or more blocks are continuously recorded and reproduced, even when a block with a recording defect such as a scratch is present, the block can be eliminated. Thus, an optimum power can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks; the variation of the sectors is absorbed, and an optimum power can be determined more accurately.

Furthermore, if the worst value of a sector detected by the land•groove reproduction signal quality detector 5174 is not adopted when two or more sectors are continuously recorded and reproduced, even when a sector with a recording defect such as a scratch is present, the sector can be eliminated. Thus, an optimum power can be determined more accurately.

In the present embodiment of the present invention, when an optimum peak power is determined, recording is performed by changing only a peak power under the condition that a bias power is fixed. However, the peak power and the bias power may be changed simultaneously without fixing the bias power (e.g., a ratio between the peak power and the bias power is prescribed to be constant). Similarly, when an optimum bias power is determined, the peak power and the bias power may be changed simultaneously without fixing the peak power (e.g., a ratio between the peak power and the bias power is prescribed to be constant).

For example, in the case where dust adheres to a lens, both a peak power and a bias power become lower than the presumed power. Therefore, when an optimum power is determined, a peak power and a bias power are simultaneously changed, whereby a more practical optimum power can be determined.

A signal with a pattern different from a recording signal for performing the continuous recording may be recorded in an area to be continuously recorded before each continuous recording for detecting a reproduction signal quality. By recording such a signal with a different pattern, a previously recorded signal component remaining in the area is made small (e.g., the signal component is recorded with a power lower than that of the previous recording), and the previously recorded signal will be not reproduced erroneously even in the case where sufficient recording has not been performed. Thus, a power can be optimized more accurately.

Furthermore, recording may be performed in the area to be continuously recorded only by using a bias power before each continuous recording for detecting a reproduction signal quality. By performing recording with only a bias power, the previously recorded signal component remaining in the area is made small (e.g., the signal component is recorded with a power lower than the previous recording), and the previously recorded signal will be not reproduced erroneously even in the case where sufficient recording has not been performed. Thus, a power can be optimized more accurately.

Embodiment 8

In the eighth embodiment, a peak power and a bias power are obtained for a groove track and a land track, separately.

Figure 50:
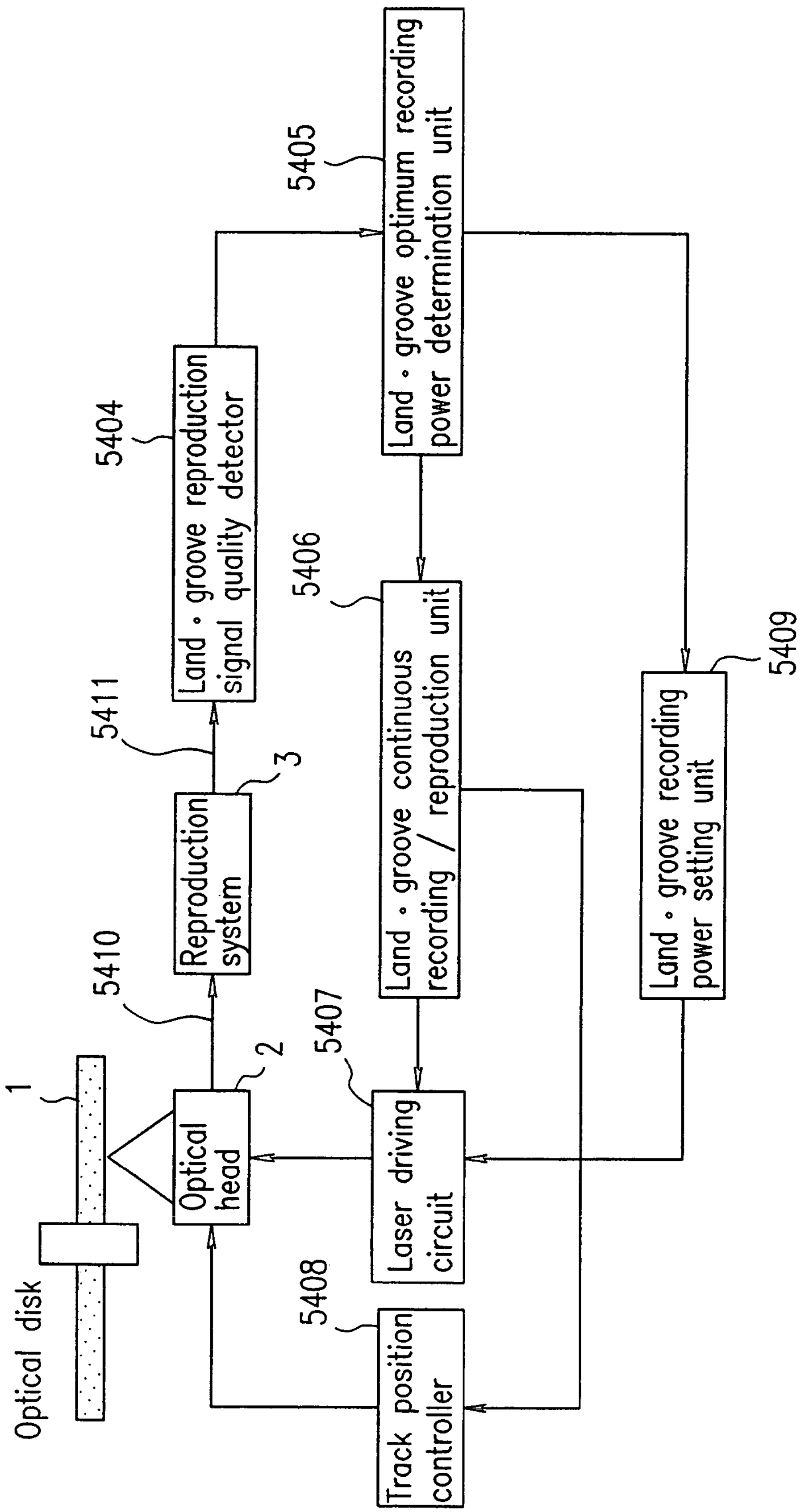
FIG. 50 is a block diagram showing the eighth embodiment of an optical disk apparatus according to the present invention.

FIG. 50 shows a structure of a phase-change type optical disk apparatus in the eighth embodiment of the present invention. In FIG. 50, reference numeral 1 denotes an optical disk, 2 denotes an optical head, 3 denotes a reproduction system, 5404 denotes a land•groove reproduction signal quality detector, 5405 denotes a land•groove optimum recording power determination unit, 5406 denotes a land•groove continuous recording/reproduction unit, 5407 denotes a laser driving circuit, 5408 denotes a track position controller, and 5409 denotes a land•groove recording power setting unit.

The optical disk 1 is as described with reference to FIG. 3.

In a phase-change type optical disk apparatus, powers to be determined include at least a peak power and a bias power. In the present embodiment, first, a method for determining a peak power will be described, and a method for determining a bias power will be described later.

The optical disk 1 is loaded in an optical disk apparatus. Predetermined operations such as identifying a disk type and a rotation control are performed. Thereafter, the optical head 2 is moved to an area for setting an optimum irradiation power by the track position controller 5408. It is assumed that this area is a recording area other than a user area provided in an innermost track or an outermost track of the optical disk 1 in which a user records data.

Initial values of the peak power and the bias power are set in the laser driving circuit 5407 by the land•groove recording power setting unit 5409. At this time, a power for recording the land track is identical with a power for recording the groove track.

Subsequently, a control signal for continuously recording one land track and one groove track from a predetermined position is transmitted from the land•groove continuous recording/reproduction unit 5406 to the laser driving circuit 5407 and the track position controller 5408, whereby recording is performed by the optical head 2. At this time, output light from the semiconductor laser of the optical head 2 is condensed as a light spot on the optical disk 1, whereby a recording mark is formed in accordance with a waveform of emitted light.

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 5406 to the track position controller 5408, and a signal 5410 which is varied depending upon the presence of the recording mark on the optical disk 1 is input from the optical head 2 to the reproduction system 3 as a reproduction signal. The reproduction signal 5410 is subjected to reproduction signal processing such as amplification, waveform equalization, and digitization at the reproduction system 3, and a signal 5411 is input to the land•groove reproduction signal quality detector 5404.

The land•groove reproduction signal quality detector 5404 detects a signal quality of the signal 5411 for the land track and the groove track, separately, and a detection result of the reproduction signal quality is input to the land•groove optimum recording power determination unit 5405.

The land•groove reproduction signal quality detector 5404 detects, for example, a BER at which the recorded signal has been reproduced.

Based on the detection result of the land•groove reproduction signal quality detector 5404, each of Steps 903 to 909 in the flow chart of FIG. 39 is performed for the land track and the groove track, separately, and each peak power is set.

For example, when the first result of the land•groove reproduction signal quality detector 5404 is NG for the land track and OK for the groove track, the peak power of the land track is increased, and the peak power of the groove track is decreased. Therefore, during the second continuous recording and reproduction, the peak power for the land track becomes higher than the peak power for the groove track.

When the second result of the land groove reproduction signal quality detector 5404 is OK for the land track and NG for the groove track, the land•groove optimum recording power determination unit 5405 determines a power obtained by adding a certain margin to an average power of the current power and the previous power as an optimum peak power for the land track and the groove track.

When the second result of the land•groove reproduction signal quality detector 5404 is OK for the land track and OK for the groove track, the land•groove optimum recording power determination unit 5405 determines a power obtained by adding a certain margin to an average power of the current peak power and the previous peak power at which the land track has been recorded as an optimum power of the land track. Regarding the groove track, a power lower than the peak power used during the second recording, and the groove track is recorded using this power, thereby detecting a reproduction signal quality.

When the third result of the land•groove reproduction signal quality detector 5404 is NG for the groove track, the land•groove optimum recording power determination unit 5405 determines a power obtained by adding a certain margin to an average power of the current power and the previous power as an optimum peak power of the groove track.

In the present embodiment, a movement path of a light spot on the optical disk 1 is similar to that of the first embodiment, which has been described with reference to FIG. 3.

For example, when a land track is recorded once and a groove track is recorded once in order to obtain an optimum power, in the case where the land track and the groove track are continuously recorded and reproduced as in the present embodiment, a time corresponding to 5 rotations in total is required (i.e., 2 rotations for recording, one rotation for waiting for reproduction, and 2 rotations for reproduction).

On the other hand, in the case where optimum powers are obtained for a land track and a groove track, separately, in a conventional apparatus, a time corresponding to 3 rotations in total is required for the land track (i.e., one rotation for recording, one rotation for waiting for reproduction, and one rotation for reproduction). Furthermore, the same amount of time is required for the groove track. Thus, a time corresponding to 6 rotations in total is required.

Assuming that the land track and the groove track are recorded at 4 levels of powers so as to obtain an optimum power, a time corresponding to 20 (5×4) rotations is required in the present embodiment, whereas a time corresponding to 24 (6×4) rotations is required in the conventional apparatus. Thus, a waiting time for rotation is shortened in the present embodiment.

As described above, in the optical disk apparatus of the present embodiment, a land track and a groove track are continuously recorded and reproduced prior to recording of data so as to determine an optimum power, whereby an optimum power for recording a user area can be determined in a short period of time, shortening a waiting time for rotation.

Next, a procedure for determining a bias power will be described. A bias power has a narrower margin of power at which user data can be recorded, compared with a peak power. For example, a margin of the peak power is about 6 mW (9 mW to 15 mW), whereas a margin of the bias power is about 3 mW (3 mW to 6 mW).

In the present embodiment, in order to obtain an optimum value of a bias power, a lower limit value and an upper limit value of a bias power at which user data can be recorded is obtained, and thereafter, an optimum value between the lower limit value and the upper limit value is obtained by computation.

First, initial values of the peak power and the bias power are set in the laser driving circuit 5407 by the land•groove recording power setting unit 5409, for example, for the purpose of obtaining a lower limit value of the bias power. At this time, a power for recording the land track is identical with a power for recording the groove track.

Subsequently, a control signal for continuously recording one land track and one groove track from a predetermined position is transmitted from the land•groove continuous recording/reproduction unit 5406 to the laser driving circuit 5407 and the track position controller 5408, whereby recording is performed by the optical head 2. At this time, output light from the semiconductor laser of the optical head 2 is condensed as a light spot on the optical disk 1, whereby a recording mark is formed in accordance with a waveform of emitted light.

After the continuous recording of the land track and the groove track is completed, output light from the semiconductor laser of the optical head 2 is emitted at a reproduction power. A signal for continuously reproducing one land track and one groove track previously recorded is transmitted from the land•groove continuous recording/reproduction unit 5405 to the track position controller 5408, and a signal 5410 which is varied depending upon the presence of the recording mark on the optical disk 1 is input from the optical head 2 to the reproduction system 3 as a reproduction signal. The reproduction signal 5410 is subjected to reproduction signal processing such as amplification, waveform equalization, and digitization at the reproduction system 3, and a signal 5411 is input to the land•groove reproduction signal quality detector 5404.

The land•groove reproduction signal quality detector 5404 detects a signal quality of the signal 5411 for the land track and the groove track, separately, and a detection result of the reproduction signal quality is input to the land•groove optimum recording power determination unit 5405.

The land•groove reproduction signal quality detector 5404 detects, for example, a BER at which the recorded signal has been reproduced.

Figure 41:
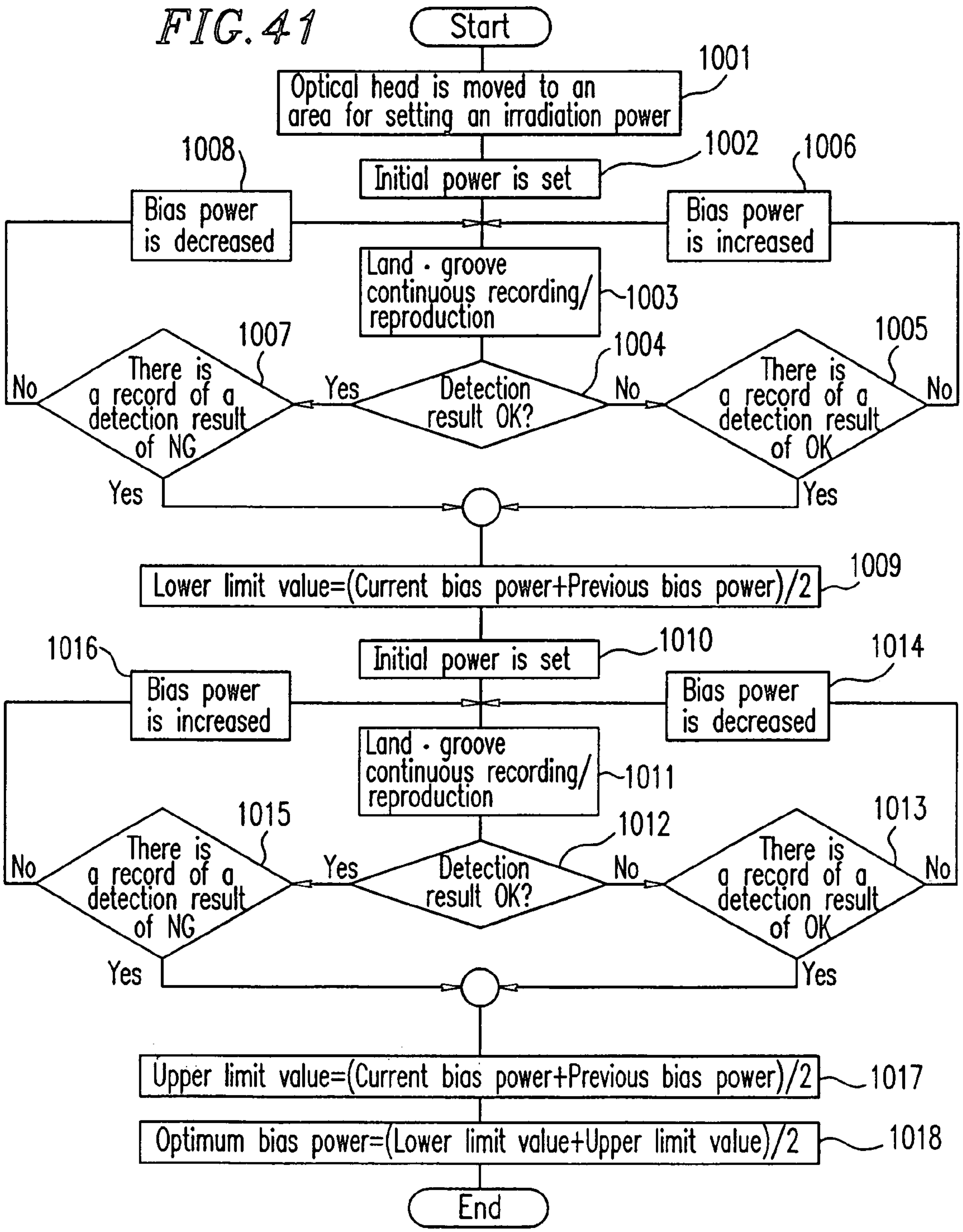
FIG. 41 is a flow chart showing process steps for determining an optimum bias power in the sixth embodiment of the present invention.

Based on the detection result of the land•groove reproduction signal quality detector 5404, each of Steps 1003 to 1009 in the flow chart of FIG. 41 is performed for the land track and the groove track, separately, and each bias power is set again.

For example, when the first result of the land•groove reproduction signal quality detector 5404 is NG for the land track and OK for the groove track, the bias power of the land track is increased, and the bias power of the groove track is decreased. Therefore, during the second continuous recording, the bias power for recording the land track becomes higher than the bias power for recording the groove track.

When the second result of the land•groove reproduction signal quality detector 5404 is OK for the land track and NG for the groove track, the land•groove optimum recording power determination unit 5405 stores an average bias power of the current bias power and the previous bias power as a lower limit value of the bias power of the land track and the groove track.

When the second result of the land•groove reproduction signal quality detector 5404 is OK for the land track and OK for the groove track, the land•groove optimum recording power determination unit 5405 stores an average power of the current bias power and the previous bias power at which the land track has been recorded as a lower limit value of the bias power of the land track. Regarding the groove track, a bias power lower than the bias power used during the second recording is set, and the groove track is recorded using this power, thereby detecting a reproduction signal quality.

When the third result of the land•groove reproduction signal quality detector 5404 is NG for the groove track, the land•groove optimum recording power determination unit 5405 stores an average power of the current bias power and the previous bias power as a lower limit value of the bias power of the groove track.

Regarding the upper limit value, each of Steps 1010 to 1017 in the flow chart of FIG. 41 is performed for the land track and the groove track, separately, and an upper limit value of the bias power of the land track is obtained to be stored, and an upper limit value of the bias power of the groove track is obtained to be stored.

The land•groove optimum recording power determination unit 5405 determines an average value of the lower limit value and the upper limit value, for example, as the optimum bias power for the land track and the groove track, separately.

When the lower limit value and the upper limit value are obtained, the initial value of the bias power for obtaining the upper limit value may be prescribed to be higher than that of the bias power for obtaining the lower limit value. More specifically, by starting from the values close to the respective limit values, with the initial value of the bias power for obtaining the lower limit value being different from the initial value of the bias power for obtaining the upper limit value, a bias power is optimized in a short period of time.

In the present embodiment, an average value of the lower limit value and the upper limit value is determined as an optimum bias power. However, in the case where an effective power is likely to become much smaller than the set optimum power in an area of the optical disk 1 in which user data is actually recorded, for example, due to the warpage of a disk, a value which divides the lower limit value and the upper limit value, for example, in a ratio of 2:1 may be determined as the optimum power. By determining the value which divides the lower limit value and the upper limit value in a ratio of: 2:1 as the optimum power, a tolerance for the low power side becomes large.

The land•groove reproduction signal quality detector 5404 may be designed in such a manner that it detects a BER at which a recorded signal has been reproduced, and does not count errors generated continuously at a predetermined time or times. Thus, even when an area with a recording defect such as a scratch is locally present, the effect thereof can be eliminated, and an optimum power can be determined more accurately.

Furthermore, the land•groove reproduction signal quality detector 5404 is designed to detect a BER at which a recorded signal has been reproduced. However, the land•groove reproduction signal quality detector 5404 may detect a bit error rate, for example, as long as a reproduction signal quality can be detected.

Furthermore, in the present embodiment, one land track and one groove track are continuously recorded and continuously reproduced. However, in an optical disk apparatus which performs recording, for example, on a block basis, a movement path of a light spot on the optical disk 1 may be as described with reference to FIG. 7.

In the case where recording is performed on a block basis, a movement path of a light spot on the optical disk 1 may be as described with reference to FIG. 8.

In the case where recording is performed on a sector basis, a movement path of a light spot on the optical disk 1 may be as described with reference to FIG. 9.

If recording and reproduction are performed on a sector basis, an area to be continuously recorded and reproduced may be one track or less, a waiting time for rotation can be shortened, compared with the case where one groove track and one land track are continuously recorded and reproduced. Furthermore, deterioration due to repeated recording can be delayed by a decrease in area which is continuously recorded at any one time.

The following may be possible: when recording is performed on a sector basis, continuous recording of the land track and the groove track is performed while a peak power is gradually decreased, for example, on a sector-basis; during the subsequent reproduction, a reproduction signal quality of each sector of the land track and the groove track is detected; and a power obtained by adding a certain margin to an average power of the powers immediately before and after the detection result is changed from OK to NG is determined as an optimum peak power for the land track and the groove track, respectively.

Similarly, regarding determination of a bias power, the following may be possible: a land track and a groove track are continuously recorded while a bias power is gradually increased from a low level on a sector basis; during the subsequent reproduction, a reproduction signal quality of each sector of the land track and the groove track is detected; and with an average power of the powers immediately before and after the detection result is changed from NG to OK being a lower limit value of the bias power and an average power of the powers immediately before and after the detection result is changed from OK to NG being an upper limit value of the bias power, an average power of the lower limit value and the upper limit value is determined as an optimum bias power.

As described above, continuous recording and reproduction are performed while a recording power is being changed on a sector basis. Consequently, reproduction signal quality results at a plurality of recording powers are obtained for the land track and the groove track, respectively, during one continuous recording of the land track and the groove track. This is more efficient, and enables deterioration due to repeated recording to be delayed by a decrease in area which is recorded for determining an optimum power.

Furthermore, in the present embodiment, one land track and one groove track are continuously recorded and reproduced. However, two or more land tracks and two or more groove tracks may be continuously recorded and reproduced. By continuously recording and reproducing two or more tracks, the variation of the tracks is absorbed, and an optimum power can be determined more accurately.

Similarly, even in the case where recording is performed on a block basis, two or more blocks of a land track and two or more blocks of a groove track may be continuously recorded and reproduced. By continuously recording and reproducing two or more blocks of both the tracks, the variation of the blocks is absorbed, and an optimum power can be determined more accurately.

Furthermore, if the worst value of a block detected by the land•groove reproduction signal quality detector 5404 is not adopted when two or more blocks are continuously recorded and reproduced, even when a block with a recording defect such as a scratch is present, the block can be eliminated. Thus, an optimum power can be determined more accurately.

Similarly, even in the case where recording is performed on a sector basis, two or more sectors of a land track and two or more sectors of a groove track may be continuously recorded and reproduced. By continuously recording and reproducing two or more sectors of both the tracks, the variation of the sectors is absorbed, and an optimum power can be determined more accurately.

Furthermore, if the worst value of a sector detected by the land•groove reproduction signal quality detector 5404 is not adopted when two or more sectors are continuously recorded and reproduced, even when a sector with a recording defect such as a scratch is present, the sector can be eliminated. Thus, an optimum power can be determined more accurately.

In the present embodiment of the present invention, when an optimum peak power is determined, recording is performed by changing only a peak power under the condition that a bias power is fixed. However, the peak power and the bias power may be changed simultaneously without fixing the bias power (e.g., a ratio between the peak power and the bias power is prescribed to be constant). Similarly, when an optimum bias power is determined, the peak power and the bias power may be changed simultaneously without fixing the peak power (e.g., a ratio between the peak power and the bias power is prescribed to be constant).

For example, in the case where dust adheres to a lens, both a peak power and a bias power become lower than the presumed power. Therefore, when an optimum power is determined, a peak power and a bias power are simultaneously changed, whereby a more practical optimum power can be determined.

A signal with a pattern different from a recording signal for performing the continuous recording may be recorded in an area to be continuously recorded before each continuous recording for detecting a reproduction signal quality. By recording such a signal with a different pattern, a previously recorded signal component remaining in the area is made small (e.g., the signal component is recorded with a power lower than that of the previous recording), and the previously recorded signal will be not reproduced erroneously even in the case where sufficient recording has not been performed. Thus, a power can be optimized more accurately.

Furthermore, recording may be performed in the area to be continuously recorded only by using a bias power before each continuous recording for detecting a reproduction signal quality. By performing recording with only a bias power, the previously recorded signal component remaining in the area is made small (e.g., the signal component is recorded with a power lower than the previous recording), and the previously recorded signal will be not reproduced erroneously even in the case where sufficient recording has not been performed. Thus, a power can be optimized more accurately.

Figure 22D:
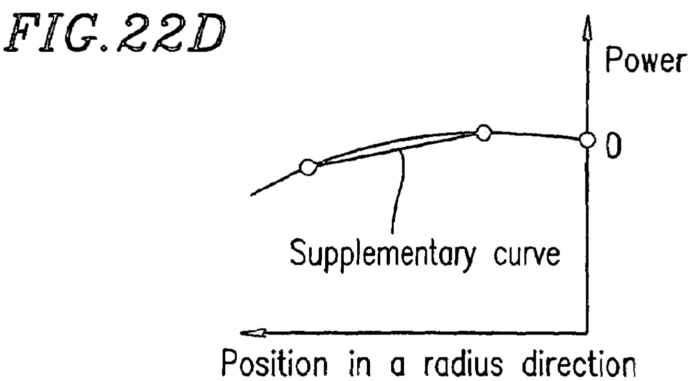
FIG. 22D is a graph showing a relationship between the position in a radius direction of the optical disk and the power.

In the sixth to eighth embodiments, prior to setting the optimum peak power and the optimum bias power, the optical head 2 is moved to a predetermined area. This area is an outermost area 1*a* of the optical disk 1, for example, as shown in FIG. 22A. However, when the optical disk 1 is warped or when the optical disk 1 is not properly placed in an apparatus, the optimum peak power and the optimum bias power obtained in the outermost area 1*a* of the optical disk 1 are not necessarily optimum for an inner track portion of the optical disk 1. More specifically, the optimum peak power and the optimum bias power may be different between the outer track portion and the inner track portion of the optical disk 1. Therefore, in a plurality of places on the optical disk 1 (e.g., in an outermost track and an innermost track of the optical disk 1), an optimum peak power and an optimum bias power are obtained, and a supplementary curve connecting the optimum power points in the outermost track and in the innermost track as shown in FIG. 22D is formed for the optimum peak power and the optimum bias power, separately. When the optical disk 1 is recorded and reproduced, an optimum peak power and an optimum bias power may be set, respectively, in accordance with a recording position and a reproduction position of the optical disk 1 based on the supplementary curve connecting the optimum power points in the outermost track and the innermost track.

Embodiment 9

In the ninth embodiment, an equalizer characteristic which is common in a land track and a groove track of an optical disk is set.

Figure 51:
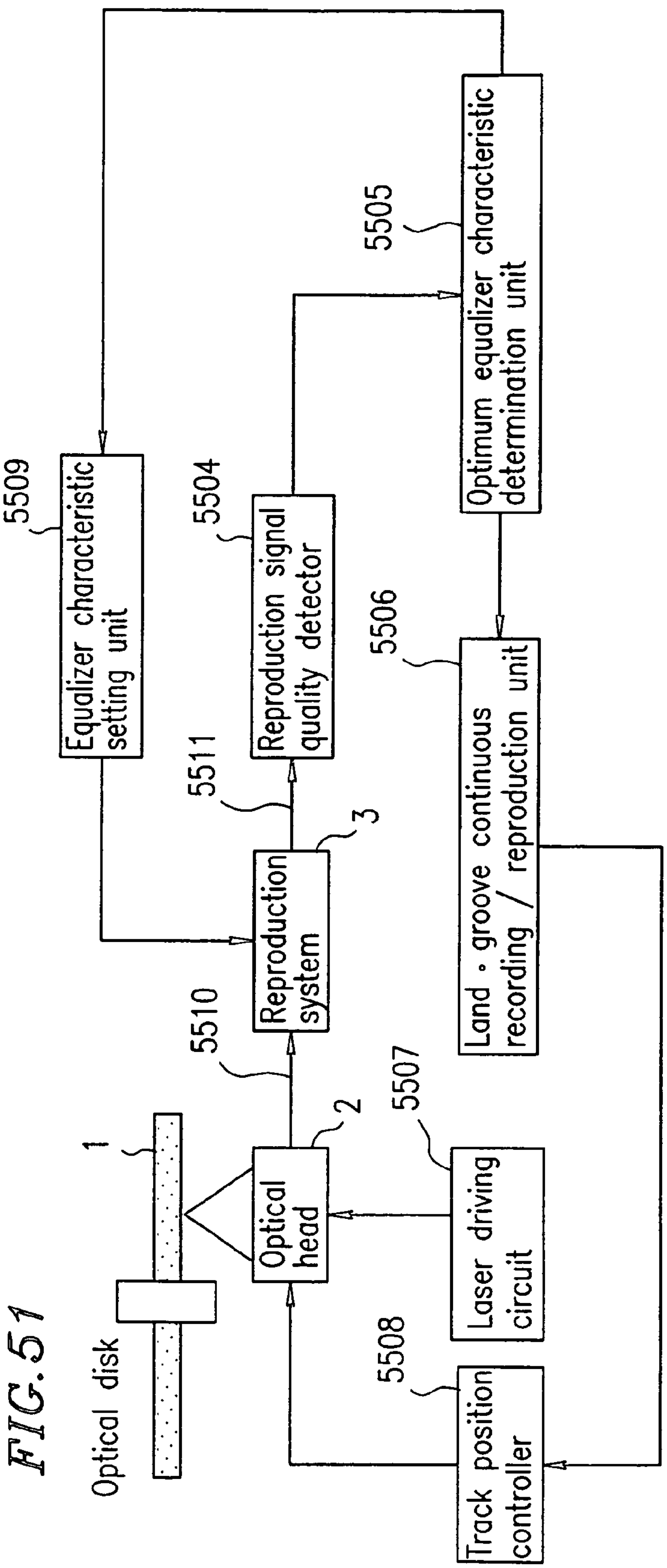
FIG. 51 is a block diagram showing the ninth embodiment of an optical disk apparatus according to the present invention.

FIG. 51 shows a structure of an optical disk apparatus in the ninth embodiment of the present invention. In FIG. 51, reference numeral 1 denotes an optical disk, 2 denotes an optical head, 3 denotes a reproduction system, 5504 denotes a reproduction signal quality detector, 5505 denotes an optimum equalizer characteristic determination unit, 5506 denotes a land•groove continuous recording/reproduction unit, 5507 denotes a laser driving circuit, 5508 denotes a track position controller, and 5509 denotes an equalizer characteristic setting unit.

The optical disk 1 is as described with reference to FIG. 3.

Figure 52A:
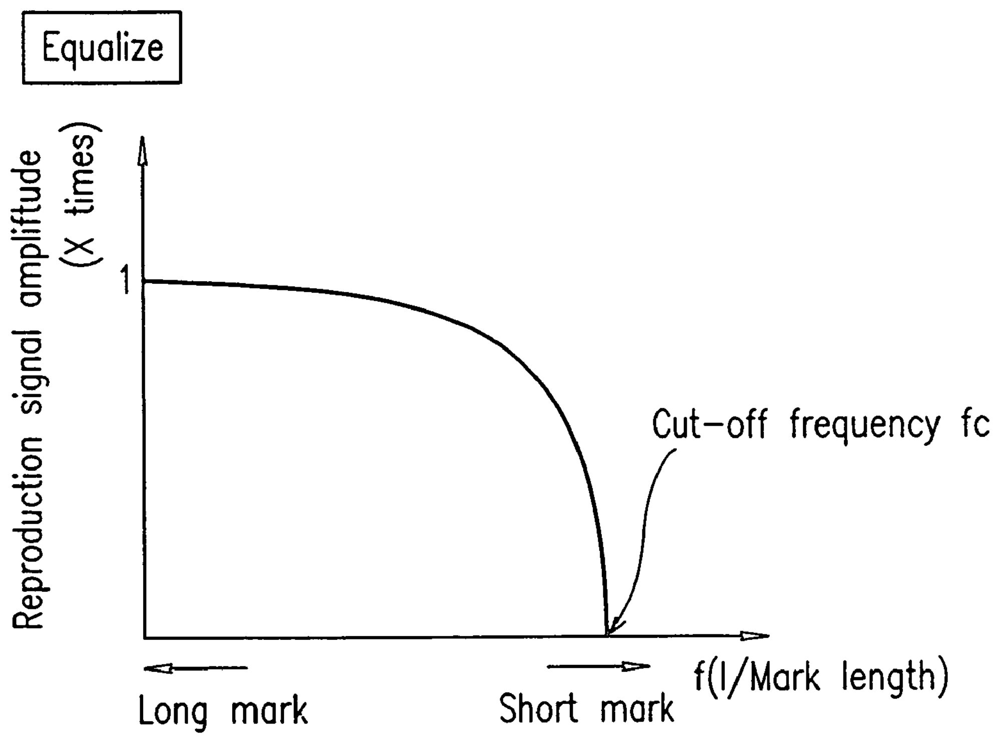
FIG. 52A is a graph showing a relationship between the frequency and the level of a reproduction signal in the ninth embodiment of the present invention.

FIG. 52A is a graph showing a frequency characteristic of a reproduction signal obtained by reproducing the optical disk 1. As is apparent from this graph, as the frequency of a reproduction signal increases, the level of the reproduction signal decreases. The level of the reproduction signal reaches zero at a limit frequency $f_o$. The frequency of the reproduction signal depends upon the length of a mark recorded on the optical disk 1. As a mark becomes shorter, the frequency increases. More specifically, as the mark becomes shorter, the frequency of the reproduction signal increases, which makes it difficult to obtain a reproduction signal.

Figure 52B:
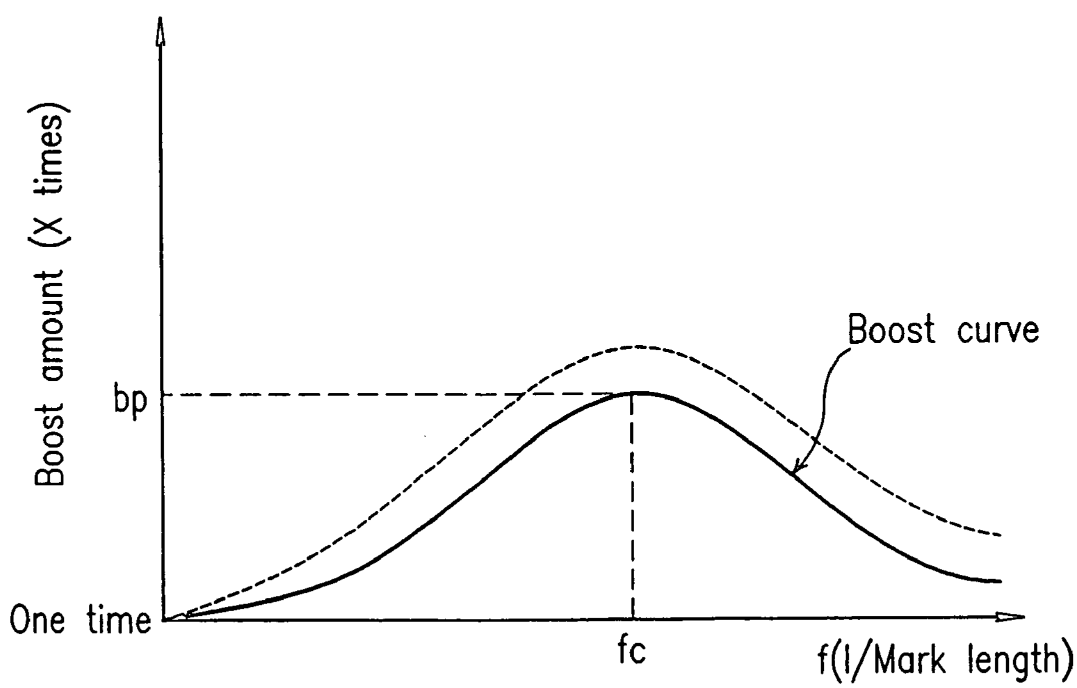
FIG. 52B is a graph showing a relationship between the frequency and the boost amount of a reproduction signal in the ninth embodiment of the present invention.

Therefore, the reproduction system 3 includes an equalizer having a characteristic as shown in a graph of FIG. 52B. By appropriately setting the characteristic of the equalizer, a decrease in the level of a reproduction signal at a high frequency is compensated by the equalizer, and thereafter, the reproduction signal is processed.

Figure 53:
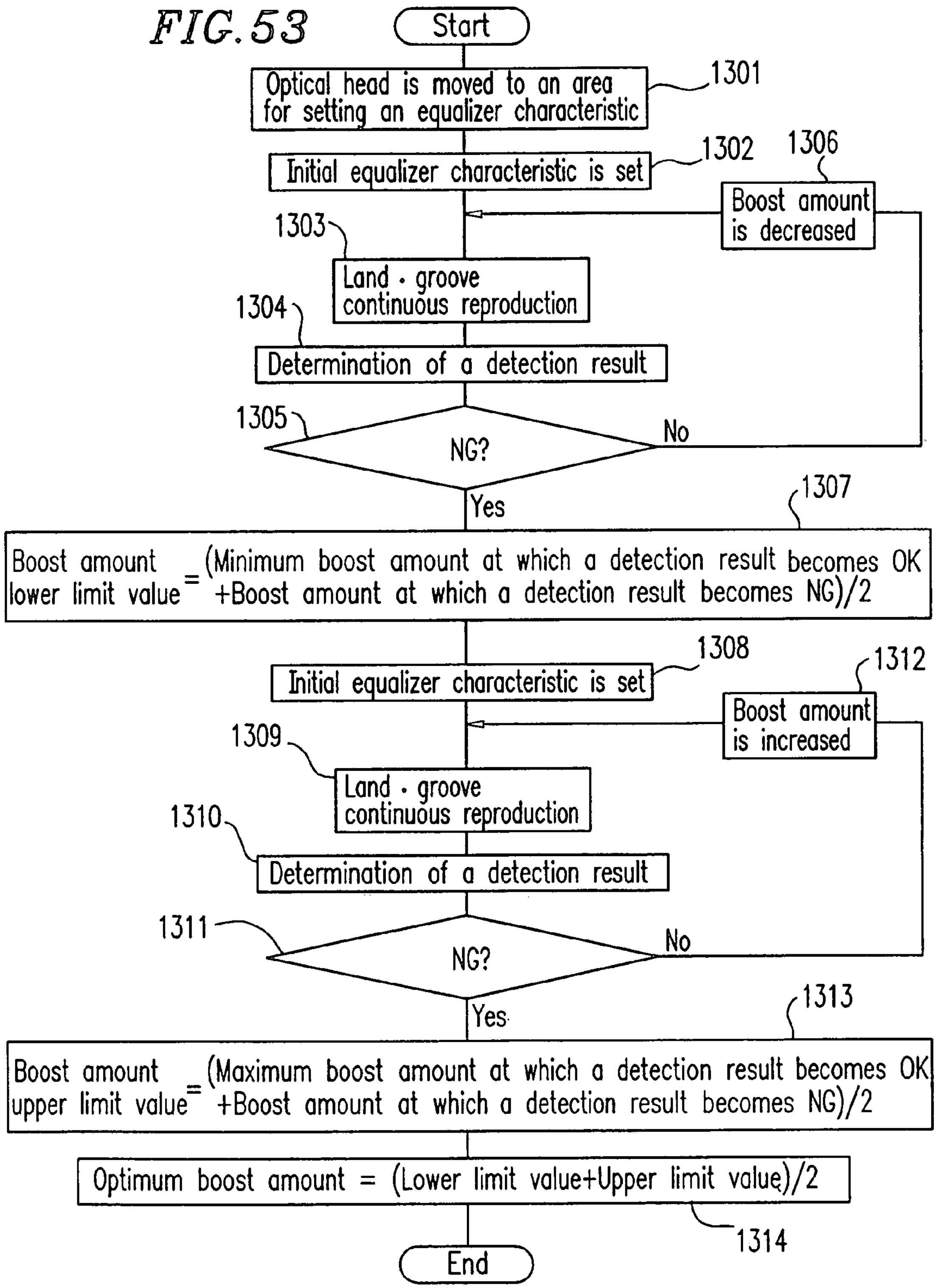
FIG. 53 is a flow chart showing process steps for determining an optimum equalizer characteristic in the ninth embodiment of the present invention.

FIG. 53 is a flow chart showing process steps of an optical disk apparatus of the present embodiment. A procedure for obtaining an equalizer characteristic of the reproduction system 3 will be described with reference to this flow chart.

As the equalizer characteristic of the reproduction system 3, the boost amount of the reproduction signal at a limit frequency $f_o$ of the reproduction signal as shown in FIGS. 52A and 52B is obtained.

The optical disk 1 is loaded in an optical disk apparatus. Predetermined operations such as identifying a disk type and a rotation control are performed. Thereafter, the optical head 2 is moved to an area for setting an optimum equalizer characteristic by the track position controller 5508 (Step 1301). It is assumed that this area is a recording area other than a user area provided in an innermost track or an outermost track of the optical disk 1 in which a user records data.

Initial values of the boost amount and the frequency at which the boost amount becomes maximum are set in the equalizer of the reproduction system 3 by the equalizer characteristic setting unit 5509 (Step 1302). At this time, an equalizer characteristic for reproducing the land track is identical with an equalizer characteristic for reproducing the groove track.

Subsequently, a control signal for continuously reproducing one land track and one groove track from a predetermined position is transmitted from the land•groove continuous reproduction unit 5506 to the track position controller 5508, whereby reproduction is performed by the optical head 2 and a signal 5510 which is varied depending upon the presence of the recording mark on the optical disk 1 is input from the optical head 2 to the reproduction system 3 as a reproduction signal. The reproduction signal 5510 is subjected to reproduction signal processing such as amplification, waveform equalization, and digitization at the reproduction system 3, and a signal 5511 is input to the reproduction signal quality detector 5504 (Step 1303).

The reproduction signal quality detector 5504 detects a signal quality of the signal 5511, and a detection result of the reproduction signal quality is input to the optimum equalizer characteristic determination unit 5405. When the length of the reproduced land track is equal to or almost equal to that of the reproduced groove track, a reproduction signal quality detection result is an average reproduction signal quality result of the land track and the groove track. In other words, the reproduction signal quality detection result is an average reproduction signal quality result of the optical disk 1 when reproduction is performed with the equalizer characteristic (Step 1304).

Figure 54A:
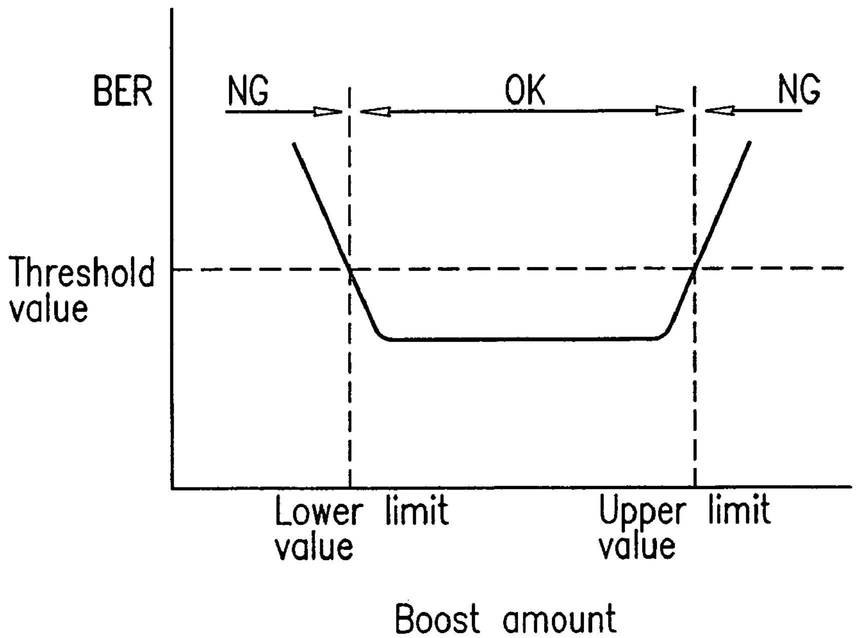
FIG. 54A is a graph showing a relationship between the boost amount and the BER.

The reproduction signal quality detector 5404 detects, for example, a BER at which the recorded signal has been reproduced. FIG. 54A shows a relationship between the boost amount and the BER.

In FIG. 54A, the abscissa represents the boost amount, and the ordinate represents the BER. In general, under the same recording conditions, more accurate recording and reproduction are performed with a smaller BER. It is assumed that a detection result in which the BER becomes a threshold value or less is OK, and a detection result in which the BER exceeds the threshold value is NG.

In the present embodiment, in order to obtain an optimum value of a boost amount, a lower limit value and an upper limit value of the boost amount which enables user data to be reproduced are obtained, and thereafter, an optimum value between the lower limit value and the upper limit value is obtained by computation.

For example, when BERs are OK for both the land track and the groove track, as a detection result of the reproduction signal quality detector 5504 (Step 1305 no), the optimum equalizer characteristic determination unit 5505 sets a boost amount at which BERs become OK for both the land track and the groove track as an initial boost amount (Step 1306). While the boost amount is gradually decreased, continuous reproduction of the land track and the groove track are performed at each time, and results of the reproduction signal quality detector 5504 at the respective boost amounts are stored. When BERs become NG for both the land track and the groove track (Step 1305 yes), an average boost amount of a minimum boost amount at which the BER is OK and a boost amount at which the BER is NG is stored as a lower limit value of the boost amount (Step 1307).

An upper limit value is obtained in a similar procedure to that of the lower limit value in accordance with each of Steps 1308 to 1314. More specifically, the optimum equalizer characteristic determination unit 5505 sets a boost amount at which BERs become OK for both the land track and the groove track as an initial boost amount (Step 1308). While the boost amount is gradually increased, continuous reproduction of the land track and the groove track is performed at each time. When BERs become NG for both the land track and the groove track as a result of the reproduction signal quality detector 5504 (Step 1311 yes), an average boost amount of a maximum boost amount at which the BER is OK and a boost amount at which the BER IS NG is obtained for the land track and the groove track, respectively, and each average boost amount is stored as an upper limit value of the average boost amount (Step 1313).

The optimum equalizer characteristic determination unit 5505 determines, for example, an average value of the lower limit value and the upper limit value as an optimum boost amount (Step 1314).

When the lower limit value and the upper limit value are obtained, the initial value of the boost amount for obtaining the upper limit value is prescribed to be higher than that of the boost amount for obtaining the lower limit value. More specifically, by starting from the values close to the respective limit values, with the initial value of the boost amount for obtaining the lower limit value being different from the initial value of the boost amount for obtaining the upper limit value, a boost amount is optimized in a short period of time.

Now, referring to FIG. 3, the steps of continuously reproducing a signal recorded in the land track and the groove track will be described by using a path on a recording track of an irradiation spot of the semiconductor laser.

As shown in FIG. 3, reproduction of a land track is performed clockwise from a point 31 to a point 32 at a set boost amount. Continuously, reproduction of a groove track is performed clockwise from a point 32 to a point 33 at the same boost amount.

Next, in order to reproduce a signal at a different boost amount, the irradiation spot jumps, for example, from a point 34 to an inner track, passing through points 35 and 36, and starts moving on a track from a point 37. The irradiation spot moves on the groove track clockwise from the point 37 to the point 31, and reproduces the land track from the point 31 to the point 32 in the same way as described above and reproduces the groove track from the point 32 to the point 33, thereby detecting a reproduction signal quality of the land track and the groove track.

In the present embodiment, the land track and the groove track are continuously reproduced. Therefore, it takes less time, compared with the case where optimum boost amounts are obtained for the land track and the groove track, separately, and the obtained optimum boost amounts are averaged.

For example, when a land track and a groove track are reproduced at two different boost amounts in order to obtain an optimum boost amount, in the case where the land track and the groove track are continuously reproduced as in the present embodiment, a time corresponding to 5 rotations in total is required (i.e., 2 rotations for reproduction at an initial boost amount, one rotation for waiting for reproduction, and 2 rotations for reproduction at a different boost amount).

On the other hand, in a conventional apparatus, optimum boost amounts are obtained for a land track and a groove track, separately, so that a time corresponding to 3 rotations in total is required for the land track (i.e., one rotation for reproduction at an initial boost amount, one rotation for waiting for reproduction, and one rotation for reproduction at a different boost amount). Furthermore, the same amount of time is required for the groove track. Thus, a time corresponding to 6 rotations in total is required.

Assuming that the land track and the groove track are reproduced at 8 kinds of boost amounts so as to obtain an optimum boost amount, a time corresponding to 20 (5×4) rotations is required in the present embodiment, whereas a time corresponding to 24 (6×4) rotations is required in the conventional apparatus. Thus, a waiting time for rotation is shortened in the present embodiment.

Figure 54B:
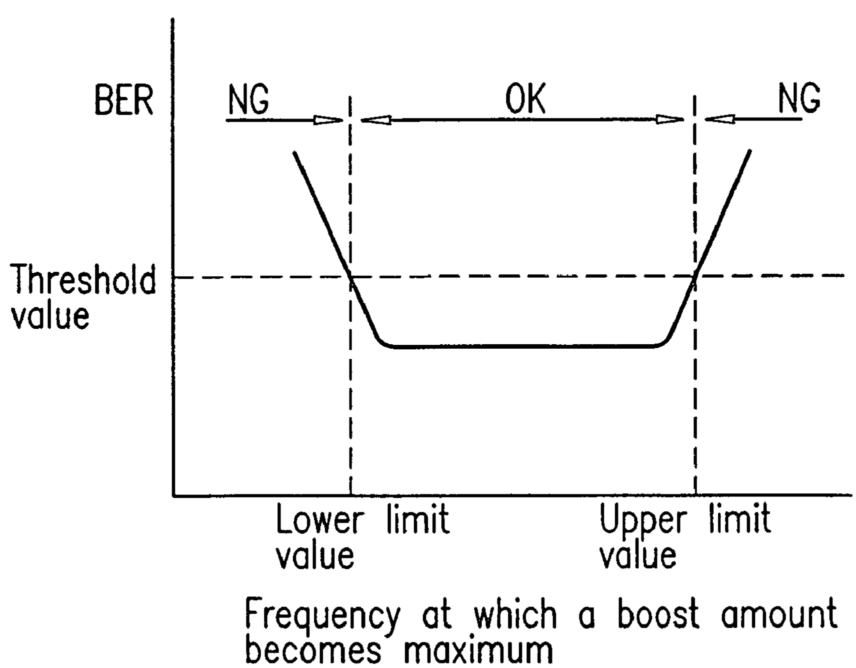
FIG. 54B is a graph showing a relationship between the frequency at which the boost amount becomes maximum and the BER.

FIG. 54B shows a relationship between the frequency at which the boost amount becomes maximum and the BER. An optimum value of the frequency at which the boost amount becomes maximum can be obtained in the similar procedure to that of the boost amount. More specifically, while the frequency is gradually changed, continuous reproduction of the land track and the groove track is performed at each time, and the frequency at which the boost amount becomes maximum is determined in accordance with the result of the reproduction signal quality detector 5504.

As described above, in the optical disk apparatus of the present embodiment, a land track and a groove track are continuously reproduced prior to reproduction of data so as to determine an equalizer characteristic, whereby an optimum equalizer characteristic suitable for reproducing a user area can be determined in a short period of time, shortening a waiting time for rotation.

In the present embodiment, for example, an average value of the lower limit value and the upper limit value is determined as an optimum boost amount. However, reproduction is performed while a boost amount is changed successively from the vicinity of the lower limit value to the vicinity of the upper limit value, and a value at which the BER becomes minimum may be determined as an optimum boost amount.

The reproduction signal quality detector 5504 may be designed in such a manner that it detects a BER at which a recorded signal has been reproduced, and does not count errors generated continuously at a predetermined time or times. Thus, even when an area with a reproduction defect such as a scratch is locally present, the effect thereof can be eliminated, and an optimum equalizer characteristic can be determined more accurately.

Furthermore, the reproduction signal quality detector 5174 is designed to detect a BER at which a recorded signal has been reproduced. Alternatively, the following other detection methods may be used.

Figure 55A:
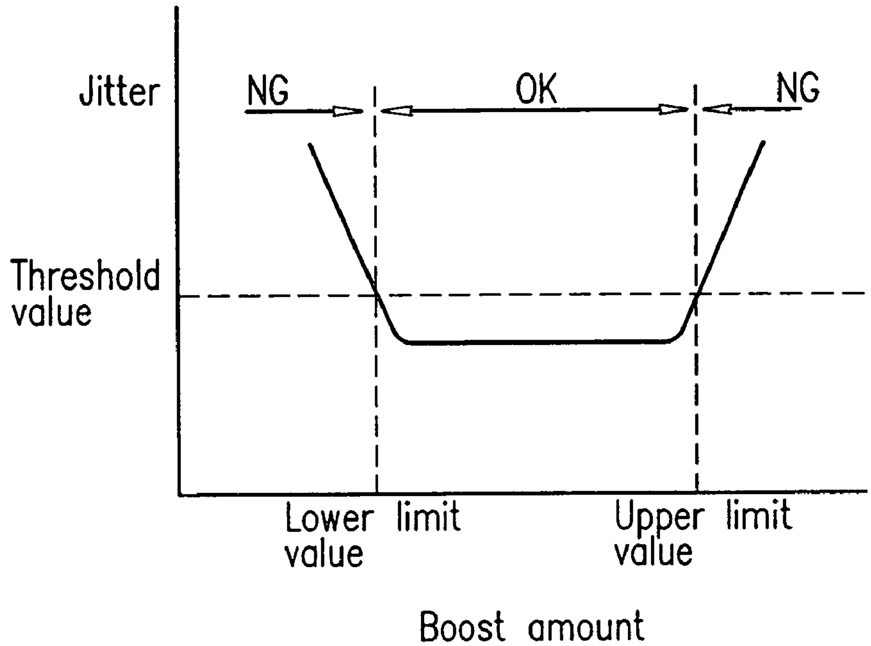
FIG. 55A is a graph showing a relationship between the boost amount and the jitter.
Figure 55B:
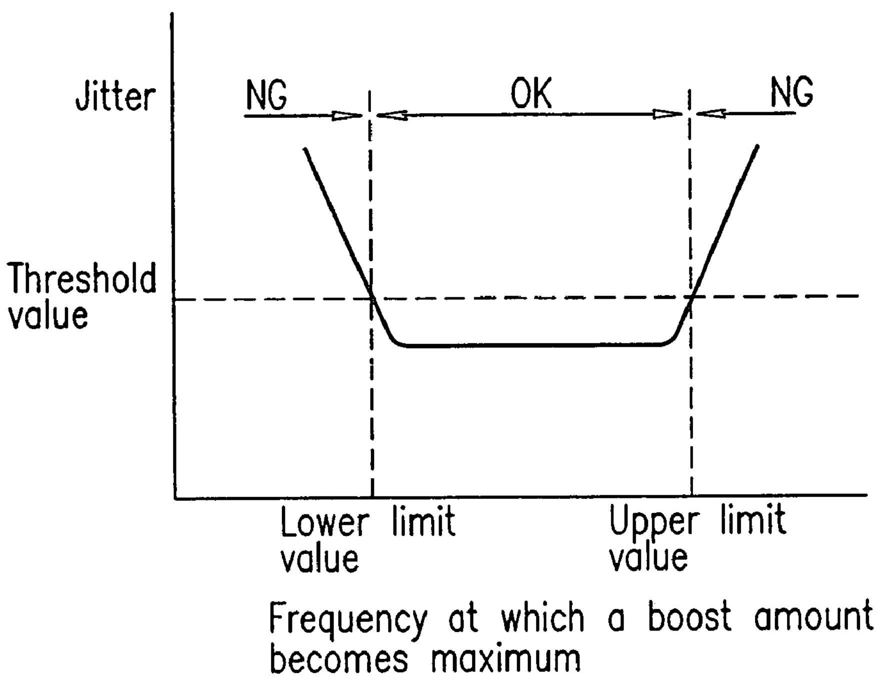
FIG. 55B is a graph showing a relationship between the frequency at which the boost amount becomes maximum and the jitter.

As an example of the detection method, a method for detecting a jitter will be exemplified. FIG. 55A shows a relationship between the boost amount and the jitter. In this figure, the abscissa represents the boost amount, and the ordinate represents the jitter. FIG. 55B shows a relationship between the frequency at which the boost amount becomes maximum and the jitter. In this figure, the abscissa represents the frequency at which the boost amount becomes maximum, and the ordinate represents the jitter.

The jitter refers to a time shift between a reproduction signal and an original signal. Generally, more accurate reproduction is performed as the jitter becomes smaller, under the same recording conditions. It is assumed that a detection result in which the jitter becomes equal to or lower than a threshold value is OK, and a detection result in which the jitter exceeds a threshold value is NG.

The jitter can be detected as an average value in a measurement interval, and does not change enormously even when an area with a reproduction defect such as a scratch is locally present. Thus, the jitter can suitably be used for determining an optimum equalizer characteristic.

Figure 56A:
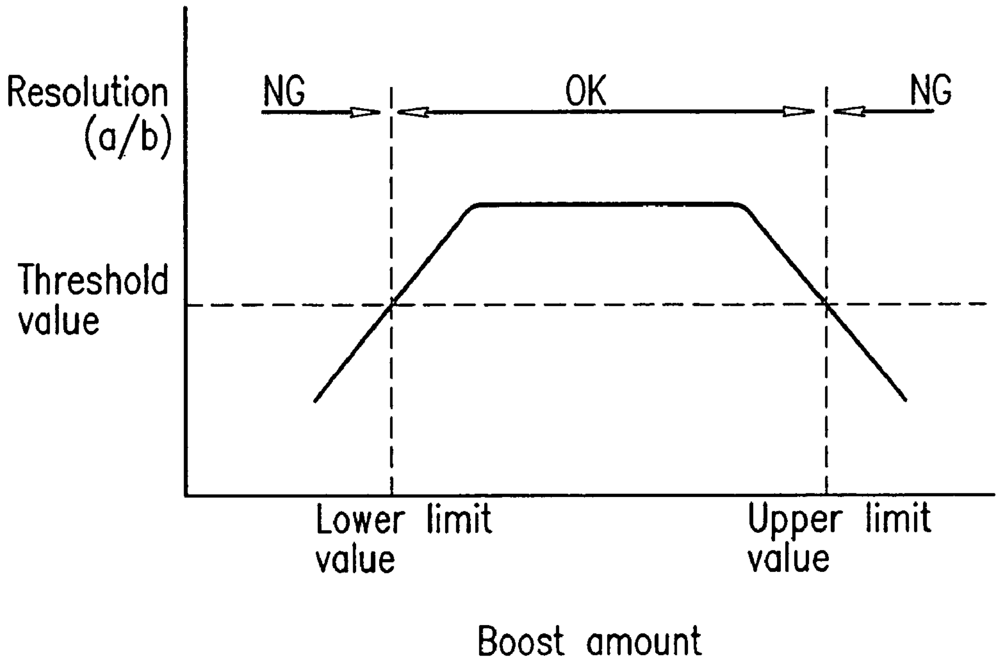
FIG. 56A is a graph showing a relationship between the boost amount and the resolution.
Figure 56B:
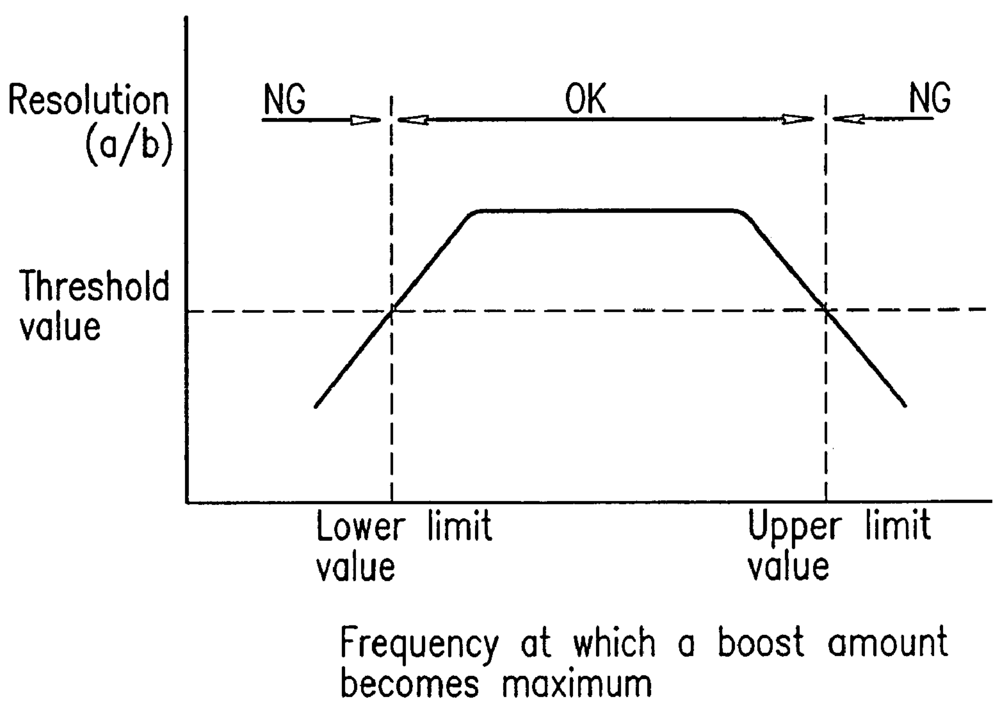
FIG. 56B is a graph showing a relationship between the frequency at which the boost amount becomes maximum and the resolution.

As another example of the detection method, a method for detecting resolution will be described. FIG. 56A shows a relationship between the boost amount and the resolution. In this figure, the abscissa represents the boost amount, and the ordinate represents the resolution. FIG. 56B shows a relationship between the frequency at which the boost amount becomes maximum and the resolution. The abscissa represents the frequency at which the boost amount becomes maximum, and the ordinate represents the resolution.

As shown in FIG. 18, the resolution refers to a ratio between an amplitude of a reproduction signal in the shortest period and an amplitude of a reproduction signal in the longest period. Generally, more accurate reproduction is performed as the resolution becomes larger, under the same recording conditions. It is assumed that a detection result in which the resolution becomes equal to or higher than a threshold value is OK, and a detection result in which the resolution becomes lower than a threshold value is NG.

The resolution can be detected as an average value in a measurement interval, and does not largely change even when an area with a reproduction defect such as a scratch is locally present. Thus, the resolution is suitably used for determining an optimum equalizer characteristic.

Figure 57A:
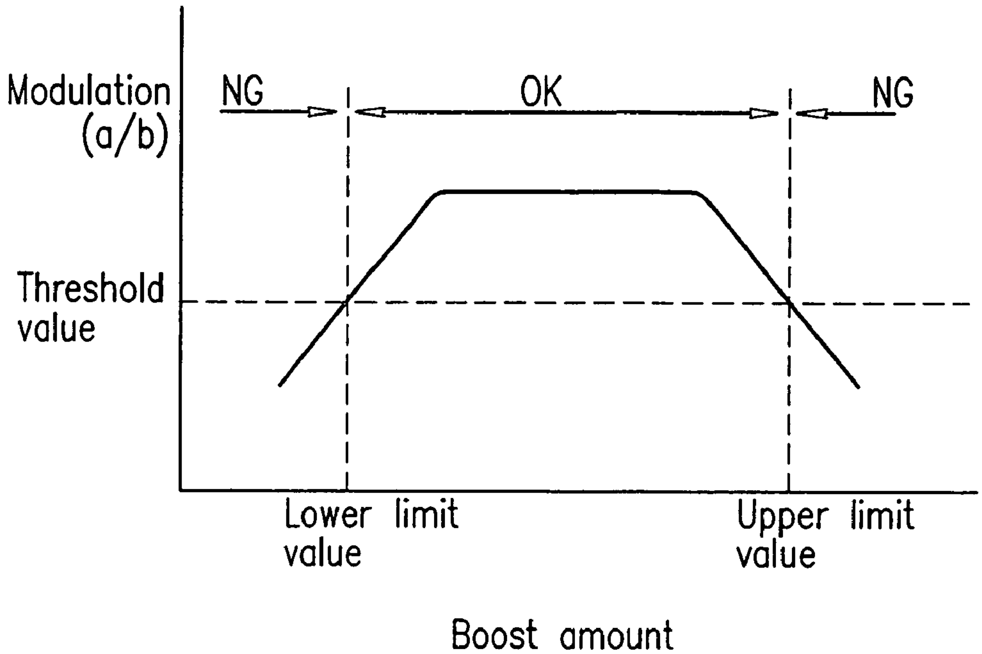
FIG. 57A is a graph showing a relationship between the boost amount and the modulation.
Figure 57B:
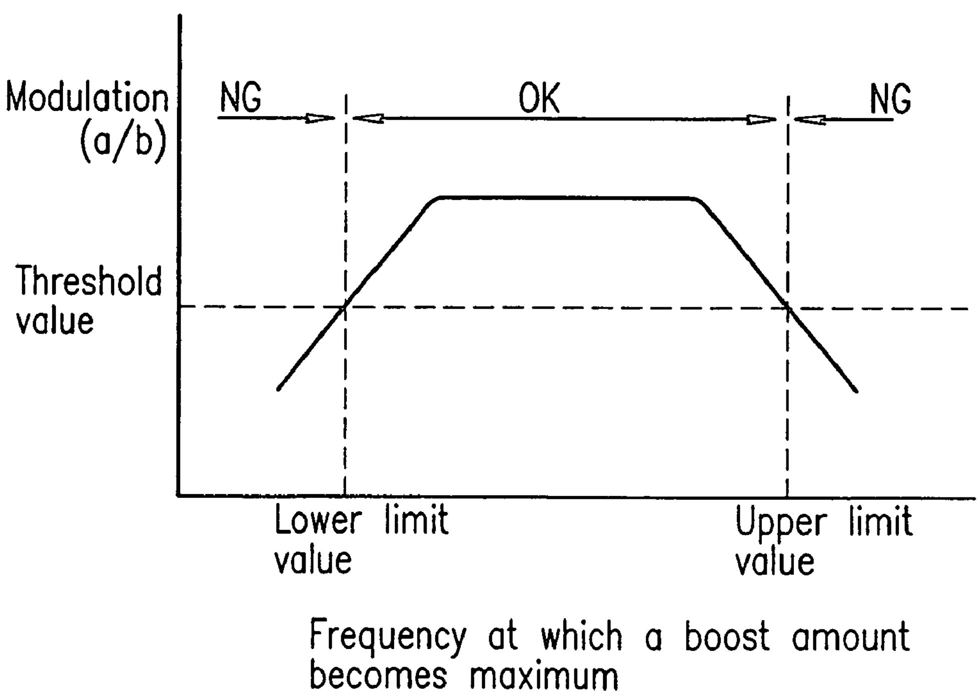
FIG. 57B is a graph showing a relationship between the frequency at which the boost amount becomes maximum and the modulation.

As another example of the detection method, a method for detecting modulation will be described. FIG. 57A shows a relationship between the boost amount and the modulation. In this figure, the abscissa represents the boost amount, and the ordinate represents the modulation. FIG. 57B shows a relationship between the frequency at which the boost amount becomes maximum and the modulation. The abscissa represents the frequency at which the boost amount becomes maximum, and the ordinate represents the modulation.

The modulation refers to a ratio between an AC component and a DC component in a reproduction signal in a time interval, as shown in FIG. 16. Generally, more accurate reproduction is performed as the modulation becomes larger, under the same recording conditions. It is assumed that a detection result in which the modulation becomes equal to or higher than a threshold value is OK, and a detection result in which the modulation becomes lower than a threshold value is NG.

The modulation can be detected as an average value in a measurement interval, and does not change enormously even when an area with a reproduction defect such as a scratch is locally present. Thus, the modulation can suitably be used for determining an optimum equalizer characteristic.

Figure 58A:
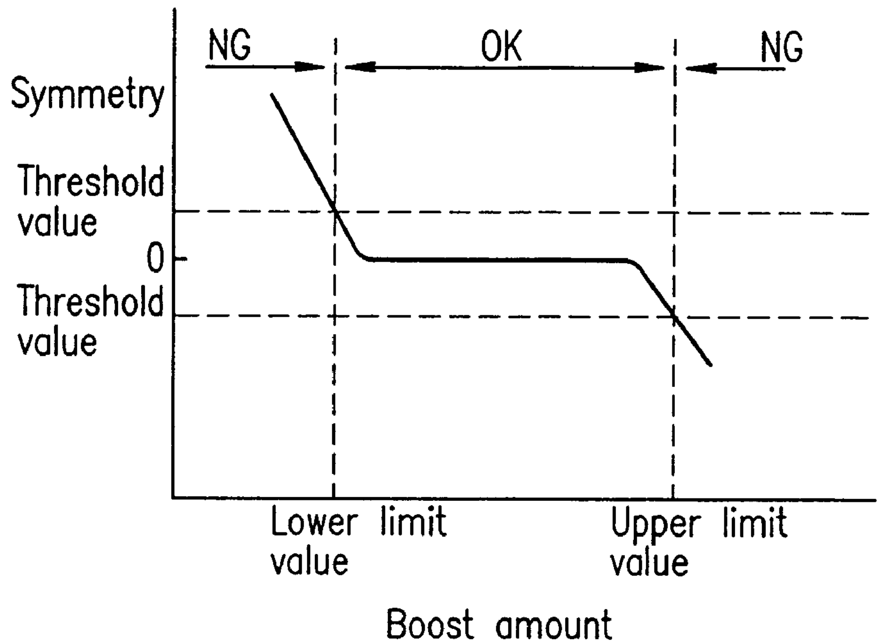
FIG. 58A is a graph showing a relationship between the boost amount and the symmetry.
Figure 58B:
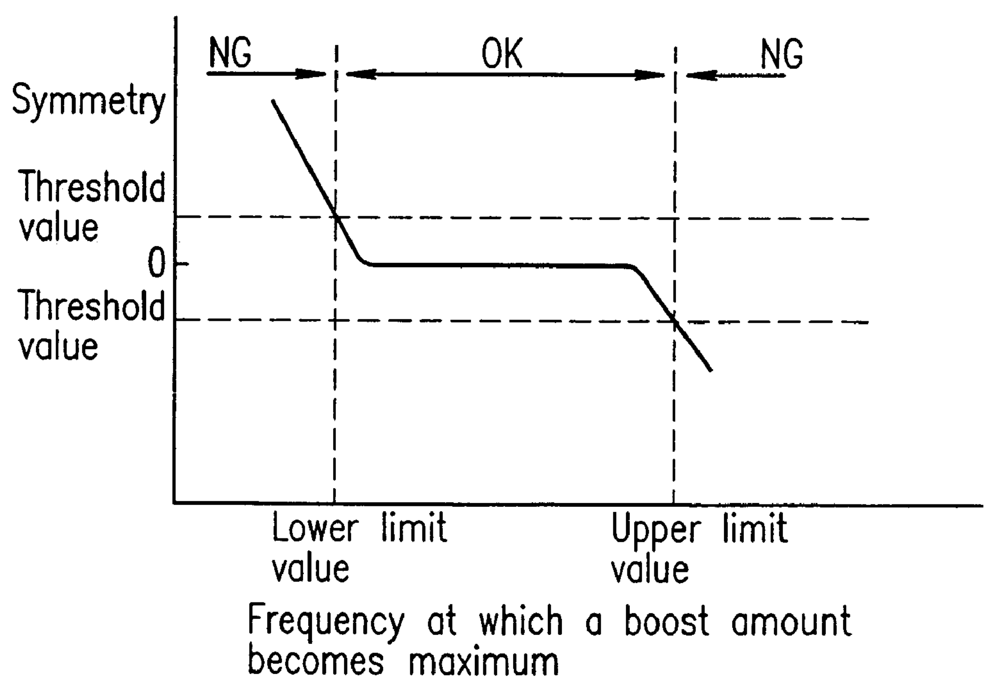
FIG. 58B is a graph showing a relationship between the frequency at which the boost amount becomes maximum and the frequency.

As another example of the detection method, a method for detecting symmetry will be described. FIG. 58A shows a relationship between the boost amount and the symmetry. In this figure, the abscissa represents the boost amount, and the ordinate represents the symmetry. FIG. 58B shows a relationship between the frequency at which the boost amount becomes maximum and the symmetry. The abscissa represents the frequency at which the boost amount becomes maximum, and the ordinate represents the symmetry.

The symmetry refers to a value which shows a secondary harmonic component of a reproduction signal. Generally, more accurate reproduction is performed as the symmetry becomes smaller, under the same recording conditions. It is assumed that a detection result in which an absolute value of the symmetry becomes equal to or higher than a threshold value is NG, and a detection result in which an absolute value of the symmetry becomes lower than a threshold value is OK.

The symmetry can be detected as an average value in a measurement interval, and does not change enormously even when an area with a reproduction defect such as a scratch is locally present. Thus, the symmetry can suitably be used for determining an optimum equalizer characteristic.

In the present embodiment, one land track and one groove track are continuously reproduced. However, for example, in an optical disk apparatus which performs reproduction on a block basis, reproduction of a land track may be performed from a point 141 to a point 142, and reproduction of a groove track may be performed from a point 142 to a point 143 as shown in FIG. 7.

In an optical disk apparatus which performs reproduction on a block basis, reproduction of a land track is performed from a point 147 to a point 148, and reproduction of a groove track is performed from a point 149 to a point 14100 as shown in FIG. 7. Thus, reproduction may be started at any point as long as reproduction for detecting a reproduction signal quality is detected.

In particular, assuming that one half of one block is a land track, and the other half of one block is a groove track (in FIG. 8, when one block contains 16 sectors, a zone from a point 151 to a point 152 corresponds to 8 sectors of the land track, and a zone from the point 152 to the point 153 corresponds to 8 sectors of the groove track), as shown in FIG. 8, in the case of performing reproduction on a block basis, one block corresponds to one track or less, and two blocks correspond to one track or more. In this case, a waiting time for rotation can be shortened, compared with the case where one land track and one groove track are continuously reproduced.

Similarly, in the present embodiment, one land track and one groove track are continuously reproduced. However, in the case where an optical disk apparatus performs reproduction on a sector basis, it may be possible that a sector of a land track from a point 161 to a point 162 and a sector of a groove track from a point 162 to a point 163 are continuously reproduced, as shown in FIG. 9.

Similarly, in the case where reproduction is performed on a sector basis, it may be possible that a sector of a land track from a point 167 to the point 161 and a sector of a groove track from the point 163 to a point 168 are continuously reproduced, as shown in FIG. 9. Thus, reproduction may be started at any point as long as reproduction for detecting a reproduction signal quality is detected.

If recording and reproduction are performed on a sector basis, an area to be continuously recorded and reproduced may be one track or less. Therefore, a waiting time for rotation can be shortened, compared with the case where one groove track and one land track are continuously recorded and reproduced.

Furthermore, in the present embodiment, one land track and one groove track are continuously reproduced. However, two or more land tracks and two or more groove tracks may be continuously reproduced. By continuously reproducing two or more tracks, the variation of the tracks is absorbed, and optimum equalizer characteristic can be determined more accurately.

Similarly, even in the case where reproduction is performed on a block basis, two or more blocks of a land track and two or more blocks of a groove track may be continuously reproduced. By continuously reproducing two or more blocks of both the tracks, the variation of the blocks is absorbed, and an optimum equalizer characteristic can be determined more accurately.

Furthermore, if the worst value of a block detected by the reproduction signal quality detector 5404 is not adopted when two or more blocks are continuously reproduced, even when a block with a reproduction defect such as a scratch is present, the block can be eliminated. Thus, an optimum equalizer characteristic can be determined more accurately.

Similarly, even in the case where reproduction is performed on a sector basis, two or more sectors of a land track and two or more sectors of a groove track may be continuously reproduced. By continuously reproducing two or more sectors of both the tracks, the variation of the sectors is absorbed, and an optimum equalizer characteristic can be determined more accurately.

Furthermore, if the worst value of a sector detected by the reproduction signal quality detector 4 is not adopted when two or more sectors are continuously reproduced, even when a sector with a reproduction defect such as a scratch is present, the sector can be eliminated. Thus, an optimum equalizer characteristic can be determined more accurately.

Embodiment 10

In the tenth embodiment, equalizer characteristics are obtained for a land track and a groove track, separately.

Figure 59:
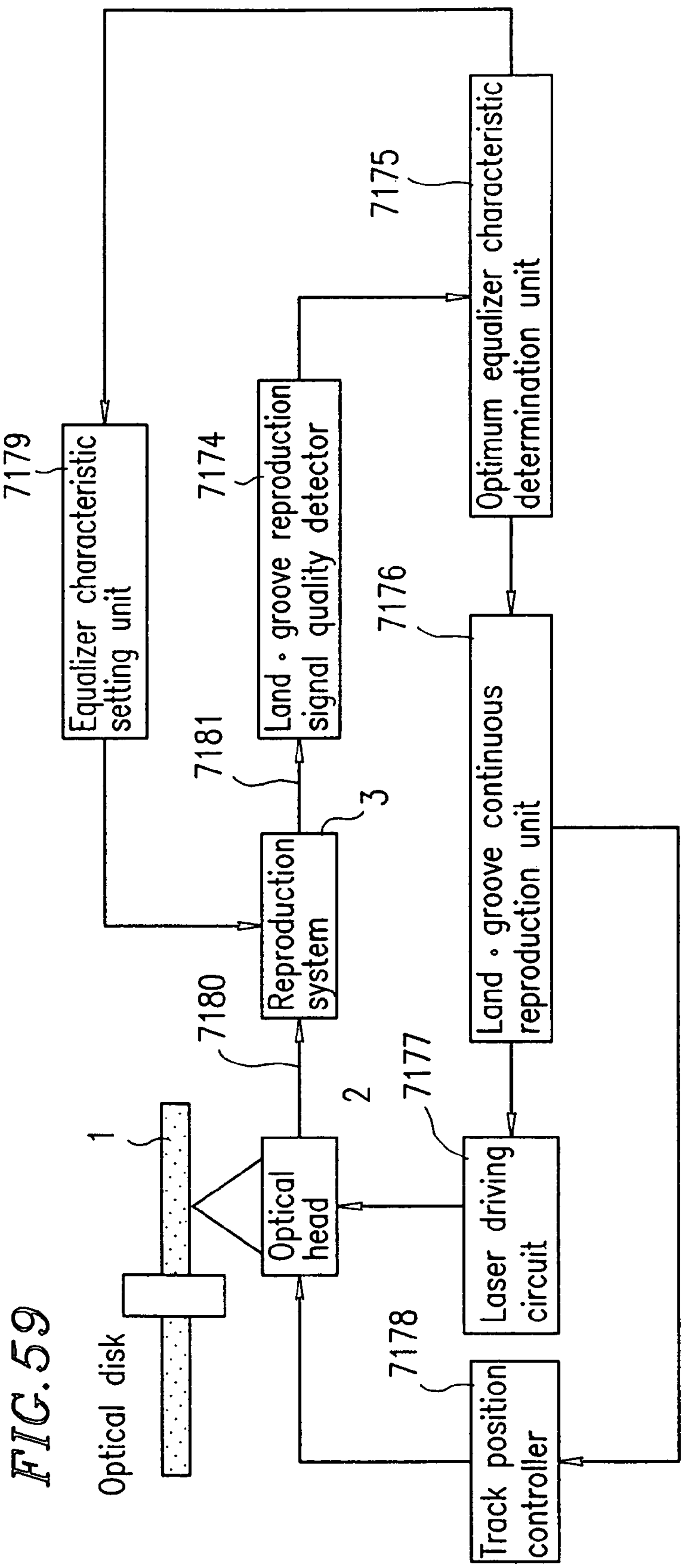
FIG. 59 is a block diagram showing the tenth embodiment of an optical disk apparatus according to the present invention.

FIG. 59 shows a structure of an optical disk apparatus in the tenth embodiment of the present invention. In FIG. 59, reference numeral 1 denotes an optical disk, 2 denotes an optical head, 3 denotes a reproduction system, 7174 denotes a land•groove reproduction signal quality detector, 7175 denotes an optimum equalizer characteristic determination unit, 7176 denotes a land•groove continuous reproduction unit, 7177 denotes a laser driving circuit, 7178 denotes a track position controller, and 7179 denotes an equalizer characteristic setting unit.

The optical disk 1 is as described with reference to FIG. 3.

Figure 60:
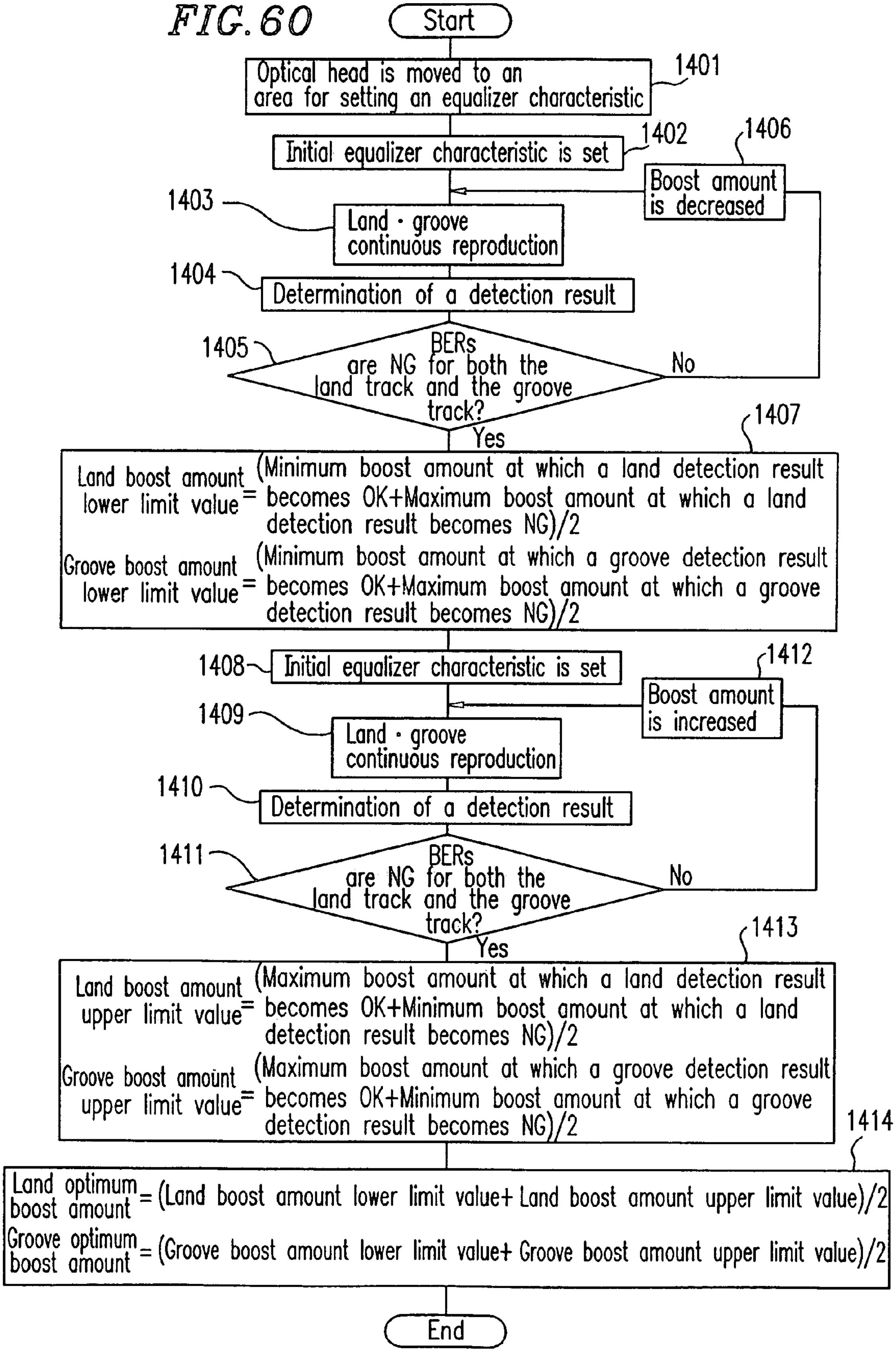
FIG. 60 is a flow chart showing process steps for determining an optimum equalizer characteristic in the tenth embodiment of the present invention.

FIG. 60 is a flow chart showing process steps of an optical disk apparatus of the present embodiment. A procedure for obtaining an equalizer characteristic of the reproduction system 3 will be described with reference to this flow chart.

The optical disk 1 is loaded in an optical disk apparatus. Predetermined operations such as identifying a disk type and a rotation control are performed. Thereafter, the optical head 2 is moved to an area for setting an optimum equalizer characteristic by the track position controller 7178 (Step 1401). It is assumed that this area is a recording area other than a user area provided in an innermost track or an outermost track of the optical disk 1 in which a user records data.

Initial values of the boost amount and the frequency at which the boost amount becomes maximum are set in the equalizer of the reproduction system 3 by the equalizer characteristic setting unit 7179 (Step 1402). At this time, an equalizer characteristic for reproducing the land track is identical with an equalizer characteristic for reproducing the groove track.

Subsequently, a control signal for continuously reproducing one land track and one groove track from a predetermined position is transmitted from the land•groove continuous reproduction unit 7176 to the track position controller 7178, whereby reproduction is performed by the optical head 2 and a signal 7180 which is changed depending upon the presence of the recording mark on the optical disk 1 is input to the reproduction system 3 as a reproduction signal. The reproduction signal 7180 is subjected to reproduction signal processing such as amplification, waveform equalization, and digitization at the reproduction system 3, and a signal 7181 is input to the land•groove reproduction signal quality detector 7174 (Step 1403).

The reproduction signal 7180 is subjected to reproduction signal processing such as amplification, waveform equalization, and digitization at the reproduction system 3, and a signal 7181 is input to the land•groove reproduction signal quality detector 7174.

The land•groove reproduction signal quality detector 7174 detects a signal quality of the signal 7181 for the land track and the groove track, separately, and a detection result is input to the optimum equalizer characteristic determination unit 7175.

The reproduction signal quality detector 7174 detects, for example, a BER at which the signal has been reproduced (Step 1404).

In the present embodiment, in order to obtain an optimum value of a boost amount, a lower limit value and an upper limit value of the boost amount which enables user data to be reproduced are obtained, and thereafter, an optimum value between the lower limit value and the upper limit value is obtained by computation.

For example, when BERs are OK for both the land track and the groove track, as a detection result of the land•groove reproduction signal quality detector 7174 (Step 1405 no), the optimum equalizer characteristic determination unit 7175 sets a boost amount at which BERs become OK for both the land track and the groove track as an initial boost amount (Step 1406). While the boost amount is gradually decreased, continuous reproduction of the land track and the groove track are performed at each time, and results of the land•groove reproduction signal quality detector 7174 at the respective boost amounts are stored. When BERs become NG for both the land track and the groove track (Step 1405 yes), an average boost amount of a minimum boost amount at which the BER is OK and a maximum boost amount at which the BER is NG is stored as a lower limit value of the boost amount for the land track and the groove track, respectively (Step 1407).

An upper limit value is obtained in the similar procedure to that of the lower limit value in accordance with each of Steps 1408 to 1413. More specifically, the optimum equalizer characteristic determination unit 7175 sets a boost amount at which BERs become OK for both the land track and the groove track as an initial boost amount (Step 1408). While the boost amount is gradually increased, continuous recording and reproduction of the land track and the groove track are performed at each time. When BERs become NG for both the land track and the groove track as a result of the land•groove reproduction signal quality detector 7174 (Step 1411 yes), an average boost amount of a maximum boost amount at which the BER is OK and a boost amount at which the BER is NG is obtained for the land track and the groove track, respectively, and each average boost amount is stored as an upper limit value of the average boost amount (Step 1413).

The optimum equalizer characteristic determination unit 7175 determines, for example, an average value of the lower limit value and the upper limit value as an optimum boost amount for the land track and the groove track, separately (Step 1414).

When the lower limit value and the upper limit value are obtained, the initial value of the boost amount for obtaining the upper limit value is prescribed to be higher than that of the boost amount for obtaining the lower limit value. More specifically, by starting from the values close to the respective limit values, with the initial value of the boost amount for obtaining the lower limit value being different from the initial value of the boost amount for obtaining the upper limit value, a boost amount is optimized in a short period of time.

In the present embodiment, the steps of continuously reproducing a signal recorded in the land track and the groove track are similar to those in the ninth embodiment.

As described above, in the optical disk apparatus of the present embodiment, a land track and a groove track are continuously reproduced prior to reproduction of data so as to determine an equalizer characteristic, whereby an optimum equalizer characteristic for reproducing a user area can be determined in a short period of time, shortening a waiting time for rotation.

FIG. 54B shows a relationship between the frequency at which the boost amount becomes maximum and the BER. The optimum value at which the boost amount becomes maximum is also obtained by the similar method to that of the boost amount.

In the present embodiment, for example, an average value of the lower limit value and the upper limit value is determined as an optimum boost amount. However, reproduction is performed while a boost amount is changed successively from the vicinity of the lower limit value to the vicinity of the upper limit value, and a value at which the BER becomes minimum may be determined as an optimum boost amount for the land track and the groove track, separately.

The reproduction signal quality detector 7174 may be designed in such a manner that it detects a BER at which a recorded signal has been reproduced, and does not count errors generated continuously at a predetermined time or times. Thus, even when an area with a reproduction defect such as a scratch is locally present, the effect thereof can be eliminated, and an optimum equalizer characteristic can be determined more accurately.

In the present embodiment, the reproduction signal quality detector 7174 is designed to detect a BER at which a recorded signal has been reproduced. However, the reproduction signal quality detector 7174 may detect a bit error rate, for example, as long as a reproduction signal quality can be detected.

In the present embodiment, one land track and one groove track are continuously reproduced. However, reproduction may be performed on a block basis, on a sector basis, etc., in the same procedure as that described with reference to FIGS. 7, 8, and 9 in the ninth embodiment.

If recording and reproduction are performed on a sector basis, an area to be continuously recorded and reproduced may be one track or less, a waiting time for rotation can be shortened, compared with the case where one groove track and one land track are continuously recorded and reproduced.

The following may be possible: when reproduction is performed on a sector basis, a land track and a groove track are continuously reproduced, for example, while a boost amount is changed gradually on a sector basis; a reproduction signal quality of the land track and the groove track is detected on a sector basis; and an average boost amount in a range where a detection result becomes OK is determined as an optimum boost amount, for the land track and the groove track, respectively.

As described above, by continuously performing reproduction while an equalizer characteristic is changed on a sector basis, a reproduction signal quality result in a plurality of equalizer characteristics is obtained for the land track and the groove track in one continuous reproduction of the land track and the groove track, which is more effective.

In the present embodiment, one land track and one groove track are continuously reproduced. However, two or more land tracks and two or more groove tracks may be continuously reproduced. By continuously reproducing two or more tracks, the variation of the tracks is absorbed, optimum equalizer characteristic can be determined more accurately.

Similarly, even in the case where reproduction is performed on a block basis, two or more blocks of a land track and two or more blocks of a groove track may be continuously reproduced. By continuously reproducing two or more blocks of both the tracks, the variation of the blocks is absorbed, and an optimum equalizer characteristic can be determined more accurately.

Furthermore, if the worst value of a block detected by land•groove reproduction signal quality detector 7174 is not adopted when two or more blocks are continuously reproduced, even when a block with a reproduction defect such as a scratch is present, the block can be eliminated. Thus, an optimum equalizer characteristic can be determined more accurately.

Similarly, even in the case where reproduction is performed on a sector basis, two or more sectors of a land track and two or more sectors of a groove track may be continuously reproduced. By continuously reproducing two or more sectors of both the tracks, the variation of the sectors is absorbed, and an optimum equalizer characteristic can be determined more accurately.

Furthermore, if the worst value of a sector detected by the land•groove reproduction signal quality detector 7174 is not adopted when two or more sectors are continuously reproduced, even when a sector with a reproduction defect such as a scratch is present, the sector can be eliminated. Thus, an optimum equalizer characteristic can be determined more accurately.

Embodiment 11

In the eleventh embodiment, the steps of obtaining an equalizer characteristic are different from those in the ninth embodiment.

Figure 61:
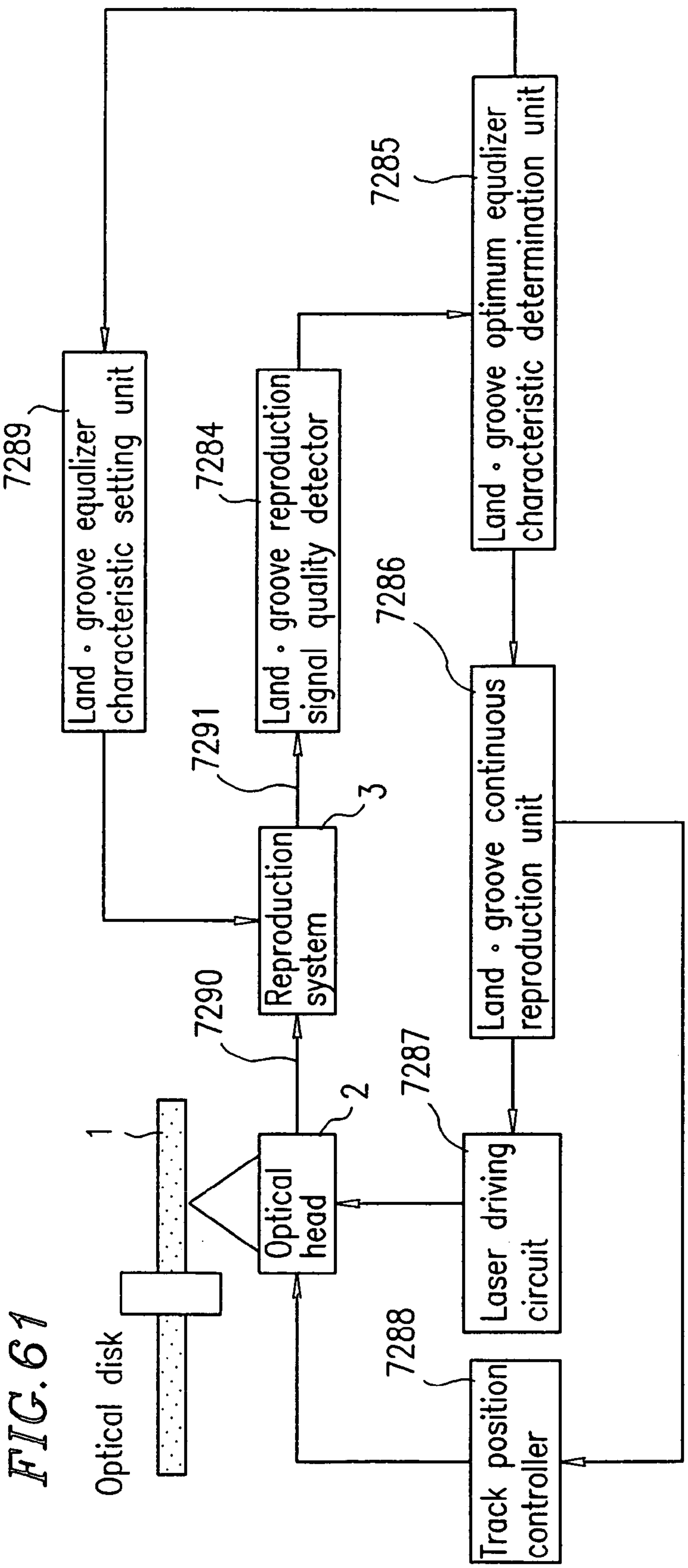
FIG. 61 is a block diagram showing the eleventh embodiment of an optical disk apparatus according to the present invention.

FIG. 61 shows a structure of an optical disk apparatus in the eleventh embodiment of the present invention. In FIG. 61, reference numeral 1 denotes an optical disk, 2 denotes an optical head, 3 denotes a reproduction system, 7284 denotes a land•groove reproduction signal quality detector, 7285 denotes a land•groove optimum equalizer characteristic determination unit, 7286 denotes a land•groove continuous reproduction unit, 7287 denotes a laser driving circuit, 7288 denotes a track position controller, and 7289 denotes a land•groove equalizer characteristic setting unit.

The optical disk 1 is as described with reference to FIG. 3.

Figure 62:
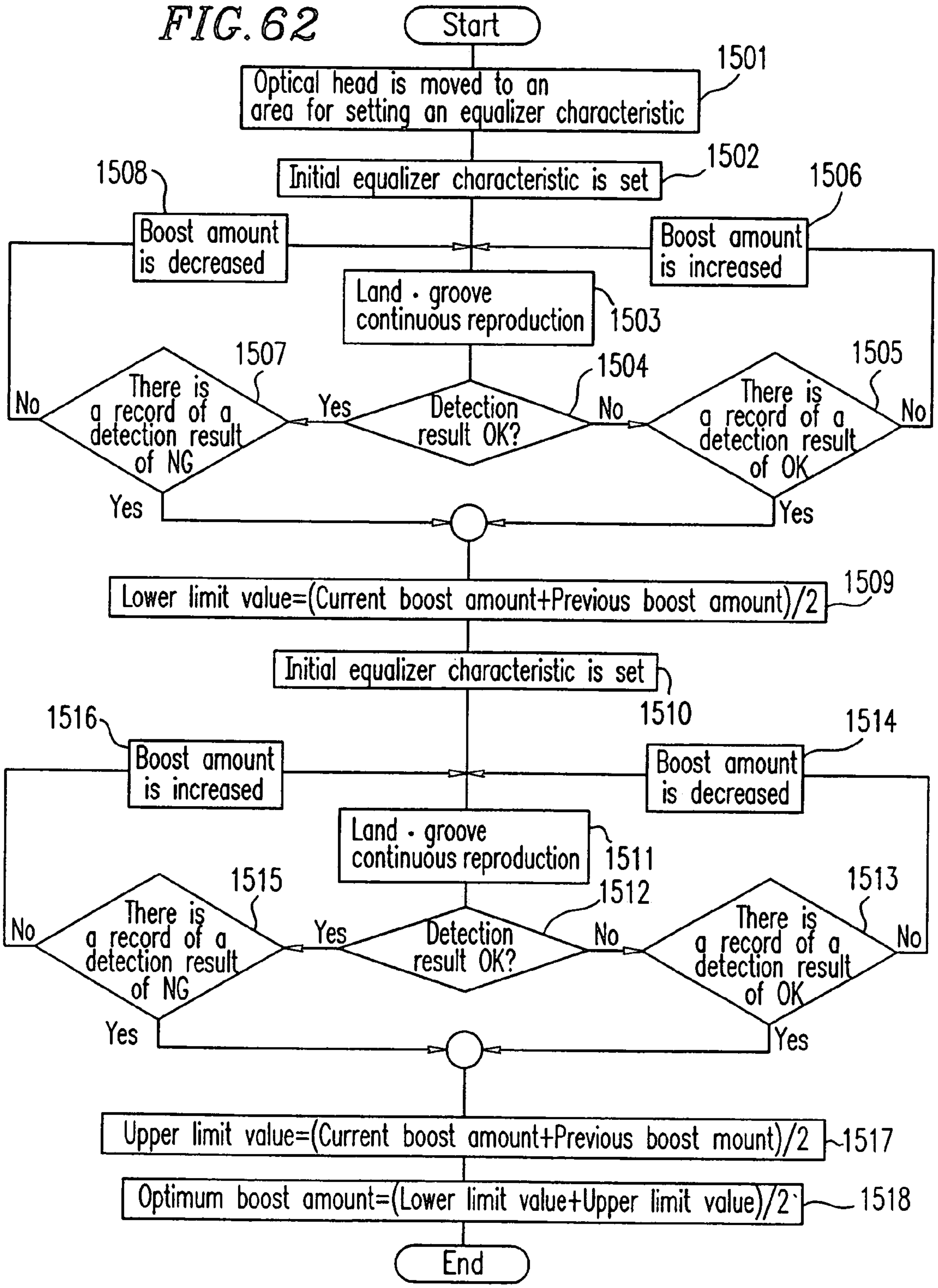
FIG. 62 is a flow chart showing process steps for determining an optimum equalizer characteristic in the eleventh embodiment of the present invention.
Figure 63:
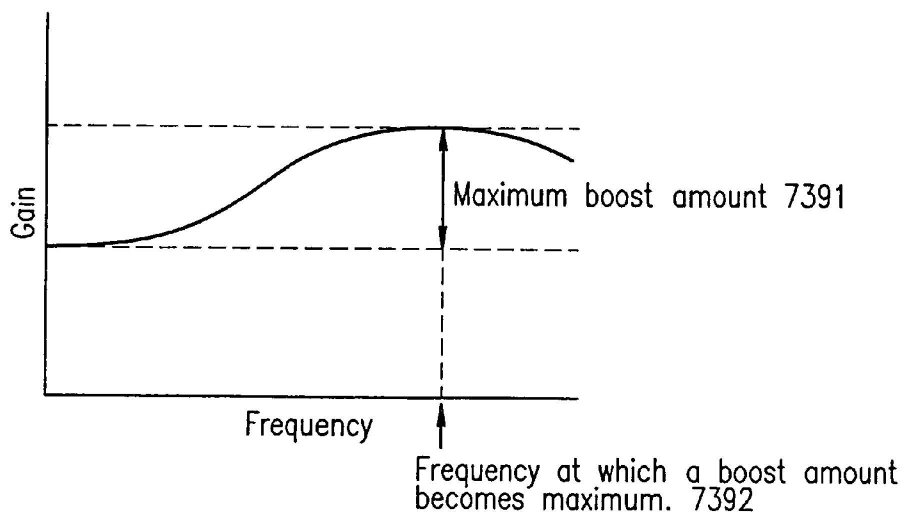
FIG. 63 is a graph showing an equalizer characteristic of a frequency and a gain.

FIG. 62 is a flow chart showing process steps of an optical disk apparatus of the present embodiment. A procedure for obtaining an equalizer characteristic will be described with reference to the flow chart. The equalizer characteristic to be determined is the maximum boost amount and the frequency at which the boost amount becomes maximum, as shown in FIG. 63.

The optical disk 1 is loaded in an optical disk apparatus. Predetermined operations such as identifying a disk type and a rotation control are performed. Thereafter, the optical head 2 is moved to an area for setting an optimum equalizer characteristic by the track position controller 7288 (Step 1501). It is assumed that this area is a recording area other than a user area provided in an innermost track or an outermost track of the optical disk 1 in which a user records data.

Initial values of the boost amount and the frequency at which the boost amount becomes maximum are set in the equalizer of the reproduction system 3 by the land•groove equalizer characteristic setting unit 7289 (Step 1502). At this time, an equalizer characteristic for reproducing the land track is identical with an equalizer characteristic for reproducing the groove track.

Subsequently, a control signal for continuously reproducing one land track and one groove track from a predetermined position is transmitted from the land•groove continuous reproduction unit 7286 to the track position controller 7288, whereby reproduction is performed by the optical head 2 and a signal 7290 which is changed depending upon the presence of the recording mark on the optical disk 1 is input to the reproduction system 3 as a reproduction signal. The reproduction signal 7290 is subjected to reproduction signal processing such as amplification, waveform equalization, and digitization at the reproduction system 3, and a signal 7291 is input to the land•groove reproduction signal quality detector 7284 (Step 1503).

The land•groove reproduction signal quality detector 7284 detects a signal quality of the signal 7291 for the land track and the groove track, separately, and a detection result of the reproduction signal quality is input to the land•groove optimum equalizer characteristic determination unit 7285.

The land•groove reproduction signal quality detector 7284 detects, for example, a BER at which the recorded signal has been reproduced (Step 1504).

In accordance with each of Steps 1503 to 1509, the land•groove equalizer characteristic determination unit 7285 determines a lower limit value of a boost amount based on a detection result of the land•groove reproduction signal quality detector 7284 for the land track and the groove track, separately.

For example, when the first result of the land•groove reproduction signal quality detector 7284 is NG for the land track and OK for the groove track, the boost amount of the land track is increased, and the boost amount of the groove track is decreased. Therefore, during the second continuous reproduction, the boost amount for reproducing the land track becomes larger than that for reproducing the groove track.

When the second result of the land•groove reproduction signal quality detector 7284 is OK for the land track and NG for the groove track, the land•groove optimum equalizer characteristic determination unit 7285 stores an average boost amount of the current boost amount and the previous boost amount as a lower limit value of the boost amount for the land track and the groove track.

When the second result of the land•groove reproduction signal quality detector 7284 is OK for the land track and OK for the groove track, the land•groove optimum equalizer characteristic determination unit 7285 stores an average boost amount of the current boost amount and the previous boost amount at which the land track has been reproduced as a lower limit value of the boost amount of the land track. Regarding the groove track, a boost amount lower than the boost amount used during the second reproduction is reproduced using this boost, thereby detecting a reproduction signal quality.

When the third result of the land•groove reproduction signal quality detector 7284 is NG for the groove track, the land•groove optimum equalizer determination unit 7285 stores an average boost amount of the current boost amount and the previous boost amount as a lower limit value of the boost amount of the groove track.

Regarding the upper limit value, each of Steps 1510 to 1517 in the flow chart of FIG. 62 is performed for the land track and the groove track, separately, and an upper limit value of the boost amount of the land track is obtained to be stored, and an upper limit value of the boost amount of the groove track is obtained to be stored.

The land•groove optimum equalizer determination unit 7285 determines an average value of the lower limit value and the upper limit value, for example, as the optimum boost amount for the land track and the groove track, separately (Step 1518).

When the lower limit value and the upper limit value are obtained, the initial value of the boost amount for obtaining the upper limit value may be prescribed to be higher than that of the boost amount for obtaining the lower limit value. More specifically, by starting from the values close to the respective limit values, with the initial boost amount for obtaining the lower limit value being different from the initial boost amount for obtaining the upper limit value, a boost amount is optimized in a short period of time.

In the present embodiment, the steps of continuously reproducing a signal recorded in the land track and the groove track are similar to those in the ninth embodiment.

As described above, in the optical disk apparatus of the present embodiment, a land track and a groove track are continuously reproduced prior to reproduction of data so as to determine an equalizer characteristic, whereby an optimum equalizer characteristic for reproducing a user area can be determined in a short period of time, shortening a waiting time for rotation.

FIG. 54B shows a relationship between the frequency at which the boost amount becomes maximum and the BER. An optimum value of the frequency at which the boost amount becomes maximum is obtained by the method similar to that of the boost amount.

In the present embodiment, an average value of the lower limit value and the upper limit value is determined as an optimum equalizer characteristic. However, it may be possible that the equalizer characteristic is changed for the land track and the groove track, respectively, and a value at which the BER becomes local minimum is determined as an optimum equalizer characteristic.

The land•groove reproduction signal quality detector 7284 may be designed in such a manner that it detects a BER at which a recorded signal has been reproduced, and does not count errors generated continuously at a predetermined time or times. Thus, even when an area with a reproduction defect such as a scratch is locally present, the effect thereof can be eliminated, and an optimum equalizer characteristic can be determined more accurately.

In the present embodiment, the land•groove reproduction signal quality detector 7284 is designed to detect a BER at which a recorded signal has been recorded. However, the land•groove reproduction signal quality detector 7284 may detect a bit error rate, for example, as long as a reproduction signal quality can be detected.

In the present embodiment, one land track and one groove track are continuously reproduced. However, reproduction may be performed on a block basis, on a sector basis, etc., in the same procedure as that described with reference to FIGS. 7, 8, and 9 in the ninth embodiment.

If recording and reproduction are performed on a sector basis, an area to be continuously recorded and reproduced may be one track or less. Therefore, a waiting time for rotation can be shortened, compared with the case where one groove track and one land track are continuously recorded and reproduced.

The following may be possible: when reproduction is performed on a sector basis, a land track and a groove track are continuously reproduced, for example, while a boost amount is changed gradually on a sector basis; a reproduction signal quality of the land track and the groove track is detected on a sector basis; and an average boost amount in a range where a detection result becomes OK is determined as an optimum boost amount, for the land track and the groove track, respectively.

As described above, by continuously performing reproduction while an equalizer characteristic is changed on a sector basis, a reproduction signal quality result in a plurality of equalizer characteristics is obtained for the land track and the groove track in one continuous reproduction of the land track and the groove track, which is more effective.

In the present embodiment, one land track and one groove track are continuously reproduced. However, two or more land tracks and two or more groove tracks may be continuously reproduced. By continuously reproducing two or more tracks, the variation of the tracks is absorbed, and optimum equalizer characteristic can be determined more accurately.

Similarly, even in the case where reproduction is performed on a block basis, two or more blocks of a land track and two or more blocks of a groove track may be continuously reproduced. By continuously reproducing two or more blocks of both the tracks, the variation of the blocks is absorbed, and an optimum equalizer characteristic can be determined more accurately.

Furthermore, if the worst value of a block detected by land•groove reproduction signal quality detector 7284 is not adopted when two or more blocks are continuously reproduced, even when a block with a reproduction defect such as a scratch is present, the block can be eliminated. Thus, an optimum equalizer characteristic can be determined more accurately.

Similarly, even in the case where reproduction is performed on a sector basis, two or more sectors of a land track and two or more sectors of a groove track may be continuously reproduced. By continuously reproducing two or more sectors of both the tracks, the variation of the sectors is absorbed, and an optimum equalizer characteristic can be determined more accurately.

Furthermore, if the worst value of a sector detected by the land•groove reproduction signal quality detector 7284 is not adopted when two or more sectors are continuously reproduced, even when a sector with a reproduction defect such as a scratch is present, the sector can be eliminated. Thus, an optimum equalizer characteristic can be determined more accurately.

Figure 22E:
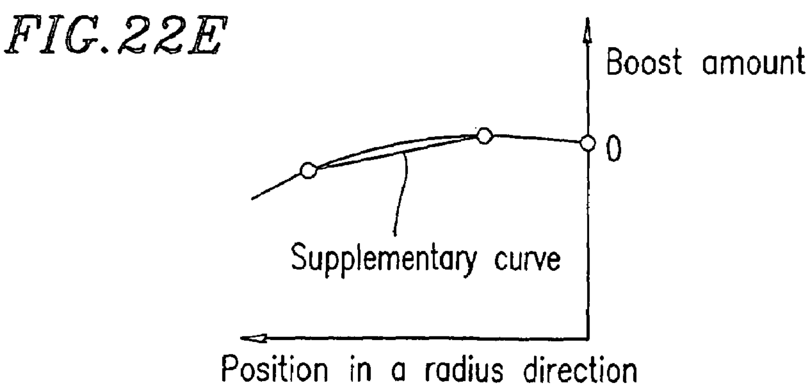
FIG. 22E is a graph showing a relationship between the position in a radius direction of the optical disk and the boost amount.

In the ninth to eleventh embodiments, prior to setting the boost amount (or frequency), the optical head 2 is moved to a predetermined area. This area is an outermost area 1*a* of the optical disk 1, for example, as shown in FIG. 22A. However, when the optical disk 1 is warped or when the optical disk 1 is not properly placed in an apparatus, the boost amount (or frequency) obtained in the outermost area 1*a* of the optical disk 1 is not necessarily optimum for an inner track portion of the optical disk 1. More specifically, the boost amount (or frequency) may be different between the outer track portion and the inner track portion of the optical disk 1. Therefore, in a plurality of places on the optical disk 1 (e.g., in an outermost track and an innermost track of the optical disk 1), a boost amount (or frequency) is obtained, and a supplementary curve connecting the optimum equalizer characteristic points in the outermost track and in the innermost track as shown in FIG. 22E is formed for the boost amount and the frequency, separately. When the optical disk 1 is recorded and reproduced, a boost amount (or frequency) may be set, in accordance with a recording position and a reproduction position of the optical disk 1 based on the supplementary curve connecting the boost amount (or frequency) points in the outermost track and the innermost track.

Embodiment 12

In the twelfth embodiment, a procedure for setting recording and reproduction focus positions, radial and tangential tilt angles, peak and bias powers, and an equalizer characteristic in the above-mentioned first to eleventh embodiments will be described.

Figure 64:
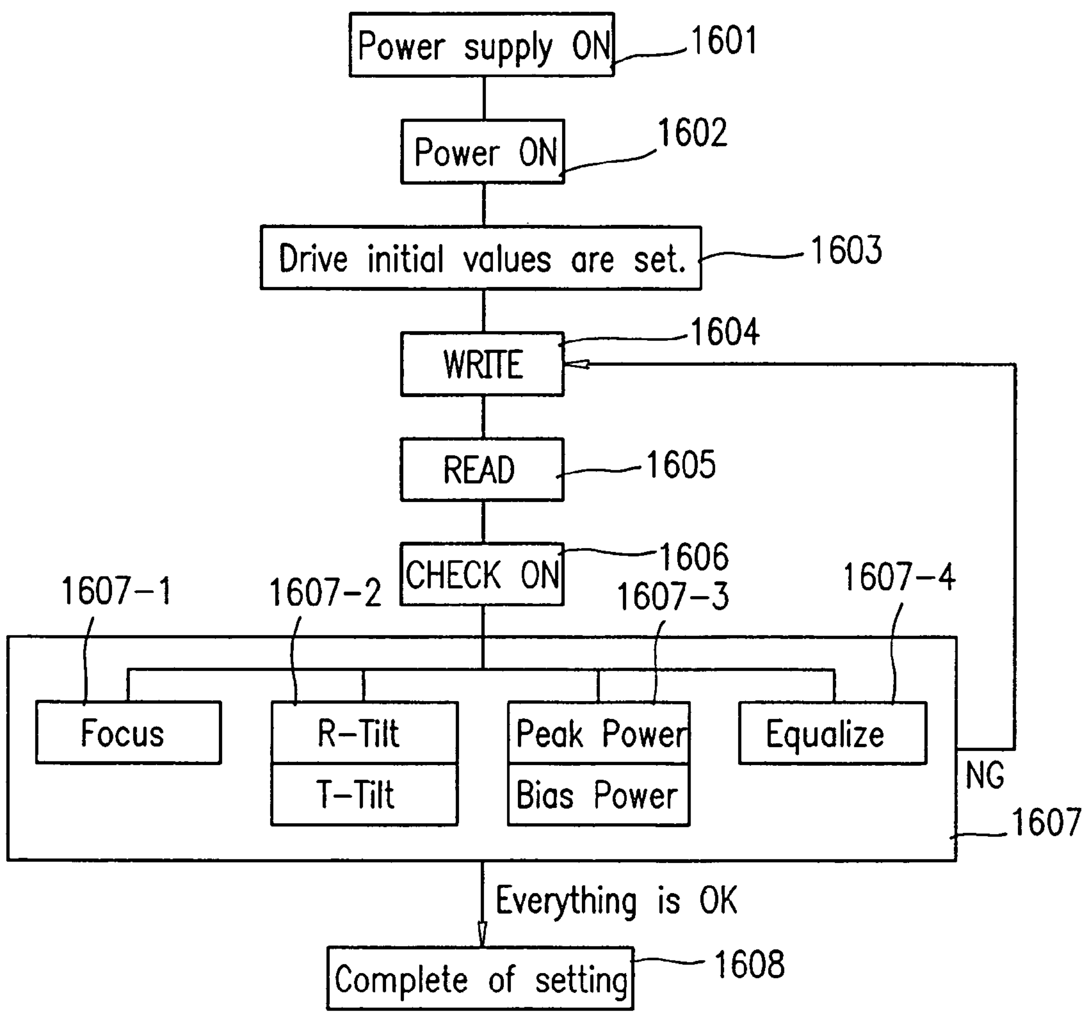
FIG. 64 is a flow chart showing process steps in the twelfth embodiment of an optical disk apparatus according to the present invention.
Figure 65:
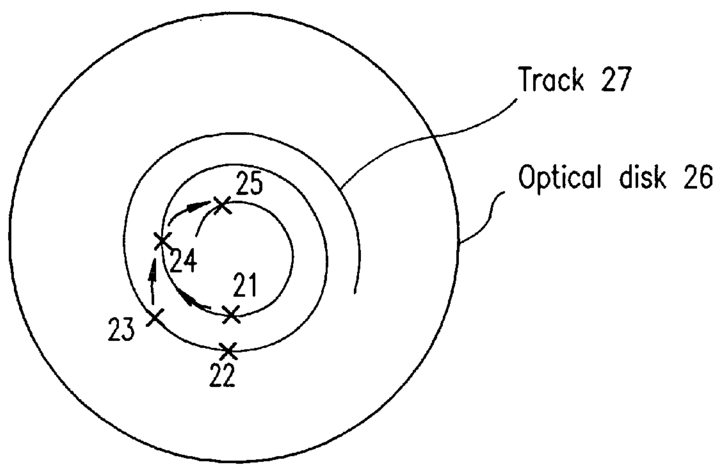
FIG. 65 is a diagram showing a track structure of a conventional optical disk.

FIG. 64 is a flow chart showing a procedure for setting control parameters in an optical disk apparatus in the twelfth embodiment of the present invention.

The procedure for setting the control parameters of the present embodiment is applied to a presumed optical disk apparatus obtained by selectively combining the first to eleventh embodiments.

First, when a power supply of an optical disk apparatus is turned on, and a power switch of a semiconductor laser of the optical head 1 is turned on (Steps 1601 and 1602), drive initial values in the optical disk apparatus (i.e., initial values of recording and reproduction focus positions, radial and tangential tilt angles, peak and bias powers, and an equalizer characteristic) are set (Step 1603).

Under the condition that the initial values are set, a land track and a groove track are continuously recorded as described above (Step 1604), and reproduction signals are read from the land track and the groove track (Step 1605). The quality of the reproduction signals is checked (Step 1606).

At Step 1607, the focus position (Step 1607-1), the tilt angle (Step 1607-2), the laser power (Step 1607-3), and the equalizer characteristic (Step 1607-4) are selectively changed.

For example, the focus position is changed (Step 1607-1). Thereafter, the process returns to Steps 1604 to 1606, and the quality of the reproduction signal is checked. The change in focus position and the checking of the quality of the reproduction signal are repeated, and a focus position at which the quality of the reproduction signal becomes OK is obtained in order to be set. Then, while the tilt angle is being changed (Step 1607-2), Steps 1604 to 1606 are repeated, and a tilt angle at which the quality of the reproduction signal becomes OK is obtained in order to be set. Similarly, while the laser power is being changed (Step 1607-3), the checking of the quality of the reproduction signal is repeated, and a laser power at which the quality of the reproduction signal becomes OK is obtained in order to be set. While the equalizer characteristic is being changed (Step 1607-4), the checking of the quality of the reproduction signal is repeated, and an equalizer characteristic at which the quality of the reproduction signal becomes OK is obtained in order to be set.

Accordingly, after the setting of the focus position, the tilt position, the laser power, and the equalizer characteristic is completed (Step 1608), recording and reproduction of data with respect to the optical disk 1 is started.

As described above, in the optical disk apparatus according to the present invention, when an optimum focus position and/or an optimum tilt angle are determined prior to recording, a land track and a groove track are continuously recorded and reproduced, whereby an optimum recording focus position and/or an optimum tilt angle can be determined in a short period of time, shortening a waiting time for rotation.

Furthermore, in the optical disk apparatus according to the present invention, when an optimum power is determined prior to recording, a land track and a groove track are continuously recorded and reproduced, whereby an optimum recording power can be determined in a short period of time, shortening a waiting time for rotation.

Furthermore, in the optical disk apparatus according to the present invention, when an optimum equalizer characteristic is determined prior to reproduction, a land track and a groove track are continuously reproduced, whereby an optimum equalizer characteristic can be determined in a short period of time, shortening a waiting time for rotation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus performing either one of recording and reproduction of an optical disk in which groove-shaped groove tracks and land tracks present between the groove tracks are alternately connected to each other in a spiral shape, comprising:

a recording and reproduction unit for recording a signal in both at least one continuous groove track and at least one continuous land track, and after recording the signal in both the groove track and the land track, then reproducing the signal from both the groove track and the land track;

a detector for detecting a quality of the signal thus recorded and reproduced by the recording and reproduction unit;

a control parameter setting unit for setting a control parameter related to at least one of the recording and the reproduction of the optical disk; and a controller for changing the control parameter set by the control parameter setting unit, repeating the recording and reproduction performed by the recording and reproduction unit and repeating the detection performed by the detector every time the control parameter is changed, and determining the control parameter based on the quality of the signal detected by the detector, wherein, as the controller is changing the control parameter, during the steps of repeating the recording and reproduction and repeating the detection, the recording and reproduction unit is able to reduce a waiting time of disk revolutions to determine the control parameter relative to a unit which records and reproduces a signal from a groove track and then records and reproduces a signal from a land track when the controller changes the control parameter.

2. An optical disk apparatus according to claim 1, wherein the controller obtains a control parameter common to the groove track and the land track.

3. An optical disk apparatus according to claim 1, wherein the controller obtains control parameters for the groove track and the land track, separately.

4. An optical disk apparatus according to claim 3, wherein the control parameter setting unit sets an average value of the control parameter of the groove track and the land track obtained by the controller.

5. An optical disk apparatus according to claim 3, wherein the control parameter setting unit sets the control parameter of the groove track and the land track obtained by the controller, separately.

6. An optical disk apparatus according to claim 3, wherein the recording and reproduction by the recording and reproduction unit, the detection by the detector, and the determination by the controller are performed at two positions apart from each other on the optical disk, and a control parameter corresponding to each of the positions is obtained in order to be set; and when at least one of the recording and the reproduction is performed between the respective positions on the optical disk, a control parameter in accordance with the position at which at least one of the recording and the reproduction is performed is obtained in order to be set based on the control parameter corresponding to each of the positions.

7. An optical disk apparatus according to claim 1, wherein the control parameter is at least one of a focus position of a light beam radiated for at least one of the recording and the reproduction of the optical disk, a tilt angle of the light beam with respect to the optical disk, an intensity of the laser beam, and an equalizer characteristic of the laser beam.

8. An optical disk apparatus according to claim 1, wherein the controller sets a plurality of kinds of control parameters, separately, and repeats setting of each of the control parameters in accordance with a detection result of the detector.

9. An optical disk apparatus according to claim 1, wherein a number of sectors of the groove track to be recorded and reproduced by the recording and reproduction unit is equal to a number of sectors of the land track to be recorded and reproduced by the recording and reproduction unit.

10. An optical disk apparatus according to claim 1, wherein the detector detects at least one of a byte error rate of the signal recorded and reproduced by the recording and reproduction unit, a jitter of the signal, a bit error rate of the signal, a resolution of the signal, a symmetry of the signal, and a modulation of the signal.

11. A method for setting a control parameter of an optical disk apparatus performing at least one of recording and reproduction of an optical disk in which groove-shaped groove tracks and land tracks present between the groove tracks are alternately connected to each other in a spiral shape, comprising:

a recording and reproduction step of recording a signal in both at least one continuous groove track and at least one continuous land track, and after recording the signal in both the groove track and the land track, then reproducing the signal from both the groove track and the land track;

a detection step of detecting a quality of the signal thus recorded and reproduced during the recording and reproduction step;

a control parameter setting step of setting a control parameter related to at least one of the recording and the reproduction of the optical disk; and a control step of changing the control parameter set during the control parameter setting step, repeating the recording and reproduction performed during the recording and reproduction step and repeating the detection performed during the detection step every time the control parameter is changed, and determining the control parameter based on the quality of the signal detected during the detection step, wherein, as the control step is changing the control parameter, during the steps of repeating the recording and reproduction and repeating the detection, the recording and reproduction unit is able to reduce a waiting time of disk revolutions to determine the control parameter relative to a unit which records and reproduces a signal from a groove track and then records and reproduces a signal from a land track when the controller changes the control parameter.

12. A method for setting a control parameter of an optical disk apparatus according to claim 11, wherein a control parameter common to the groove track and the land track is obtained during the control step.

13. A method for setting a control parameter of an optical disk apparatus according to claim 11, wherein control parameters are obtained for the groove track and the land track, separately, during the control step.

14. A method for setting a control parameter of an optical disk apparatus according to claim 13, wherein an average value of the control parameter of the groove track and the land track obtained during the control step is set during the control parameter setting step.

15. A method for setting a control parameter of an optical disk apparatus according to claim 13, wherein the control parameter of the groove track and the land track obtained during the control step are separately set during the control parameter setting step.

16. A method for setting a control parameter of an optical disk apparatus according to claim 13, wherein the recording and reproduction during the recording and reproduction step, the detection during the detection step, and the determination during the control step are performed at two positions apart from each other on the optical disk, and a control parameter corresponding to each of the positions is obtained in order to be set; and when at least one of the recording and the reproduction is performed between the respective positions on the optical disk, a control parameter in accordance with the position at which at least one of the recording and the reproduction is performed is obtained in order to be set based on the control parameter corresponding to each of the positions.

17. A method for setting a control parameter of an optical disk apparatus according to claim 11, wherein the control parameter is at least one of a focus position of a light beam radiated for at least one of the recording and the reproduction of the optical disk, a tilt angle of the light beam with respect to the optical disk, an intensity of the laser beam, and an equalizer characteristic of the laser beam.

18. A method for setting a control parameter of an optical disk apparatus according to claim 11, wherein, during the control step, a plurality of kinds of control parameters are separately set, and setting of each of the control parameters is repeated in accordance with a detection result obtained during the detection step.

19. A method for setting a control parameter of an optical disk apparatus according to claim 11, wherein a number of sectors of the groove track to be recorded and reproduced during the recording and reproduction step is equal to a number of sectors of the land track to be recorded and reproduced during the recording and reproduction step.

20. A method for setting a control parameter of an optical disk apparatus according to claim 11, wherein at least one of a byte error rate of the signal recorded and reproduced during the recording and reproduction step, a jitter of the signal, a bit error rate of the signal, a resolution of the signal, a symmetry of the signal, and a modulation of the signal is detected during the detection step.

* * * * *

UNITED STATES PATENT AND TRADEMARK OFFICE

CERTIFICATE OF CORRECTION

PATENT NO. : 6,952,384 B1
DATED : October 4, 2005
INVENTOR(S) : Shoji et al.

It is certified that error appears in the above-identified patent and that said Letters Patent is hereby corrected as shown below:

Title page,
Item [30], Foreign Application Priority Data,
replace "May 6, 1997" with -- Jun. 5, 1997 -- (both occurrences); and
replace "Nov. 6, 1997" with -- Jun. 11, 1997 --.

Signed and Sealed this

Twenty-fourth Day of January, 2006

JON W. DUDAS
*Director of the United States Patent and Trademark Office*